United States Patent [19]
Kopec et al.

[11] Patent Number: 5,689,620
[45] Date of Patent: Nov. 18, 1997

[54] AUTOMATIC TRAINING OF CHARACTER TEMPLATES USING A TRANSCRIPTION AND A TWO-DIMENSIONAL IMAGE SOURCE MODEL

[75] Inventors: Gary E. Kopec, Belmont; Philip Andrew Chou, Menlo Park; Leslie T. Niles, Palo Alto, all of Calif.

[73] Assignee: Xerox Corporation, Stamford, Conn.

[21] Appl. No.: 431,223

[22] Filed: Apr. 28, 1995

[51] Int. Cl.[6] .................... G06T 1/40; G06K 9/00
[52] U.S. Cl. .................... 395/20; 395/23; 382/157; 382/187
[58] Field of Search .................... 395/20, 23; 382/157, 382/187

[56] References Cited

U.S. PATENT DOCUMENTS

| | | | |
|---|---|---|---|
| 4,599,692 | 7/1986 | Tan et al. | 395/61 |
| 4,769,716 | 9/1988 | Casey et al. | 358/263 |
| 5,020,112 | 5/1991 | Chou | 382/37 |
| 5,237,627 | 8/1993 | Johnson et al. | 382/30 |
| 5,303,313 | 4/1994 | Mark et al. | 382/56 |
| 5,321,773 | 6/1994 | Kopec et al. | 382/30 |
| 5,493,688 | 2/1996 | Weingard | 395/23 |
| 5,526,444 | 6/1996 | Kopec et al. | 382/233 |
| 5,539,839 | 7/1996 | Bellegarda et al. | 382/187 |

FOREIGN PATENT DOCUMENTS 0546843  6/1993  European Pat. Off. ......... G06K 9/00

OTHER PUBLICATIONS

G. Kopec, "Least–Squares Font Metric Estimation from Images", in *IEEE Transactions on Image Processing*, Oct., 1993, pp. 510–519.

G. Kopec and P. Chou, "Document Image Decoding Using Markov Source Models." in *IEEE Transactions on Pattern Analysis and Machine Intelligence*, vol. 16, No. 6, Jun. 1994, pp. 602–617.

P.A. Chou, "Recognition of Equations Using a Two–Dimensional Stochastic Context–Free Grammar," in *SPIE*, vol. 1199, *Visual Communications and Image Processing IV*, 1989, pp. 852–863.

(List continued on next page.)

*Primary Examiner*—George B. Davis
*Attorney, Agent, or Firm*—Judith C. Bares

[57] ABSTRACT

A technique for automatically training a set of character templates using unsegmented training samples uses as input a two-dimensional (2D) image of characters, called glyphs, as the source of training samples, a transcription associated with the 2D image as a source of labels for the glyph samples, and an explicit, formal 2D image source model that models as a grammar the structural and functional features of a set of 2D images that may be used as the source of training data. The input transcription may be a literal transcription associated with the 2D input image, or it may be nonliteral, for example containing logical structure tags for document formatting, such as found in markup languages. The technique uses spatial positioning information about the 2D image modeled by the 2D image source model and uses labels in the transcription to determine labeled glyph positions in the 2D image that identify locations of glyph samples. The character templates are produced using the input 2D image and the labeled glyph positions without assigning pixels to glyph samples prior to training. In one implementation, the 2D image source model is a regular grammar having the form of a finite state transition network, and the transcription is also represented as a finite state network. The two networks are merged to produce a transcription-image network, which is used to decode the input 2D image to produce labeled glyph positions that identify training data samples in the 2D image. In one implementation of the template construction process, a pixel scoring technique is used to produce character templates contemporaneously from blocks of training data samples aligned at glyph positions.

32 Claims, 33 Drawing Sheets

OTHER PUBLICATIONS

Huang, Ariki and Jack, *Hidden Markov Models for Speech Recognition* Edinburgh University Press, 1990, chapters 2, 5 and 6, pp. 10–51; 136–166; and 167–185.

L. Rabiner and B. Juang, "An Introduction to Hidden Markov Models", in *IEEE ASSP Magazine,* Jan. 1986, at pp. 4–16.

L. Rabiner, "A Tutorial on Hidden Markov Models and Selected Applications in Speech Recognition", in *Proceedings of the IEEE,* vol. 77, No. 2, Feb., 1989, at pp. 257–285.

H. S. Baird, "A Self–Correcting 100–Font Classifier," in SPIE vol. 2181 Document Recognition, 1994, pp. 106–115.

S. Kuo and O.E. Agazzi, "Keyword spotting in poorly printed documents using pseudo 2D hidden Markov models," in *IEEE Transactions on Pattern Analysis and Machine Intelligence,* vol. 16, No. 8, Aug., 1994, pp. 842–848.

C. Bose and S. Kuo, "Connected and degraded text recognition using a hidden Markov model," in *Proceedings of the International Conference on Pattern Recognition,* Netherlands, Sep. 1992, pp. 116–119.

E. Levin and R. Pieraccini, "Dynamic planar warping for optical character recognition," in *Proceedings of the 1992 International Conference on Acoustics, Speech and Signal Processing (ICASSP),* San Francisco, California, Mar. 23–26, 1992, pp. III–149–III–152.

C. Yen and S. Kuo, "Degraded document recognition using pseudo 2D hidden Markov models in gray–scale Images". Copy received from authors without obligation of confidentiality, upon general request by applicants for information about ongoing or new work in this field. Applicants have no knowledge as to whether subject matter in this paper has been published.

R. Rubenstein, *Digital Typography: An Introduction to Type and Composition for Computer System Design,* Addison–Wesley, 1988, pp. 115–121.

*Adobe Systems, Inc. Postscript Language Reference Manual,* Addison–Wesley, 1985, pp. 95–96.

A. Kam and G. Kopec, "Separable source models for document image decoding", conference paper presented at *IS&T/SPIE 1995 Intl. Symposium on Electronic Imaging,* San Jose, CA, Feb. 5–10, 1995.

A. Kam, "Heuristic Document Image Decoding Using Separable Markov Models", S.M. Thesis, Massachusetts Institute of Technology, Cambridge, MA, Jun., 1993.

J. Coombs, A. Renear and S. DeRose, "Markup Systems and the Future of Scholarly Text Processing", *Comm. of the ACM,* vol. 30, No. 11, Nov., 1987, pp. 933–947.

P.A. Chou and G.E. Kopec, "A Stochastic Attribute Grammar Model of Document Production and Its Use in Document Image Decoding", conference paper presented at *IS&T/SPIE 1995 Intl. Symposium on Electronic Imaging,* San Jose, CA, Feb. 5–10, 1995.

D. E. Knuth, TEX and METAFONT: *New Directions in Typesetting,* Digital Press, 1979, Part II, pp. 41–50.

O. E. Agazzi et al., "Connected and Degraded Text Recognition Using Planar Hidden Markov Models," in Proceedings of *International Conference on Acoustics, Speech and Signal Processing* (ICASSP) 1993, Apr. 1993, pp. V–113–V–116.

Thomas M. Breuel, "A system for the off–line recognition of handwritten text" in *Proceedings of the International Conference on Pattern Recognition* (ICPR), Oct. 9–13, 1994, Jerusalem, Israel, pp. 129–134.

National Science Foundation (NSF) Grant Proposal for NSF Program Digital Libraries NSF 93–141 Feb. 4, 1994, submitted by the Regents of the University of California, Berkeley, document date Jan. 24, 1994, pp. i–xi, 2–5, 36–37, 101, and 106.

K. Y. Wong, R. G. Casey and F.M. Wahl, "Document Analysis System", *IBM J Res Develop.,* vol. 26, No. 6, Nov. 1982, pp. 647–656.

```
\entry{
\name{interference spectrum }
\category{electr}
\body{  Frequency distribution of the
jamming interference in the propagation medium external to the receiver
}}
\entry{
\name{interflow }
\category{hyd}
\body{  The water, derived from precipitation,
that infiltrates the soil surface and then moves laterally through
the upper layers of soil above the water table until it reaches a
stream channel or returns to the surface at some point downslope from
its point of infiltration
}}
\entry{
\name{interlude }
\category{adp}
\body{  A small routine or program which is designed
to carry out minor preliminary calculations or housekeeping operations
before the main routine begins to operate and which can usually be
overwritten after it has performed its function.
}}
```

Fig. 5 interference spectrum [*electr*] Frequency distribution of the
  jamming interference in the propagation medium external to the receiver.
Interflow [*hyd*] The water, derived from precipitation,
  that infiltrates the soil surface and then moves laterally through
  the upper layers of soil above the water table until it reaches a
  stream channel or returns to the surface at some point downslope from
  its point of infiltration.
Interlude [*adp*] A small routine or program which is designed
  to carry out minor preliminary calculations or housekeeping operations
  before the main routine begins to operate and which can usually be
  overwritten after it has performed its function.

Fig. 6

| on a | rs are | cause | said, | bbage | d say, | ıp and | stand | want | mpany |
|---|---|---|---|---|---|---|---|---|---|
| year | veal | luctant | are | ufactu | manu- | part, | search | mark | analys |
| an ana | e, an | bbage | Paul | ch as c | small | erializ | mpanie | nal | creased |
| ıreat | vrs are | ufactu | Manu | rmed S | payir | are | obably | chann | that ] |
| t say | said: | analyst | ana | Dataqu | Data | bbage. | mate | ıet affe | marke |
| gray r | exactly | say | cular ca | parti | ıit a pe | t's a lo | ct at- | lara Ce | Clara |
| ınta Cla | Sante | gang | head | Soare | Dave | really | u can r | that y | gang |
| Asian | as a | rng as | e's any | lara. | Clara. | ınta | Sante | e and | San |
| tigator | acce | gang | Asian | have | pear | rs app | years | nt arm | ollars |
| )usands | and | pitas, | se and | , San J | lara, S | Clara, | ınta Cl | Sant | 10 arm |
| organiz | man | ed a | nce | arre, San Je | dayl | broad | of raid | attack | y atta |
| years | past | plagu | have | Bay | Valle | pears | at app | that a | natio |
| is a | have | d age | es and | th abo | rnia, r, | Calif | p and | branc | uranc |
| llstate | ıt at | rglar | eff a | sers are | | and | ufactu | manu | trackı | es and |
| erial- | at seri | that | mpany | k-base | se a | that tHe | also | n and | may ı |
| plasti | ers- | tags | npany | anage | mana | ıt, ad- | ultant, | Park | erializ |
| mpanie | al c. | , said | Dataqu | Datac | Trant | t Jami | , said | mark | gray |
| in and | hy are | many | State | egally | s cann | Mark | geant | lara po | Clara |
| ınta | Santa | , accof | a sff | a sid | gang | organiz | parts | made | tually |
| 1s actı | rseas | ufactu | manu | tabli | made | y are | laws | pate | y lax |

AUTOMATIC TRAINING OF CHARACTER TEMPLATES USING A TRANSCRIPTION AND A TWO-DIMENSIONAL IMAGE SOURCE MODEL

CROSS REFERENCE TO OTHER APPLICATIONS

The invention that is the subject matter of the present application is related to several other inventions that are the subject matter of copending, commonly assigned U.S. patent applications, respectively identified as Ser. No. 08/431,253, "Automatic Training of Character Templates Using a Text Line Image Source, a Text Line Transcription and an Image Source Model", now issued as U.S. Pat. No. 5,594,809; Ser. No. 08/431,714, "Method of Producing Character Templates Using Unsegmented Samples"; Ser. No. 08/430,635, "Unsupervised Training of Character Templates Using Unsegmented Samples"; and Ser. No. 08/460,454, "Method and System for Automatic Transcription Correction."

FIELD OF THE INVENTION

The present invention relates generally to the field of computer-implemented methods of and systems for pattern recognition, and more particularly to a method and system for training character templates for use in computer-implemented systems that perform document image decoding and character recognition.

BACKGROUND

Information in the form of language symbols (i.e., characters) or other symbolic notation that is visually represented to a human in an image on a marking medium, such as a computer display screen or paper, is capable of manipulation for its semantic content by a processor included in a computer system when the information is accessible to the processor in an encoded form, such as when each of the language symbols is available to the processor as a respective character code selected from a predetermined set of character codes (e.g. ASCII code) that represent the symbols to the processor. An image is typically represented in a computer system as a two-dimensional array of image data, with each item of data in the array providing a value indicating the color (typically black or white) of a respective location of the image. An image represented in this manner is frequently referred to as a bitmapped or binary image. Each location in a binary image is conventionally referred to as a picture element, or pixel. Sources of bitmapped images include images produced by scanning a paper form of a document using an optical scanner, or by receiving image data via facsimile transmission of a paper document. When manipulation of the semantic content of the characters in an image by a processor is desirable, a process variously called "recognition," or "character recognition," or "optical character recognition" must be performed on the image in order to produce, from the images of characters, a sequence of character codes that is capable of being manipulated by the processor.

Character recognition systems typically include a process in which the appearance of an isolated, input character image, or "glyph," is analyzed and, in a decision making process, classified as a distinct character in a predetermined set of characters. The term "glyph" refers to an image that represents a realized instance of a character. The classification analysis typically includes comparing characteristics of the isolated input glyph (e.g., its pixel content or other characteristics) to units of reference information about characters in the character set, each of which defines characteristics of the "ideal" visual representation of a character in its particular size, font and style, as it would appear in an image if there were no noise or distortion introduced by the image creation process. The unit of reference information for each character, typically called a "character template," "template" or "prototype," includes identification information, referred to as a "character label," that uniquely identifies the character as one of the characters in the character set. The character label may also include such information as the character's font, point size and style. A character label is output as the identification of the input glyph when the classification analysis determines that a sufficient match between the glyph and the reference information indicating the character label has been made.

The representation of the reference information that comprises a character template may be referred to as its model. Character template models are broadly identifiable as being either bitmapped, or binary, images of characters, or lists of high level "features" of binary character images. "Features" are measurements of a character image that are derived from the binary image and are typically much fewer in number than the number of pixels in the character image. Examples of features include a character's height and width, and the number of closed loops in the character. Within the category of binary character template models, at least two different types of models have been defined: one model may be called the "segmentation-based" model, and describes a character template as fitting entirely within a rectangular region, referred to as a "bounding box," and describes the combining of adjacent character templates as being "disjoint" that is, requiring nonoverlapping bounding boxes. U.S. Pat. No. 5,321,773 discloses another binary character template model that is based on the sidebearing model of letterform shape description and positioning used in the field of digital typography. The sidebearing model, described in more detail below in the discussion accompanying FIG. 1, describes the combining of templates to permit overlapping rectangular bounding boxes as long as the foreground (e.g., typically black) pixels of one template are not shared with, or common with, the foreground pixels of an adjacent template; this is described as requiring the templates to have substantially "disjoint supports."

1. Overview of training character templates for recognition systems

Training character templates is the process of using training data to create, produce or update the templates used for the recognition process. Training data can be broadly defined as a collection of character image samples, each with an assigned character label identifying the character in the character set that it represents, that provide the information necessary to produce templates according to the character template model defining the templates. Training data, then, includes at least two components: (1) a glyph sample, and (2) its identifying character label. The effectiveness of existing training processes directly depends on the quality and accuracy of the training data, and specifically on the quality of the glyph samples, the correct identification of the character labels to be assigned to the glyph samples, and the assignment of correct labels to appropriate glyph samples.

Good quality glyph samples are those that are substantially unimpaired by missing or extraneous foreground pixels when they are input to the training process. Glyph samples derived from bitmapped images produced from well-known sources such as scanning and faxing processes are subject to being degraded by image noise and distortion which contribute to uncertainty in the actual appearance of the bitmap. A degraded bitmap appearance may be caused by an original document of poor quality, by scanning error, by image skewing, or by similar factors affecting the digitized representation of the image. Particular problems in this regard are the tendencies of characters in text to blur or merge, or to break apart. Such a degraded image will be referred to herein as a "noisy" image. The requirement of good quality glyph samples as an input to existing training processes has generally imposed the limitation that the input image used as the source of glyph samples be relatively non-noisy, or, if noisy images are permitted to be used, that there be some process for removing or otherwise compensating for the noise in the glyph samples.

a. Unsupervised training systems

Recognition systems typically provide distinct training subsystems for the purpose of training the character templates. Training systems may be "supervised" or "unsupervised." Unsupervised training generally involves a two step process of recognition and training. One advantage of many existing unsupervised training systems is that they provide the opportunity to train existing templates using the same image that is used for recognition, toward improving overall recognition accuracy for similar documents in the same font or character set, while eliminating or reducing the direct involvement of a user in the preparation of the training data. Unsupervised training is characterized by the fact that labels for glyph samples are not known prior to the start of the training process; the source of glyph samples is the image being recognized, and the character labels are assigned to the glyph samples as a result of the recognition process. If the recognition process provides an incorrect label for a glyph sample because of its inability to correctly classify the glyph, this will adversely affect the ability of the training process to effectively update the proper character template, unless the label error can be corrected by some manual (user) input to the training process. Unsupervised training is also characterized by the fact that the character templates that provide the character labels for the glyph samples in the training data are the same character templates that are being trained. In general, successful unsupervised training that provides no opportunity to manually correct training data requires a recognition system that has a relatively high degree of accuracy and a set of existing character templates that are of fairly good quality initially in order to be successful and so that the labeling of the glyph samples by the recognition process is substantially free of errors.

The input image from which an unsupervised training process derives its glyph samples is typically a set of isolated glyph samples, or a text line of glyph samples. In some existing unsupervised training systems, the input image is some type of text document image produced by a well-known source process such as scanning or facsimile transmission, in contrast to an image specially prepared for training purposes. In these cases, it can be seen that the quality of the glyph samples would be directly dependent on the quality, i.e. the degree of non-noisiness, of the input image source, or, if noisy images are permitted to be used, on the ability of the recognition process to remove or otherwise compensate for the noise in the glyph samples.

Another characteristic of many existing unsupervised training systems is a consequence of the type of character template model describing the templates being trained. When the character template model is the binary, segmentation-based model, the templates are required to each fit within a bounding box. This typically imposes the same requirement on the glyph samples, which in turn may impose a constraint on the type of input image that may be used in the unsupervised training process. If the glyph samples are to be derived from a text document image, or from a line of text or word image, the glyph samples must occur within the image, line or word either in nonoverlapping bounding boxes, or, if the glyph samples are not so restricted, the recognition process must provide for a way to assign pixels in the image to a specific glyph sample, so that the samples may be isolated, recognition may be performed and character labels may be assigned to the samples. This requirement of the input image will be hereafter described as requiring that the input glyph samples be "segmentable" during the recognition process, either by determining the bounding box around each glyph, or by some other process that assigns pixels to glyph samples. Requiring segmentable glyph samples generally imposes a limitation on the type of text document input image that may be used in an unsupervised training process, since some images may contain glyphs representing characters in fonts or in character sets that do not lend themselves easily to such segmentation. Moreover, even when the samples are segmentable, the effectiveness of the unsupervised training process depends on the ability of the recognition process to correctly segment them, a process that may be adversely affected by factors such as an excessive amount of noise in the input image.

b. Supervised training systems

In the context of this background discussion, existing supervised training is described as a process in which some aspect of the training data is, to some degree, specially prepared by a user for the training process. The characteristics of the training data that are under potential user control in supervised training include either the isolation of the glyph samples, the identification of the character labels to be assigned to the glyph samples, or the actual assignment of the character labels to the glyph samples, or may include all three aspects. Supervised training provides for the opportunity to train new or existing templates using training data over which the user exercises some degree of control with respect to its quality and accuracy. It is often the user's degree of control over the quality of the glyph samples or the accuracy of the character labels assigned to glyph samples versus the amount of automatic preprocessing of the training data that distinguishes one form of existing supervised training system from another. One significant characteristic that distinguishes existing supervised training from most types of existing unsupervised training is that character labels for glyph samples may be provided from a source other than the recognition system being trained.

In one type of existing supervised training system, input glyph samples are required to be "segmented"—that is, isolated, individual, and relatively non-noisy glyph samples—and labeled with the proper character label prior to input to the training process. Typically, software with a user interface for training data preparation permits the user to manually draw bounding boxes around glyph samples in an image, and to assign labels to them, providing the user with complete control of the quality and accuracy of the training data.

One or more of the three aspects of the preparation of the training data may be automated in order to reduce the amount of direct user involvement. For example, the segmentation of the glyph samples and determination of bounding boxes may be an automatic process applied to an entire text document image, or to an image of a line of text or to a word image. The user may have the opportunity to inspect the results of automatic segmentation, correct mis-segmented samples, and assign the character labels to the samples.

In a variation of supervised training for training character templates that are modeled on the segmentation-based model of positioning characters in nonoverlapping bounding boxes, a sequence of unsegmented glyph samples, occurring for example in a line or word of text, is input, along with an ordered sequence of user-prepared character labels, one for each glyph observed in the input glyph sequence, to an automatic process that segments the glyphs into isolated glyph samples within bounding boxes and assigns to each glyph sample the respectively paired character label occurring in the ordered sequence of character labels. In this type of training process, the glyph samples in the input sequence must occur in the image source in nonoverlapping bounding boxes, or the segmentation process must provide for a way to assign pixels in the image source to a specific glyph sample.

2. Image Models

An image model is a characterization or description of the set of possible input images for which a recognition system is designed, provided in a form that can be used to determine which one of the possible images best matches a given input image. An image model represents a priori information about the set of possible input images and is distinguishable from data structures that define a particular input image or contain the results of performing analysis and recognition processing on a particular image.

For example, an image model for individual character images defines the set of possible characters and describes the colors of the pixels in the images of each of the possible characters. A typical form for a character image model is a set of binary or feature templates. An isolated character image model provides a recognition system with the a priori information necessary to determine which character is most likely to correspond to a given input image of an isolated character. Similarly, an image model for isolated text lines might describe the set of possible text line images by specifying the set of possible character sequences within the line and the positioning of the individual character images relative to each other and the text baseline. When used in recognition, a text line image model typically provides the a priori information necessary to determine an output text string that is most likely to correspond to a given observed image of an isolated, but otherwise unsegmented, text line. An image model for a whole page of text might describe the set of possible text line images that can occur and their possible positions relative to each other and to the boundary of the page. When used in recognition, a page image model provides the a priori information required to determine an output sequence of text strings that is most likely to correspond to a given observed input image of a text page.

An image model frequently describes conventional text images, but an image model may be constructed to describe any one of a number of classes of input images, including, for example, images of printed music, images of equations, and images with fixed or known structural features such as business letters, preprinted forms and telephone yellow pages.

a. Formal and informal image models.

For purposes of this discussion herein, image models may also be classified as "informal" and "formal." A formal image model describes the set of possible images using a formal description language, such as a formal grammar or a finite state transition network. A formal grammar is a set of rules that define the allowable formats (syntax) that statements in a specific language are allowed to take. Grammars may be characterized by type as unrestricted, context-sensitive, context-free and regular, and a particular type of grammar may be more or less suited to a specific image model. In a computer implemented system, a formal image model is typically represented as an explicit data structure that defines the possible constituents of the image and their possible positions in the image. As noted above, the image model represents a priori information and is to be distinguished from data structures constructed to represent a particular input image to a recognition system or the results of recognition processing of a particular input image.

For purposes of this background discussion, and for discussing the present invention, an informal image model includes all approaches to describing a set of possible images other than by use of a formal explicit description system. The design of every text recognition system is based on either an explicit or implicit image model. The distinction to be drawn is whether the image model is explicitly and formally stated in a manner that is independent of the processing algorithms that use the model, or whether the model is only represented implicitly, as a body of code that performs image analysis operations. A formal image model, in this regard, is analogous to a formal grammar in a grammar-based character string parsing system which exists as an explicit data structure independent of the code of the parser that uses it.

b. Zero-, one-, and two-dimensional image models

Formal image models may take zero-dimensional (0D), one-dimensional (1D) or two-dimensional (2D) forms. As used herein, a 0D image model describes images of isolated characters. The most common types of 0D image model are binary and feature-based character templates, as noted above. A 1D image model, as that term is used here, is distinguishable from a 0D model in that the 1D image model defines the structure and appearance of a sequence of character images, such as a word or an entire text line, including the appearance and positioning of the individual characters in the line, whereas a 0D image model only describes individual characters. A 1D image model typically includes some type of 0D image model for the constituent characters. A primary application of explicit 1D image models is in text line recognition systems that do not attempt to segment the text line into individual character images prior to recognition. The character and text line models used in such systems typically resemble the kinds of models used in speech recognition systems based on hidden Markov models, or simple extensions to such models.

A 2D image model, as that term is used herein, is distinguishable from a 1D image model in that the 2D image model typically defines the recognition process for an entire 2D image by describing how 2D subregions in the image are related to each other, without isolating 1D lines of text or individually segmenting character or word instances in the image in a distinct process prior to recognition. The use of a 2D image model for recognition provides the opportunity to eliminate the pre-recognition step of character, word or text line isolation or segmentation.

3. Training systems

H. S. Baird, in "A Self-Correcting 100-Font Classifier" (SPIE Vol. 2181 Document Recognition 1994) discloses an approach to the training of feature templates for a polyfont recognizer that uses a 0D image model, as that term is defined and used herein. Baird discloses a self-correction method in which a polyfont classifier that is capable of recognizing any of 100 typefaces moderately well is able to specialize itself automatically to the single, but otherwise unknown, typeface that it is reading. The method requires a polyfont classifier capable of distinguishing among N character (symbol) classes, $\{c_i\}_{i=1,N}$, across a large number of typefaces with "reasonably good" accuracy, and further requires a classifier technology that is trainable on isolated sample character images labeled with classes. The classifier is completely specified by a set of feature prototypes (templates), T, and the statistics stored in them have been estimated during an offline training phase from sample images labeled with true classes. During self-correction the same training procedure is used to estimate new prototypes from relabeled training samples. The self-correction method additionally takes as an input a set of isolated symbol images, I, whose class labels are unknown. The method is described as having three steps: (1) reading the sample set I, and classifying each symbol image in I using the given classifier's set of prototypes, T; the classifier reports a top choice class for each symbol image; each of these reported classes becomes part of a retraining set of images; (2) for each class in N, estimating a new class prototype in I using the retraining set of images, assuming that the classifier's top-choice classes are the true classes; and (3) reclassifying each image I using the classifier's new class prototype in T. The method recognizes that the classifier's identified top-choice classes in step 2 may not be accurate, and so retraining is accomplished using imperfectly labeled samples. Baird also discloses that retraining can be iterated. Baird's template training system is a form of unsupervised learning that requires that the image samples be isolated prior to inputting to the classifying and training processes. The segmentation method is not disclosed.

S. Kuo and O. E. Agazzi, in "Keyword spotting in poorly printed documents using pseudo 2D hidden Markov models," *IEEE Transactions on Pattern Analysis and Machine Intelligence*, Vol. 16, No. 8, Aug., 1994, pp. 842–848 (hereafter, Kuo et al.,) disclose an algorithm for robust machine recognition of keywords embedded in a poorly printed document. Kuo et al. disclose at pg. 842, col. 2, that the recognizer accepts 1D word images for classifying as keywords, since the recognizer assumes that page processing has been performed, and that the word image to be recognized has been isolated for presentation to the recognizer. The templates, referred to as models, represent a set of known keywords that are to be matched. For each keyword model, two statistical models, named "pseudo 2D Hidden Markov Models", or "PHHMs," are created for representing the actual keyword and all other extraneous words, respectively. In the context of the terminology presented herein, the PHHM representing a keyword template is a formal 1D image model. Kuo et al. disclose at pg. 844 that parameters for the keyword models are trained from a training set that contains, for each model, the same keyword with different levels of degradation, represented as a feature vector called an observation sequence. Kuo et al. disclose, in the discussion of the training process at pg. 845 and in FIG. 1, that features are extracted from segments of word image samples. Kuo et al. appear to disclose an unsupervised training process, with the recognizer both segmenting an input keyword image sample into image segments, and providing labels for the image segments.

Feature-based template training in the context of a 1D image model for use in recognizing strings of characters (e.g., words), independent of character boundary information, is disclosed in C. Bose and S. Kuo, "Connected and degraded text recognition using hidden Markov model," in *Proceedings of the International Conference on Pattern Recognition*, Netherlands, September 1992, pp. 116–119. The recognition method disclosed therein assumes that page-level processing using known algorithms is done prior to the training step and that isolated word or line images are presented to the recognizer, which is based on a formal 1D model expressed as a hidden Markov model. During recognition, sub-character segmentation is performed to identify segment strokes, and segment boundaries partition the original pixel map into individual segment maps which are used for identifying features within the segment for matching against feature templates for individual characters. A supervised training process is disclosed that appears to be based on a 0D model of training individual feature-based templates each expressed as a hidden Markov model, since it is disclosed at pg. 117, first column, that the training process uses nonoverlapping training character samples to train the observation and state transition probabilities of the hidden Markov model representing each character template. It is not disclosed how character labels are provided.

U.S. Pat. Nos. 5,020,112 and 5,321,773 disclose recognition systems based on formal 2D image models. U.S. Pat. No. 5,020,112, entitled "Image Recognition Using Two-Dimensional Stochastic Grammars" and issued to P. A. Chou, one of the inventors herein, discloses a method of identifying bitmapped image objects using a 2D image model based on a 2D stochastic, context-free grammar. This system is also discussed in an article by P. A. Chou, entitled "Recognition of Equations Using a Two-Dimensional Stochastic Context-Free Grammar," in SPIE, Vol. 1199, *Visual Communications and Image Processing IV*, 1989, pp. 852–863. U.S. Pat. No. 5,020,112 discloses an object template library that contains a number of n×m bitmapped templates of all of the image objects of possible interest, each having an associated probability of occurrence in the image; a lexical analyzer produces a list of image objects and their locations in the image by comparing rectangular subdivisions in the image, i.e., each n×m area of the image, to each n×m template in the template library; each object in the list has a significant probability of appearing in the input image. The image glyphs, therefore, are required to be substantially segmentable in the sense that their bounding boxes may not overlap significantly. The formal 2D image model is represented as a stochastic 2D grammar having production rules that define spatial relationships between objects in the image according to this rectangular image model; the grammar is used to parse the list of objects to determine the one of the possible parse trees that has the largest probability of occurrence. The term "stochastic" when used in this context refers to the use of probabilities associated with the possible parsing of a statement to deal with real world situations characterized by noise, distortion and uncertainty. The training, or re-estimation, of the probabilities associated with the templates in the object template library is disclosed at cols. 9–10. The training process is unsupervised, with the recognition process isolating the image samples to be used for training from an original input image, and assigning character labels to the segmented image samples based on their classification by the recognizer. Because the template model is a segmentation-based model, in the context of the terminology used in this discussion, the 2D image model describes a set of possible images that each must contain substantially segmentable image objects, each of which must be able to be substantially contained in a nonoverlapping bounding box. As with other unsupervised training processes, successful training is dependent on the recognizer being able to correctly isolate the image sample, and to assign a correct label to the isolated sample, which in turn would seem to require reasonably good quality current templates. The training process does not provide for the ability to manually input corrections to misclassified samples.

U.S. Pat. No. 5,321,773, issued to G. Kopec and P. A. Chou, inventors herein, and entitled "Image Recognition Method Using Finite State Networks" discloses a formal 2D image model represented as a stochastic finite state transition network that defines image generation in terms of a regular grammar, in contrast to the context-free grammar used in U.S. Pat. No. 5,020,112. As noted in col. 1, this has significant implications with respect to the computational consequences of parsing time, with the decoding time for a regular grammar being O(n), where n is the number of pixels in the image, while the parsing time for a context-free grammar is $O(n^3)$. As noted above in the discussion of character template models, the template model described by the 2D image model defines the sidebearing model of letterform shape description and positioning, where character positioning does not depend on determining rectangular bounding boxes for character images; pairs of adjacent character images are positioned with respect to their image origin positions to permit overlapping rectangular bounding boxes as long as the foreground (e.g., black) pixels of one character are not shared with, or common with, the foreground pixels of the adjacent character. The 2D image model and the template model are also discussed in G. Kopec and P. Chou, "Document Image Decoding Using Markov Source Models," in *IEEE Transactions on Pattern Analysis and Machine Intelligence*, June, 1994, pp. 602–617 (hereafter, "Kopec and Chou, 'Document Image Decoding'".)

Training of the character templates used in U.S. Pat. No. 5,321,773 involves estimating or computing specific typographic characteristics, or parameters, that are required for proper template positioning; these are known as character sidebearings and baseline depths, collectively called font metrics. These characteristics of the sidebearing model are illustrated in FIGS. 3(a) and (b) of U.S. Pat. No. 5,321,773, and in FIGS. 2(a) and (b) of Kopec and Chou, "Document Image Decoding," and are reproduced herein for convenience as FIG. 1. As disclosed in Kopec and Chou, "Document Image Decoding," the shape of a glyph is defined in terms of a local coordinate system aligned so that the typographic origin of the glyph is at (0,0), shown by crosses 2, 5 and 6 in FIG. 1. The character "set width" of a glyph is defined in terms of glyph origin positions, and is the vector displacement $\Delta=(\Delta x, \Delta y)$ from the glyph origin position of a first glyph to the point at which the origin of a second adjacent glyph is normally placed when imaging consecutive characters. In most Indo-European alphabets, including Roman, $\Delta x>0$ and $\Delta y=0$. In FIG. 1, the character set width of the letter "e" is denoted by displacement $\Delta x$. In other writing systems, however, $\Delta x$ can be negative (e.g., Semitic) or $\Delta y$ can be nonzero (e.g., Oriental glyphs.) When $\Delta y=\alpha\Delta x$ for some $\alpha$, the glyph origins in a line of text are colinear and define the baseline 4 of the text line. The bounding box 3 of a glyph is the smallest rectangle, oriented with the character coordinate axes, that just encloses the glyph. It can be seen from FIG. 1 that a typographic glyph image origin position is not necessarily coextensive with an x,y position of the bounding box; FIG. 1 shows glyph image origin position 5 for the glyph "e" outside bounding box 3, and glyph image origin position 6 for the glyph "j" inside bounding box 8. The "width" of the character, a character measurement distinguishable from set width, is the corresponding dimension w of the bounding box, as shown in FIG. 1. (It is worth noting that some discussions in the computer typesetting art of the sidebearing model of character positioning refer to the measurement called "set width" herein as "width".) The left sidebearing is the horizontal displacement $\lambda$ from the origin of the glyph to the left edge of the bounding box. Similarly, the right sidebearing is the horizontal displacement $\rho$ from the right edge of the bounding box to the origin of the next glyph. One or both of the sidebearings can be negative. For example, the left sidebearing of "j" in FIG. 1 is negative, with the result that the bounding boxes 7 and 8 of the "b" and "j" glyphs respectively overlap.

U.S. Pat. No. 5,321,773 discloses the training of the character templates at col. 11–17, and the training process is further described in G. Kopec, "Least-Squares Font Metric Estimation from Images," in *IEEE Transactions on Image Processing*, October, 1993, pp. 510–519 (hereafter, "Kopec, 'Font Metric Estimation'".) The supervised training technique disclosed used a specially-prepared input image, shown in FIG. 14 of the patent, and in FIG. 3 of Kopec, "Font Metric Estimation" in which the glyph samples were segmentable. The samples were subjected to a pre-training segmentation step described at pg. 516 in Kopec, "Font Metric Estimation" in which the text lines and individual characters within each line of a font sample page were extracted using simple connected component-based analysis procedures of a text image editor. The text image editor required the input image of samples to be a single column of Roman text laid out in distinct horizontal lines separated by white space. In order to minimize segmentation problems, the character set width of each glyph sample in the input image was increased by 1.5 pt (6.25 pixels at 300 dpi) when the samples were created. This additional set width is observable as increased horizontal white space between the glyphs in FIG. 14 of the patent. Each glyph sample isolated by the text image editor was labeled using a manually prepared text transcription of the sample page that included ordered character labels identifying the samples, paired on a one-for-one basis with the glyph samples in the input image.

As noted in the discussion above of the sidebearing model, a glyph origin position is not necessarily coextensive with an x,y position of the glyph bounding box; segmentation of the glyph samples by the text image editor, however, did not appear to explicitly provide a glyph origin position for each sample. If accurate glyph image origin positions and glyph bounding boxes were available and known for each glyph sample, computing sidebearing and baseline parameters would be straightforward. In the absence of this data, a technique for estimating the font metrics of left and right sidebearings and baseline from the bounding boxes alone is disclosed in U.S. Pat. No. 5,321,773 at cols. 11–17 in the sections entitled "Font Metrics" and "Least Squares Estimation Procedure." As explained in Kopec, "Font Metric Estimation" at pp. 513–514, this estimation procedure required that a sufficient number of pairs of samples occur in the glyph sample image source to ensure that right and left sidebearing estimations would be properly computed using the estimation equations.

The supervised training technique disclosed in U.S. Pat. No. 5,321,773 and in Kopec, "Font Metric Estimation" is a manually intensive procedure. It requires that glyph samples be segmentable in the image source in which they occur, while the template model of the templates being trained requires that a pair of adjacently positioned character images of the templates need only have substantially disjoint supports. It would appear, then, that some document images having character images positioned according to the sidebearing model could not themselves be used as sources of glyph samples for training, and glyph samples for training would need to be specially prepared. Without glyph image origin position data, the font metrics may only be estimated using this procedure because information from which to measure them more accurately—the x,y coordinate glyph image origin positions of the sample glyphs—is not directly available from the training data.

SUMMARY OF THE INVENTION

The present invention is based on the premise that a font-specific recognition system provides consistently higher recognition accuracy than a polyfont recognition system for documents that include character images that are predominantly in a specific font. To achieve maximum generality, polyfont recognition systems, also called "omnifont" systems, typically attempt to perform recognition using feature-based templates without particular sensitivity to specific typefaces, fonts or their type style variations. However, insensitivity to font can reduce accuracy if it prevents a recognition system from adapting to text that is predominantly or entirely in a single font, and the recognition accuracy of a single recognition system may vary widely for different documents each having a different font or for a single document having multiple fonts. Despite their generally higher degree of accuracy, however, font-specific recognition systems have been considered to be of limited usefulness and generality primarily because such systems were not easily able to be generalized to new fonts as a consequence of the need to train templates in each new font, and the need, in turn, for considerable user involvement in the preparation of the training data for the template training process; the higher accuracy of such systems has been perceived to be outweighed by reduced productivity from their use when a new template set needed to be trained.

The present invention is based on the further premise that font-specific recognition systems could be a viable alternative to omnifont recognition systems if template training methods and systems existed that could accurately train templates for specific fonts while minimizing user intervention or involvement in the template training process without sacrificing user control over the quality and accuracy of the training data.

The novel template training technique of the present invention minimizes the user's involvement in all three aspects of training data preparation by using a two-dimensional (2D) image of a text document as the source of the glyph samples to be used for training; by using an unrestricted form of a transcription as a source of information about the labeling of the glyph samples; and by using a formal 2D image model as an explicit input to the training process that defines the relationship between the glyph samples in the 2D image and the information in the transcription so that substantially correct character labels are assigned to appropriate glyph samples. In fact, the training technique may be implemented in a manner that eliminates substantially all user involvement in training data preparation apart from providing the 2D image source of glyphs and a transcription associated with that 2D image, effectively resulting in the templates being automatically produced.

The present invention is based on the discovery that the use of a formal 2D image model as an explicit input to the training process provides the opportunity to use images of existing text documents as the source of glyph samples for template training, thus eliminating the need for a user to manually design and prepare a specific image of samples. The formal 2D image model represents a priori information about the set of possible 2D input images that are accepted as input to the training process. An important benefit of using an explicit formal 2D image model is that it provides for flexibility and detail in describing the set of possible 2D input images from which glyph samples for training are obtained, which in turn means that a wide variety of existing text document images may be used for training. For example, the model may include descriptions for non-glyph portions of the input image which do not contain glyph samples and therefore do not participate in the training process, thus permitting the use of text document input images having graphical or photographic images, or image portions of constant content such as that found in forms. A significant and unique advantage of the training technique of the present invention over existing training techniques is that the use of a text document image as the source of glyph samples for training eliminates the need for prior segmentation or isolation of glyph samples or lines of text in the 2D input image. The training process uses the information provided by the 2D image model to locate the positions of glyph samples in the input 2D image, thus reducing user involvement in training data preparation in supervised training systems where glyph sample segmentation is normally done manually by a user from a document image.

In the training technique of the present invention, the formal 2D image model, and specifically the character template model for the templates being trained, determines whether the text document image source of glyph samples must include segmentable glyph samples. When the formal 2D image model describes the template model as being a segmentation-based model, the 2D image model describes a set of possible 2D input images in which the glyph samples are segmentable, and for which bounding boxes for the glyph samples are required not to overlap. When the formal 2D image model describes the template model as being a non-segmentation-based model such as the sidebearing model described above, the 2D image model may describe a set of possible 2D input images in which the glyph samples need not be segmentable, and in which bounding boxes for the glyph samples are allowed to overlap, thereby further expanding the class of existing text document images that may be used as possible sources of the glyph samples.

A further benefit of using a 2D formal image model that is explicitly defined as an input to the training procedure is that the type (e.g., structural appearance) of text document images that may be used as the source of glyph samples for training may be changed by simply changing the formal 2D image model to reflect information about a new type of image; there is no need to rewrite the instructions that carry out the training process when the type of input image changes. The implication of this feature is that training a set of templates in a new font is a relatively straightforward process because the input of a new type of document image containing the glyph samples in the font needed for training is easily accommodated. Existing recognition systems make assumptions about the input images that may be recognized or that may be used for training, or incorporate a model of the input image, directly in the instructions that carry out the recognition or training processes; any change in the structural characteristics of the input image must then result in changes to the program code of the recognition or training systems. The present invention places the detailed information about the input 2D image source of glyph samples in an input data structure that, in a particular implementation, may be made accessible to a user.

The present invention is based on the further discovery that the use of a transcription in a flexibly defined and unrestricted form as an input to the training process provides the opportunity for the user to exercise explicit control over the labeling of the glyph samples that are used in template training, without requiring the user to explicitly prepare a specific transcription or to explicitly assign character labels to specific glyph samples. The training technique may be implemented in such a manner as to permit the user to prepare a literal transcription that results in correct character labels being assigned to specific glyph samples, but the technique may be implemented in a much more general manner so as to permit the user to merely select a suitable transcription that contains the information needed by the formal 2D image model to map character labels to glyph samples.

Another important advantage of the training technique of the present invention over existing training techniques is that the present invention provides for the use of a wider range of transcription types for training purposes than the one-for-one sequence of character labels used in conventional supervised training systems. In its simplest form, the transcription may be a string of transcription labels each indicating a character label, and each of which respectively pairs with a glyph sample in the 2D input image in a one-for-one pairing. Providing such a transcription would merely require a typist to enter a string of text that represents the glyph samples in the 2D input image. However, the transcription is not restricted to such a one-for-one correspondence of character labels paired with glyph samples. The transcription may, in fact, contain information that is not represented by glyphs in the text line image with which the transcription is associated. For example, the transcription may contain markup information, known as tags, that identify structural pieces of the document for a document processing, formatting or word processing application; this type of transcription is referred to herein as a "tag transcription." Conversely, the 2D input image may contain glyphs that are not represented by transcription character label information in the transcription that is associated with the 2D input image. The transcription input to the training technique may also be a set of transcriptions, each of which indicates alternative recognition information about the input 2D image which the invention uses to assign character labels to glyph samples. The technique also accommodates an input transcription containing errors in the transcription information, such as may be produced by the output of a recognition system. The flexibility in the form the transcription takes permits the user to select a transcription that is the output of a recognition system as input to the training process, usually without needing to manually revise its contents in any way. For example, as more sophisticated document layout analysis operations are included in recognition systems, tag transcriptions are increasingly available as the output of a recognition operation performed on a text image. Thus, such transcriptions serve as ready sources of glyph labels for glyph samples, and require no further modification by the user in the training technique of the present invention. It is the explicit, formal 2D image source model that establishes the relationship between transcription information, such as tags, and individual glyph samples in the 2D image, and that maps the glyph samples to appropriate character labels identifying the glyph samples.

The technique of the present invention is not limited in its use to the retraining of existing templates, although it can be used for this purpose. The training process does not require a current set of character templates in order to produce trained character templates, and is generally suitable for training a first set of character templates for use in a subsequent recognition process. The formal 2D image model may be designed to provide minimal a priori information about the data content of an initial set of templates for use in training. In one implementation of the present invention, the training technique creates an initial set of very general character templates, each of which is composed of a rectangular region of foreground pixels.

Therefore, in accordance with the present invention, a method of operating a machine to train a plurality of character templates is provided. The machine operated by the method includes a memory device for storing data, including instruction data, and a processor connected for accessing the data stored in the memory, and for executing the instructions to operate the machine. The method uses as input an image definition data structure defining a two-dimensional image source including a plurality of glyphs, referred to as a 2D image source of glyph samples, having a vertical dimension size larger than a single horizontal line. Each glyph included in the 2D image source of glyph samples is an image instance of a respective one of a plurality of characters in a character set, referred to as a glyph sample character set. Each one of the plurality of character templates being trained represents a respective one of the plurality of characters in the glyph sample character set, and is identified by a character label data item indicating the respective character in the glyph sample character set. The method also uses as input a two-dimensional image source model data structure, referred to as a 2D image source model, that models as a grammar the spatial image structure of a set of two-dimensional (2D) images. The 2D image source of glyph samples is one of the set of 2D images modeled by the 2D image source model. The 2D image source model includes spatial positioning data that models the spatial positioning of the plurality of glyphs occurring in the 2D image source of glyph samples, and includes mapping data that maps a respective one of the glyphs occurring in the 2D image source of glyph samples to the glyph label indicating the character in the glyph sample character set. The template training method further uses as input a transcription data structure, referred to as a transcription, that is associated with the 2D image source of glyph samples and that includes an ordered arrangement of transcription label data items, hereafter referred to as transcription labels. The method comprises operating the processor to determine at least one glyph sample occurring in the 2D image source of glyph samples using the spatial positioning data included in the 2D image source model. The method further comprises operating the processor to produce a glyph label data item, referred to as a glyph label, to be paired with the at least one glyph sample occurring in the 2D image source of glyph samples, that indicates the respective one of the characters in the glyph sample character set represented by the paired glyph sample; the processor uses the mapping data included in the 2D image source model and the transcription to pair the glyph label with the at least one glyph sample. The method then includes operating the processor to produce one of the plurality of character templates indicating a respective one of the characters in the glyph sample character set using the at least one glyph sample occurring in the 2D image source of glyph samples identified by the paired glyph label that matches the character label of the bitmapped character template. Examples of the labeled glyph samples produced by the present invention include isolated, labeled character images; bounding boxes specified around glyph samples in image sources, each labeled with a character label; and 2D regions of the input image with origin positions of glyph samples identified, each labeled with a character label.

In accordance with another aspect of the present invention, a machine for use in training a plurality of character templates for use in a recognition operation is provided that comprises a first signal source for providing image definition data defining a first image; image input circuitry connected for receiving the image definition data defining the first image from the first signal source; a second signal source for providing non-image data; input circuitry connected for receiving the non-image data from the second signal source; a processor connected for receiving the image definition data defining the first image from the image input circuitry and for receiving the non-image data from the input circuitry; and memory for storing data. The data stored in the machine memory includes instruction data indicating instructions the processor can execute, and the processor is further connected for accessing the data stored in the memory. The processor, in executing the instructions stored in memory, receives from the image input circuitry an image definition data structure defining the 2D image source of glyph samples previously described and receives from the input circuitry the transcription data structure previously described. The processor, further in executing the instructions, receives from the input circuitry a two-dimensional image source model data structure, referred to as a 2D image source model, previously described. The processor, further in executing the instructions, performs operations that carry out the method steps previously described for determining the plurality of glyph samples occurring in the 2D image source of glyph samples, and for producing the glyph label data item paired with each respective one of the plurality of glyph samples that indicates a respective one of the characters in the glyph sample character set. The processor, further in executing the instructions, then produces the plurality of character templates using the glyph samples paired with respective ones of the glyph labels, as previously described.

An important advantage of the training technique of the present invention is its specific application to the training of character templates defined by a template model, such as the sidebearing model of letterform shape description and positioning, that requires identification of the origin positions of the character images in addition to or in place of identification of the bounding boxes of the character images. This aspect of the present invention is based on the discovery that training character templates based on the sidebearing character template model may be effectively accomplished knowing only the image origin positions of the glyph samples occurring in the 2D image, and need not also depend on determining a bounding box around a glyph sample to identify the pixels that are to be included in a particular character template. One implementation of the training technique of the present invention, therefore, is a two step process; the first step uses the formal 2D image model and the transcription to identify the image origin positions of glyph samples in the 2D input image and to assign character labels to the glyph sample image origin positions. This implementation determines the image origin positions of the glyph samples without having any information in advance of training about where the glyph samples occur in the 2D input image.

In the second step of this implementation, the labeled glyph origin positions that are the output of the first step are then input to a novel template construction process that produces the trained templates. In existing training systems that train binary character templates, segmentation of the glyph samples through the use of bounding boxes allow for a relatively straightforward determination of the character template from multiple, isolated samples of the character, typically by using a well-known pixel averaging process. In the training technique of the present invention, only glyph origin positions of the glyph samples are determined, and segmentation of glyph samples in the 2D input image by determining bounding boxes around them need not be done. Therefore, existing bitmap averaging techniques that depend on knowing glyph sample boundaries cannot be used. The technique of the present invention produces a binary character template from information about only the image origin positions of the glyph samples using a novel template construction technique that essentially combines the functional result of glyph segmentation with the actual construction of the bitmapped templates. In this technique, an array of template pixel positions, called a template image region, having vertical and horizontal dimensions suitable for storing a binary character template, is produced for each character template to be trained, and used to determine, for each character template, sample image regions in the 2D input image, each containing one of the glyph samples for the respective character template. A template image region includes a template pixel position designated as the template origin position, and a sample image region in the 2D input image containing a glyph sample is determined relative to the local coordinate system of the template image region such that the image origin position of a glyph sample has the same relative pixel position in the sample image region as the pixel position of the template origin position in the template image region. All of the sample image regions indicating the same respective one of the characters in the glyph sample character set is called a collection of sample image regions, and each sample image region in the collection is aligned with all others, and with the template for that character, at the image origin position. The binary character templates are then produced substantially contemporaneously from the collections of the aligned sample image regions for each character template by assigning foreground pixel color values to template pixel positions in selected ones of the template image regions that are selected on the basis of template contribution measurements computed using respectively paired aligned sample pixel positions included in sample image regions.

There are several benefits and advantages that result from the training technique of the present invention as applied to training character templates described by a character template model that uses character image origin positions for character positioning. The explicit formal 2D image model that provides the a priori information about the 2D input image source of glyphs minimizes interference from noise in the input image in the process of locating the glyph image origin positions of the glyph samples. Moreover, elimination of a segmentation step prior to template construction eliminates segmentation errors introduced when performing segmentation on a noisy image, and so permits images of existing text documents of varying quality to be used as sources of glyph samples. The novel template construction process successfully handles blurred, broken and merged glyph samples that occur in noisy images, or merged glyph samples that naturally occur in a font in which character images have been designed to be connected. Since the template construction process uses multiple glyph samples that occur in the text of the 2D input image and produces the templates substantially contemporaneously, extraneous or missing dark pixels that occur in one or two blurred, broken or merged samples resulting from noise in the image are less likely to affect the quality of the character templates trained when these low quality samples are processed with other non-noisy and higher quality samples. Moreover, since this novel template construction method does not require that an actual bounding box for each glyph sample be found, a potentially wider range of symbol sets, alphabets and character fonts that do not easily lend themselves to segmentation may be accommodated by the training technique of the present invention, which in turn permits a wide variety of images of existing text documents to be used as sources of glyph samples.

In one implementation of the training technique of the present invention, the formal 2D image model, which describes the structure of a set of possible images that may serve as the source of glyph samples for training, is represented as a Markov source having the form of a finite state transition network that includes a series of nodes and transitions between pairs of nodes. Associated with each transition in the network are transition data items that include a character template, a message string, a transition probability and a vector displacement. A set of transcriptions, from which information about the character labels to be assigned to the glyph samples can be derived, is also represented as a finite state transition network in which each transition corresponds to a possible transcription label for the alternative transcriptions. One or more transcription labels are related to the message string(s) associated with transition(s) in the formal 2D image model such that the formal 2D image model together with the input set of transcriptions describes a relatively small set of possible input images. The training technique uses the formal 2D image model to find the set of transitions that present the best path through the 2D image model as constrained by the set of transcriptions. The image origin position of each glyph sample along with a respective character label for that sample is identified from the sequence of transitions that form the best path, and this labeled glyph image origin positions data is then used as input to the novel template construction process described above.

Therefore, in accordance with another aspect of the present invention, there is provided a method of operating a machine that includes a processor and a memory device for storing data. The data stored in the memory device includes instruction data the processor executes to operate the machine, and the processor is connected to the memory device for accessing the data stored in the memory. The method comprises operating the processor to receive and store in machine memory the same 2D image source of glyph samples and transcription data structure that have been previously described. The method further comprises operating the processor to store in memory a stochastic finite state network data structure, referred to as a 2D image source network, that models a first one of a set of 2D images having a common spatial image structure and including a plurality of glyphs as at least one image path through the 2D image source network that indicates an ideal image consistent with the spatial image structure of the first image. The image path indicates path data items associated with it that are accessible by the processor and that indicate image origin positions and glyph labels paired with the image origin positions of respective ones of the plurality of glyphs included in the first image. The 2D image source of glyph samples is one of the images included in the set of 2D images modeled by the 2D image source network. The method further comprises operating the processor to produce a finite state network data structure, referred to as a transcription network, using the transcription data structure. The transcription network models the transcription as a series of transcription nodes and a sequence of transitions between pairs of the transcription nodes. Each transition has a transcription label associated with it, and at least one sequence of transitions, called a transcription path, through the transcription network indicates the ordered arrangement of the transcription labels in the transcription. The method further comprises operating the processor to merge the 2D image source network with the transcription network to produce a transcription image network data structure, referred to as a transcription image network. The transcription image network is a modified form of the 2D image source network wherein, when the transcription is associated with a first image, the transcription image network is capable of modeling the first image as a complete transcription-image path through the transcription image network indicating an ideal image consistent with the spatial image structure of the first image. The path data items associated with an image path through the 2D image source network are the same path data items associated with a transcription-image path; after merging the two networks, the path data items indicated by the complete transcription-image path indicate a sequence of message strings consistent with the ordered arrangement of the transcription labels indicated by the transcription path through the transcription network. After merging the two networks, the processor is then operated to perform a decoding operation on the 2D image source of glyph samples using the transcription image network to produce at least one complete transcription-image path indicating an ideal image consistent with the spatial image structure of the 2D image source of glyph samples. Next, a 2D image position in the 2D image source of glyph samples indicating an image origin position and a glyph label paired therewith for each glyph sample in the 2D image source of glyph samples is obtained using the path data items associated with the complete transcription-image path. Each image origin position and the glyph label paired with it are referred to collectively as a labeled glyph position of a glyph sample. The method then further includes operating the processor to produce the plurality of binary character templates using the 2D image source of glyph samples and the labeled glyph positions of the glyph samples occurring therein. The glyph samples to be used for training the binary character templates are identified by the glyph labels respectively paired with each image origin position.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts and acts.

BRIEF DESCRIPTION OF THE DRAWINGS

FIG. 5 illustrates another example of a transcription data structure for a portion of a dictionary that is suitable for use as an input transcription to the training technique of the present invention;

FIG. 6 shows the 2D image of the dictionary page for which FIG. 6 is the transcription;

FIG. 25 presents an image of a collection of sample image regions clipped from the 2D input image for use in training a template according to the illustrated implementation of the the present invention;

FIG. 29 illustrates a 2D image of a plurality of glyphs in a Gothic typeface for use as a source of glyph samples for training character templates in that typeface according to the present invention;

DESCRIPTION OF THE EMBODIMENTS

Figure 1:
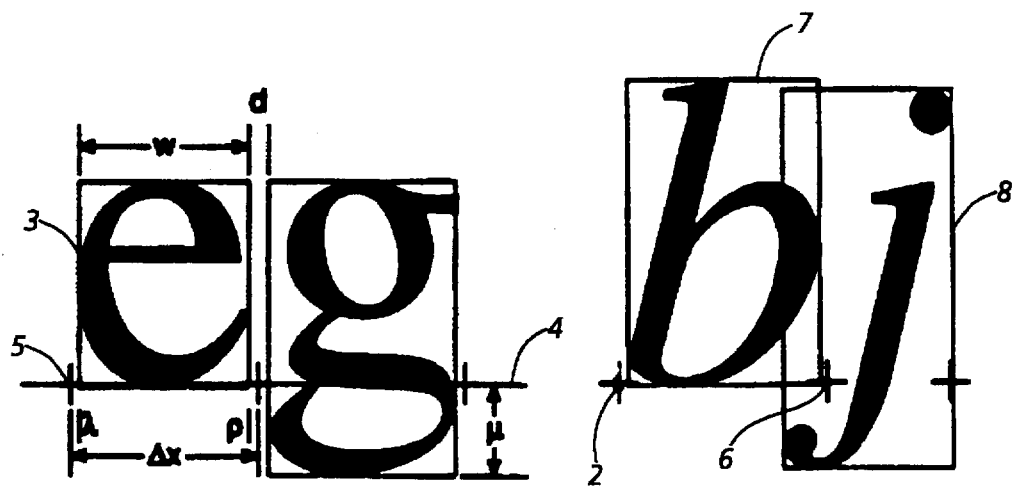
FIG. 1 illustrates a simplified version of the sidebearing model of letterform shape description and positioning.

While the present invention will be hereinafter described in connection with an illustrated embodiment, it will be understood that it is not intended to limit the invention to that embodiment. On the contrary, it is intended to cover all alternatives, modifications and equivalents as may be included within the scope of the invention as defined by the appended claims.

The remainder of this description has the organization shown in Table 1 below:

TABLE 1

A. Conceptual Framework and Definitions.
 1. Data, images and system components.
 2. Character, character code, and input 2D image source of glyph samples.
 3. Character templates.
 4. Transcriptions and formal transcription models.
 5. The formal 2D image source model.
B. General Features.
 1. Input data structures.
 2. Overview of the training technique.
C. An illustrated implementation of the training technique.
 1. Implementation data flow and steps.
 2. The 2D image source model represented as a stochastic finite state transition network.
 3. The transcription network.
 4. Merging the transcription network with the 2D image source image network.
 5. Decoding the 2D image source of glyph samples to produce labeled glyph sample image origin positions.
 6. Template construction from training data composed of labeled glyph sample image origin positions.
  a. Creating template image regions for storing templates.
  b. Identifying sample image regions in the 2D input image.
  c. Mathematical foundation for constructing templates from aligned sample image regions using template pixel contribution measurements.
  d. Constructing templates contemporaneously from the sample image regions.
 7. Determining character set widths for constructed templates.
 8. Iterating decoding and backtracing steps with the current set of character templates produced from the template construction step.
D. Application of the Character Template Training Technique to the Text Line Image Envrionment.
 1. Two character template training domains in the text line image environment.
 2. Definition and examples of the text line image source model.
  a. Mathematical principles.
  b. User-directed implementation of the training technique in the 1D image environment.
  c. Obtaining a text line image source model from a 2D image source model.
 3. An illustrated implementation of character template training carried out in the 1D image environment.
E. Using a Tag Transcription as a Source of Glyph Labels.
 1. Relationship of the transcription to the image source network.
 2. Examples of an image source model that accommodates a tag transcription and a tag transcription network.
 3. Merging a tag transcription network with an image source model.
F. The Machine Configuration.
G. Additional Considerations.
 1. Efficiency considerations.
 2. Modeling horizontal white space as a template in the image source model.
 3. Initial Character Templates.
 4. Interaction with a machine user.

A. Conceptual Framework and Definitions

The following terms and discussion provide the framework for describing the claimed invention as illustrated in the accompanying drawings. The terms defined below have the meanings indicated below throughout this specification and in the claims. In the event that these terms are defined in other sources, such as, for example, in documents that are incorporated by reference herein elsewhere in this description, the definitions below take precedence over definitions found elsewhere.

1. Data, images and system components

Figure 3:
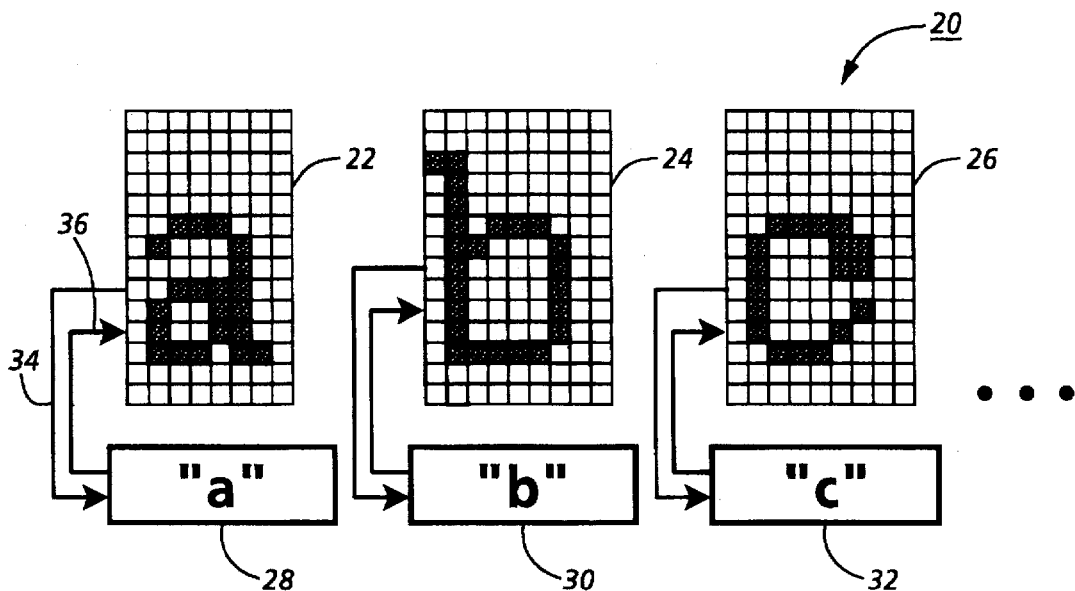
FIG. 3 illustrates an example of a character template data structure produced by the present invention.

The term "data" or "data item" refers herein to physical signals that indicate or include information. Data items can be combined into a "data structure" such that the data structure "includes" the combined data items; thus, a "data structure" is any combination of interrelated data. A data structure may also include other data structures. An item of data "indicates" a thing, an event, or a characteristic when the item has a value that depends on the existence or occurrence of the thing, event, or characteristic or on a measure of the thing, event, or characteristic. For example, in FIG. 3, character label data item 28 in character template data structure 20 indicates the character code for the character "a." A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, directed arrow 36 in FIG. 3 shows that character label data item 28 in character template data structure 20 indicates character template 22, which depicts an image of the character "a." An item of data "identifies" or "is an identifier of" one of a set of identifiable items if the item of data is one of a set of items of data, each of which can be mapped to at most one of the identifiable items. For example, in FIG. 3, character label data item 28 may be said to identify character template 22.

A "processor-controlled machine" or "processor" is any machine, component or system that can process data, and may include one or more central processing units or other processing components. Any two components of a machine or system are "connected" when there is a combination of circuitry that can transfer data from one of the components to the other. "Scanning circuitry," for example, is circuitry that can receive an image by a scanning operation, such as by scanning a physical document, and provide data defining a version of the image. A "scanning device" is an input device that includes scanning circuitry. "User interface circuitry" is circuitry that can provide data indicating the occurrence of a user action. A "user input device" is an input device that includes user interface circuitry, such as a keyboard, a mouse or a stylus device.

Figure 2:
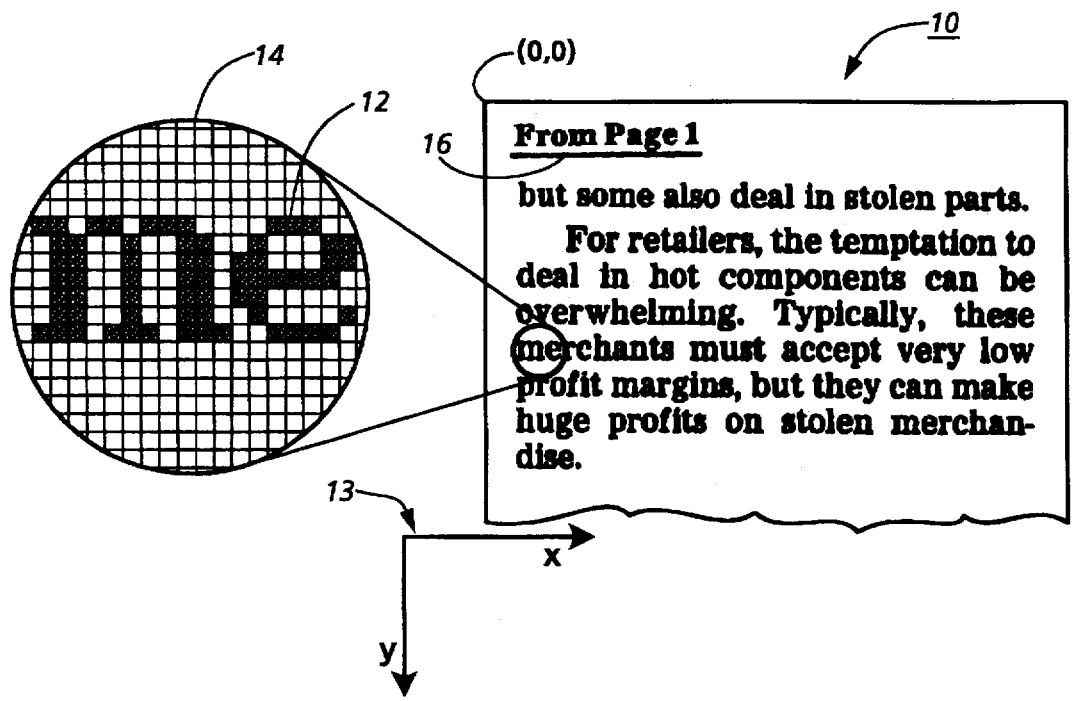
FIG. 2 illustrates a 2D image of a plurality of glyphs for use as a source of glyph samples for training character templates according to the present invention.

An "image" is a pattern of light. One or more items of data "define" an image when the data includes sufficient information for the processor to directly produce the image, such as by presenting the image on a display. Data defining an image may be referred to as "image definition data". For example, a two-dimensional (2D) array can define all or any part of an image, with each item of data in the array providing a value indicating the color of a respective location of the image. In this type of image representation, each such image location is conventionally called a "picture element," or "pixel," and represents a small unique region of the image. Typically, in black and white binary images, the value in a pixel indicates black or white, where black is the foreground color and is intended to represent a respective mark or active position in the image, and white is the background color. Because black is the typical color used as a foreground pixel color, reference to black pixels and foreground pixels will be used interchangeably throughout this discussion, unless explicitly noted otherwise. An image in a processor-controlled system that is represented by a 2D array of data items defining pixels is referred to as a "bitmapped image" or "binary image." FIG. 2 illustrates an example of an image definition data structure 10 defining a binary image.

An "image output device" is a device that can provide output defining an image. A "display" or "display device" is an image output device that is capable of presenting information in human perceptible form. A display may, for example, include a cathode ray tube; an array of light emitting, reflecting, or absorbing elements; a device or structure that presents marks on paper or another medium; or any other device or structure capable of defining an image in a perceptible form. A "display area" is the portion of the display in which an image is presented or the medium which receives an image. The processor "presents" an image on a display when an operation executed by the processor produces image definition data defining the image and provides the image definition data defining the image to output circuitry connected to the display for display in the display area so that the image is perceptible to a system user.

The term "display feature" refers to any human perception produced by a display device, and includes a single display feature and also may include plural display features that together form a pattern of display features in an image. A "display object" or "object" is a display feature that is perceptible as a coherent unity. An image "includes" a display feature or object if presentation of the image can produce perception of the feature or object. Similarly, a display object "includes" a display feature if presentation of the display object can produce perception of the display feature. For example, FIG. 2 illustrates display objects 12 and 14 which are realized instances of characters.

2. Character, character code, and input 2D image source of glyph samples

"Character" as used herein means a single, discrete, abstract element or symbol. For example, a character can include an abstract symbol that appears in a written or printed form of a language. Characters in a language can include not only alphabetic and numerical elements, but also punctuation marks, diacritical marks, mathematical and logical symbols used in mathematical notation such as equations, and other elements used in the written or printed form of the language. More generally, characters can include phonetic, ideographic, or pictographic elements in addition to alphanumeric elements. For example, symbols in pictographic languages and symbols representing musical notation are included in the term character. All of the characters related to a particular language or other symbol notation such as music comprise a "character set." A "word" is a set of one or more characters that is treated as a semantic unit in a language. A "text" or "string" is a sequence of characters; a "subsequence" or "substring" of characters is a set of one or more consecutive characters within a text or string; the characters of a text or string may form words and other subsequences within the text.

A "character code" is an item of data in a processor-controlled machine or system that defines, or represents, a character (the abstract symbol) to the processor. The encoding of a set of characters, such as those that belong to a language, involves defining a set of character codes that includes a respective character code for each character in the set. An example of a set of character codes is the set of ASCII codes for the symbols that make up the English language.

A "glyph" is a single instance, or example, of a character that is realized as an image, for example on a marking medium such as paper or on a display screen. For example, an image that is produced by a scanning operation performed on a paper document that includes text and that is received by scanning circuitry includes a plurality of glyphs, each of which is an image that represents a realized instance of a respective one of the characters in the text. Because a variety of factors may affect how an image of a character is produced when it is printed, scanned, copied or faxed, one glyph of a character in a text image may not be identical to another glyph of the same character in the text image.

Figure 7:
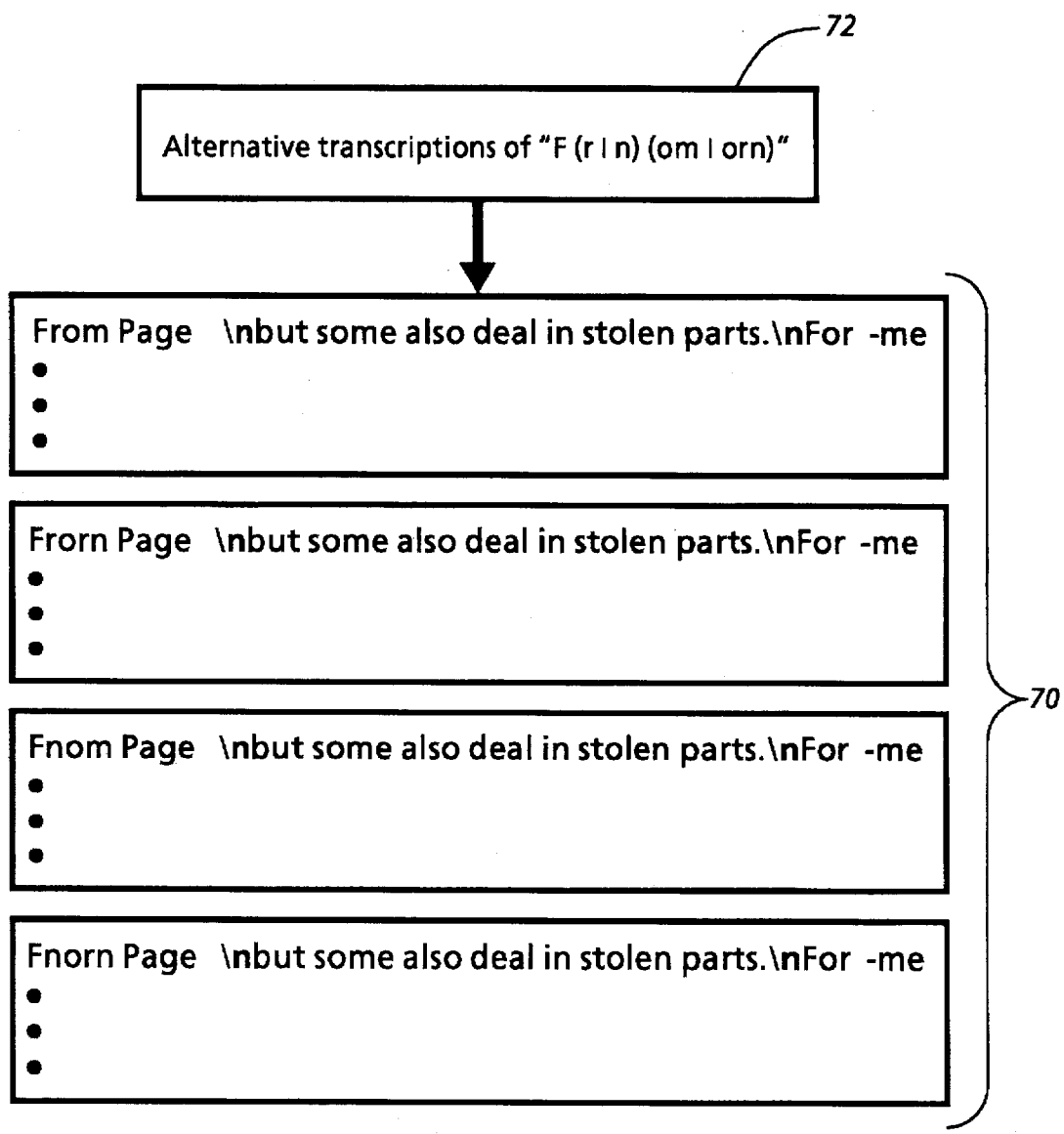
FIG. 7 illustrates a set of transcription data structures representing alternative transcription messages for the 2D image of FIG. 2.
Figure 8:
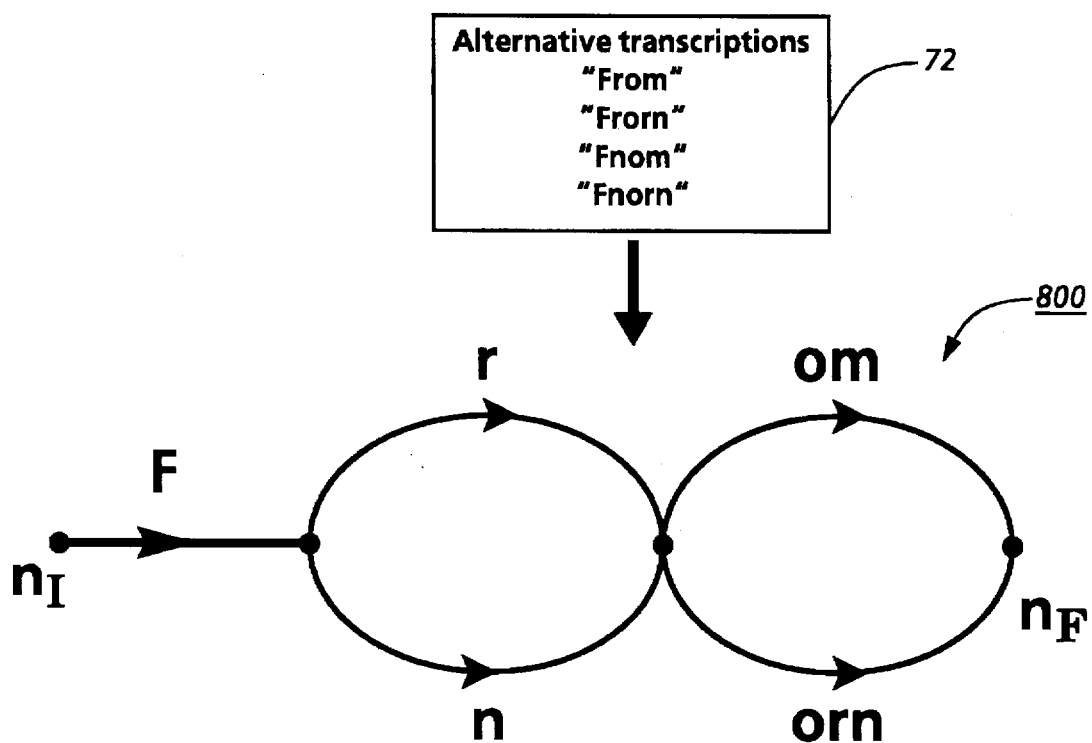
FIG. 8 illustrates the set of transcriptions shown in FIG. 7 represented as a portion of a simplified, finite state transition network.
Figure 9:
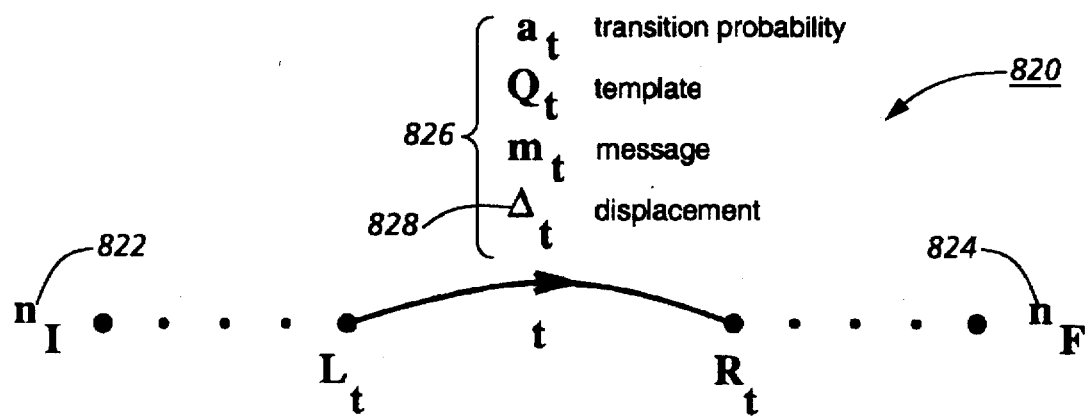
FIG. 9 illustrates a formal 2D image source model represented in its general form as a simplified, finite state transition network.
Figure 10:
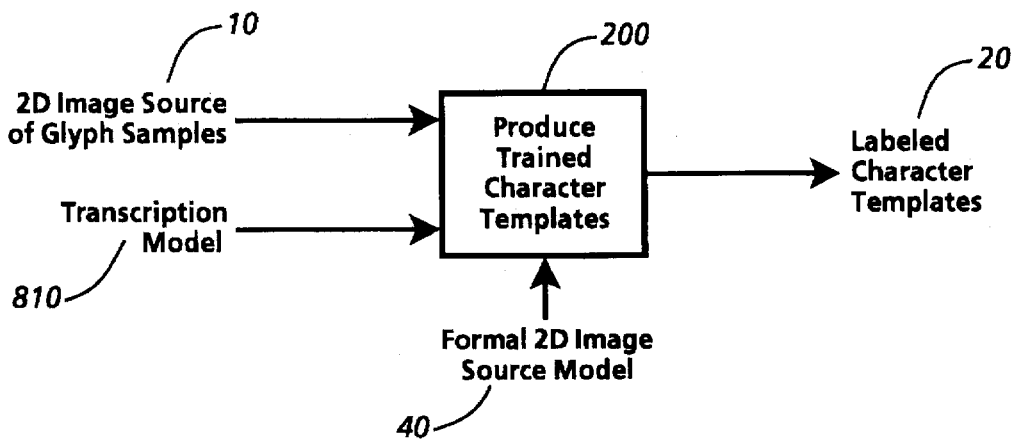
FIG. 10 is a simplified block diagram illustrating the input and output data structures of the training technique and system of the present invention.

FIGS. 2–9 illustrate some of the data structures used in the present invention. FIG. 2 illustrates an example of an image definition data structure defining an input 2D image source of a plurality of glyphs from which the training technique of the present invention derives glyph samples for use in producing trained binary character templates; FIG. 3 illustrates a character template data structure; and FIGS. 4–7 illustrate examples of transcription data structures. FIGS. 8, 9 and 10 illustrate finite state transition networks as data structure representations of transcriptions and formal 2D image models, respectively. FIG. 8 illustrates a set of transcriptions as a finite state transition network, and FIG. 9 illustrates a generalized finite state transition network for a formal 2D image model, which is an explicit input to the training procedure of the present invention.

The terminology "image definition data defining an input 2D image source of a plurality of glyphs" (hereafter also referred to as a "2D image source of glyph samples," "2D image data structure," or simply as the "2D image") refers to a data structure, suitable for storage in a memory device of a processor-controlled machine, that defines a 2D image in which a plurality of bitmapped representations of characters occur in the 2D space defined by the image. The organization of the 2D image data structure is such that individual pixel locations are accessible by the processor, but the pixels that comprise an individual glyph are not initially identified as a unit of data that is accessible to the processor, and no information is initially available to the processor as to whether a specific x,y coordinate position in the 2D image indicates one of the pixels included in a glyph. The 2D image source of glyph samples is the input source of glyph samples used for training character templates according to the present invention. A 2D image, by definition, has a vertical size dimension larger than an image of a single horizontal row of glyphs, as, for example, represented by a single line of text in a document. A 2D image is conceptually analogous to a page of a document, and may frequently represent an image of an actual physical page, with glyphs being vertically, as well as horizontally, distributed in the 2D space; however, the input 2D image source of glyph samples is not intended to be limited in any manner to an entire page, or to a single page of a document. The 2D image is not limited to include only glyphs; other image objects such as graphical objects or shapes, pictures, halftone images, line drawings, photographs, other pictorial elements, or images that constitute noise may be included in the input 2D image source of glyphs. For convenience, collections of pixels representing image objects that are not glyphs will be referred to as "nonglyphs."

FIG. 2 illustrates 2D image data structure 10 that includes bitmapped representations of characters in the character set that comprises the English language. In FIG. 2, each discrete representation of an English language character in 2D image 10 is a glyph; glyphs 12 and 14 have been enlarged to illustrate a schematic representation of the individual pixels that make up their respective images. 2D image 10 in FIG. 2 illustrates a portion of the data structure representing a binary image that has been produced by scanning a newspaper article, and includes pixels comprising line segment 16, a nonglyph, included in the 2D image.

The source device that produces the input 2D image source of glyphs is independent of and unrelated to the operation of the training technique. The input 2D image source may be produced by a scanning, digital faxing or digital copying operation applied to an existing physical document; the input 2D image source may also be a synthetic binary image created by a user using any suitable processor-controlled machine.

3. Character templates

A "template", or "character template", is a data structure that indicates a bitmapped image of a character. The "support" of a bitmapped character template is the set of pixel locations where the template differs from the background. A "character label" is a data item that indicates information uniquely identifying one of the characters in a character set with the respective character template indicating the bitmapped image of the character. A character label may indicate a character code, such as an ASCII code, to identify the template, or may indicate some other information that uniquely identifies the template as the one indicating the bitmapped image of a particular one of the characters in a character set, such as font identifying information, size, or type style information. For example, when a data structure includes a set of character templates for characters in each of two different fonts, and so includes two templates representing the character "a," one in each of the different fonts, the respective character label identifying each template includes font identifying information that uniquely distinguishes one of the templates representing the character "a" from the other. In addition to character template identifying information, a character label may also include information, such as font identifying information, size, and type style information, about the character template that is not required to identify it. A "set of labeled character templates" or a "set of character templates" is a data structure that includes at least one character template and the respective character label that uniquely identifies the character template.

FIG. 3 illustrates set 20 of labeled character templates representing characters in the English language character set. Character template data structures 22, 24 and 26 each indicate character label data items 28, 30 and 32, respectively, as shown via exemplary directed arrow 34 from character template 22 to character label 28. Identifying information in each of character label data items 28, 30 and 32 is shown as a character in quotation marks; this representation is used in the figures herein to indicate a respective character code stored in a data memory of a processor-controlled machine, as distinguished from pixels that represent an image of the character. Character label data items 28, 30 and 32 each respectively indicate character template data structures 22, 24 and 26, respectively, as shown via exemplary directed arrow 36 from character label 28 to character template 22. In the illustrated embodiment of the training technique of the present invention, the character templates are defined by the sidebearing model of character positioning illustrated in FIG. 1, and so the character labels also indicate character template origin coordinate information, set width information, and the font metric information described above in the discussion accompanying FIG. 1.

The illustration of character templates in FIG. 3 is not intended to limit the data structure that represents a character template in any way to an explicit 2D array of pixels representing a complete character. A template may be constructed from the concatenation of pieces of bitmapped characters, such as vertical strokes, joins, ascenders, descenders, and curved portions. A template may also be represented by a formal model that produces an explicit 2D array of pixels representing a complete character as its output.

4. Transcriptions and formal transcription models

A "transcription data structure" or "transcription" as used herein is a data structure indicating a unique message string, M. Message string M includes a plurality of message substrings, $m_1, m_2, \ldots m_n$, each of which indicates at least one of a plurality of characters in a character set. Each substring, $m_i$, is referred to as a "transcription label data item," or simply as a "transcription label." A transcription is said to be "associated with" a formal 2D image source model (defined below) when the formal 2D image source model together with the information indicated by the characters in the transcription establishes a mapping between one or more glyph samples in an input 2D image source of glyphs and one or more character labels indicating character templates in the set of character templates being trained. The term "mapping" is used herein in its mathematical sense to refer to a rule of correspondence established between two sets that associates each member of the first set with a single member of the second. The interpretation of the information indicated by the transcription is dependent on information indicated by the formal 2D image source model about the mapping between the glyph samples and the character labels. A consequence of this dependency is that transcription labels have no implied or inferred order with respect to one another, or with respect to the glyph samples in the associated 2D image unless the transcription is of a type in which the order of the transcription labels is explicitly indicated by the definition of the transcription type.

A transcription is said to be "associated with" a specific input 2D image source of glyphs when the transcription data structure meets one of two conditions: (1) The transcription data structure is, or is capable of being produced from, the output of a recognition operation performed on the input 2D image. The recognition operation may be processor-controlled, such as a computer-implemented recognition or decoding operation performed on the specific 2D image. Or the recognition operation may be performed by a user using a processor-controlled machine; for example, a user may produce the transcription data structure by visually inspecting the 2D image and entering character codes using a conventional input device, such as a keyboard, that produces signals indicating the character codes. (2) The transcription data structure is, or is capable of being produced from, a data structure that is an input source to an image rendering operation, such as a document formatting operation, that produces the 2D image. The input 2D image with which a transcription is associated is referred to as the "associated 2D image."

Figure 4:
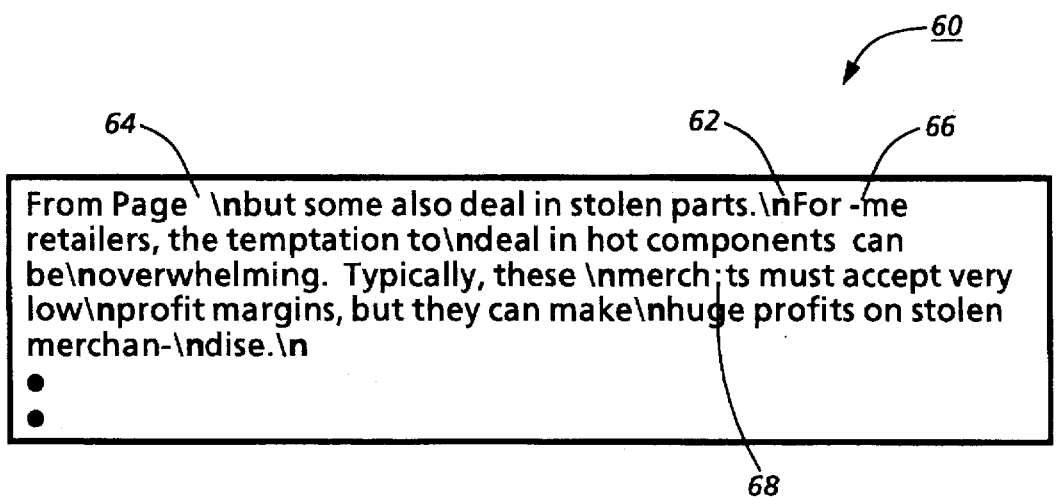
FIG. 4 illustrates an example of a transcription data structure for the 2D image of FIG. 2 suitable for use as input to the training technique and system of the present invention.

A "literal transcription" is a type of transcription that includes an ordered sequence of transcription labels, each of which indicates a character label for a character template in the set of templates being trained, and substantially all of which, taken in the sequential order of their occurrence in the transcription, can be paired, by visual inspection of an associated input 2D image, with respective individual glyphs occurring in the associated image that represent the characters indicated by the respective character labels in the transcription, when the glyphs are taken in a sequence consistent with the reading order for the associated 2D image. The present invention may take a literal transcription as the input transcription, but is not restricted to only literal transcriptions as input transcriptions. FIG. 4 illustrates a literal transcription 60 that is associated with 2D image source of glyphs 10 (FIG. 2) and that includes a single ordered sequence of transcription labels. It can be seen by visual inspection of 2D image 10 that substantially all of the transcription labels indicate individual characters that can be paired with respective single glyphs in 2D image 10, when 2D image 10 is read by a human in the conventional reading order for an English language document. A literal transcription may include a transcription label that indicates data that cannot be paired by visual inspection of an associated input 2D image with a glyph occurring in the associated image when the transcription label indicates what can, by visual inspection of the associated 2D image, be called a transcription error, or when the transcription label indicates a character that is considered to be a matter of common usage. For example, literal transcription 60 includes error character ":" 68 and "newline" character 62, shown in FIG. 4 as the symbol \n, shown in bold face in the figure for purposes of illustration. It can be seen by visual inspection of 2D image 10 that character ":" 68 is an error placeholder for the glyphs "a" and "n" in 2D image 10. Newline character 62 is a label that indicates that the character labels following the newline character have paired glyph samples that are positioned in the next line of the associated 2D image; newline characters are commonly inserted in data structures indicating text by users preparing a text document using a text editor.

A "nonliteral transcription" is a type of transcription associated with an input 2D image source of glyphs that is not a literal transcription. A nonliteral transcription may include, for example, a transcription label that is not an error and that indicates a character that cannot be paired by visual inspection with a glyph in the associated 2D image; or the non-character-label data may indicate characters in a character set other than the character set represented by the templates being trained. For example, a special character, mathematical symbol, or a musical notation that appears as a glyph in an associated input 2D image may be represented in a transcription label as a character in an extended character set or as a string of one or more ASCII characters. For example, the transcription label indicating the 4-character string "\sum" may be mapped to a glyph in an input image representing the mathematical summation sign, :Σ. Non-character-label data may also include information about the glyphs that occur in the associated 2D image such as the number of different fonts in which the glyphs appear, the identity of those fonts, character size and style, or font parameters. This information may be represented in the transcription data structure as characters included in the character set of the templates being trained, but, when the 2D image with which the transcription is associated does not represent these characters in the image, these characters are not mapped to glyph samples. A nonliteral transcription may intentionally omit transcription labels for some glyphs in an associated 2D image. An example of this type of transcription is one associated with a 2D image of a preprinted form, where the transcription contains the transcription labels for the information that is inserted into the fields of the form, but omits transcription labels for what appears as the preprinted information on the form, such as the graphical elements and the glyphs that provide instruction information.

A "tag transcription" is a type of nonliteral transcription of an associated 2D image source of glyphs in which the non-character-label data indicates information, called a "tag," or "tag data," that, when interpreted by a document processing operation, produces display features that are perceptible in the format of, or as part of the glyphs in, the associated 2D image. Tag data includes information that identifies format characteristics of the 2D image such as page, paragraph and line breaks and line spacing that is deterministic of the location of a glyph in the 2D image; that specifies one or more appearance attributes of one or more glyphs, such as the font or font variation in which a glyph appears; or that results, when the document is formatted, in producing glyphs in the 2D image to which no explicit transcription label in the transcription can be mapped. The various types of information that may be indicated by a tag will be referred to generally herein as "markup information." Tag data typically occurs in data structures intended to serve as standardized document interchange formats for representing document structure and content between document processing systems; such data structures are typically produced as the output of an operation that converts either an input document data structure or an input image to a data structure representing the document in the standard interchange language. Examples of such languages include SGML (Standard Generalized Markup Language), ODA (Office Document Architecture) and HTML (Hypertext Markup Language). Tag data also occurs in data structures used or produced by document specification and formatting systems, also called automatic text layout systems, that include within the data structure instructions for the format and logical structure of a document, such as found in document data structures produced using markup languages. Examples of such document specification and formatting systems include GML (Generalized Markup Language), TeX and LaTeX.

FIG. 5 illustrates tag transcription data structure 40 for a dictionary page of a technical dictionary; tag transcription 40 is associated with the image of the dictionary page shown as 2D image 50 in FIG. 6. Tag transcription 40 includes transcription labels 42, 44, 46 and 48 indicating tag data that identify the structural parts of an entry, name, category and body, respectively, of a dictionary entry. It can be seen that all or parts of the message substrings that comprise these transcription labels cannot be visually paired with glyphs occurring in 2D image 50. Visual inspection of 2D image 50 shows that the portion of transcription label 44 having the characters "\name { }" indicates tag data that results in the series of glyphs 52 for the characters "interflow" appearing in a bold type style and in a larger size font than the body of the definition.

FIGS. 5 and 6 also illustrate an example of tag data that results in the generation of glyphs in the 2D image to which no explicit transcription label in the transcription can be mapped. Image 50 includes left and right brackets 54 and 55 respectively, around a sequence of glyphs depicting the characters "electr". It can be seen that tag transcription 40 does not include transcription labels for left and right brackets 54 and 55, but that it does include transcription label 47 indicating that message substring "electr" is category information for the word entry. It can be inferred that message substring "\category", when interpreted as formatting information by a document processing operation, produced right and left brackets 54 and 55 as display objects in image 50.

A "transcription error" is defined in terms of its associated 2D image, and is a transcription label produced by the recognition operation performed on the associated 2D image that would be interpreted by a human user to be incorrect recognition output. An "errorful transcription" refers to a transcription that contains one or more transcription errors in one or more transcription labels. The present invention may take an errorful transcription as input to the training process. Literal transcription 60 in FIG. 4 is an example of an errorful transcription, with errors 64, 66 and 68 specifically called out. Error 64 illustrates what would be interpreted to be a missing transcription label; error 66 illustrates that a transcription label may include data indicating that the character label for the paired glyph in 2D image 10 was not able to be determined by the recognition process.

A "set of transcriptions" refers to at least two transcriptions of the same type, all of which are associated with a single 2D image. The training technique of the present invention accepts a set of transcriptions as the input transcription. This permits the recognition output of many conventional recognition systems to be used as the input transcription. Conventional recognition systems use a variety of pattern matching, syntactic, and semantic analysis techniques to improve the accuracy of their transcriptions, and these techniques typically include providing a set of two or more alternative transcription labels for a character image or string of character images, such as those representing a word, when the recognition system cannot determine within its certainty range what the correct transcription should be. For example, a recognition system may provide alternative pairs or triplets of transcription labels or alternative words for a set of glyphs in the image; or a post-recognition semantic analysis process applied to one or more transcription labels may narrow down a set of best possible character matches to one or two character labels, or to alternative words. A conventional recognition system may not actually produce two physically distinct transcription data structure outputs when it produces alternative recognition outputs for some sequence of glyphs in the 2D image; rather, a conventional recognition system typically produces a single transcription that includes one or more transcription labels indicating alternative recognition outputs for the same glyph or sequence of glyphs. For example, the transcription label representing alternative recognition output for the word "From" in 2D image 10 might indicate the characters "F (rln) (omlorn)". For purposes of the present invention, a transcription indicating two or more alternative message substring choices as the recognition output for one or more glyphs in an associated input 2D image will be treated as being multiple transcriptions and will be referred to as a set of transcriptions; the set will include one transcription data structure for each alternative message that may be generated from the alternative message substring choices. Mathematically, the set of transcription data structures is considered to be a regular set. FIG. 7 illustrates the straightforward case of a single transcription message providing alternative transcription label 72 of "F (rln) (omlorn)" for the glyphs representing "From" in input 2D image source of glyphs 10 (FIG. 2), producing a set of four transcription data structures 70 for image 10.

A "formal transcription model," or "transcription model," is a data structure that represents the message string of the transcription as a regular set, such as a finite state transition network or a grammar. For example, a finite state transition network has a number of transitions, each transition corresponding to a transcription label in the transcription.

A set of transcriptions may be represented as a formal transcription model. Model 800 in FIG. 8 illustrates an example of a finite state transition network for the set of transcriptions 70 in FIG. 7, illustrating the transitions that occur for the word "From" in transcriptions 70. Given a data structure representing a set of transcriptions, and given the data structure for a particular transcription, it can be determined whether the particular transcription belongs to the set defined by the data structure for the set of transcriptions. In general, it is known and understood in the art that a data structure representing data or models as a finite state transition network is equivalent to a data structure representing data as a set of regular grammar rules, and that depicting data structures as finite state transition networks in the figures herein, and in the discussion of an illustrated embodiment of the present invention, neither intends nor implies any limitation on the types of data structures that may be used in carrying out the training technique of the present invention.

5. The formal 2D image source model.

A "formal two-dimensional image source model," or "formal 2D image model," is a data structure that defines a mapping between the glyph positions of the glyph samples in the 2D image and character labels of templates that identify the glyphs as samples of the characters indicated by respective character labels. The formal 2D image model is an explicit input to the training technique and system of the present invention, and contains instructions, in the form of a formal description language such as a formal grammar or a finite state transition network, that characterize or describe a priori information, including structural features and functional characteristics, about the set of possible 2D input images for which a recognition system is designed and a set of possible transcriptions that may be associated with the set of possible images. The formal 2D image model also describes a character template model that models the templates to be trained, and includes an initial set of character templates. The formal 2D image model is distinguishable from a data structure such as input 2D image source 10 that defines a specific 2D input image, or from a data structure such as a transcription that is the output of a recognition operation on a specific image. The formal 2D image model, in this regard, is analogous to a formal grammar in a grammar-based character string parsing system which exists as an explicit data structure independent of the instructions (i.e., the code) of the parser that uses it.

The formal 2D image model enables the present invention to operate in the 2D image domain so as to require no pre-training step of text line isolation or individual glyph segmentation. Structurally, a formal 2D image model intended to be the type of model suitable for use in the training technique and system of the present invention defines image position information about how possible image objects (e.g., glyphs, graphical objects, photographs, etc.) in an image included in the set of possible 2D images are spatially arranged in the 2D image. Frequently, but not necessarily, when the image represents an English language document, glyph position information defined by the model is consistent with the conventional reading order for the document when the document is read by a human. In the illustrated embodiment described below, images, including input 2D image source of glyphs 10 in FIG. 2, are assumed to be rectangular, and to have an image coordinate system 13 (FIG. 2) in which x increases to the right, y increases downward, and the upper left corner is at x=y=0. The model's description of image position information for non-glyph image objects permits a portion or portions of a given input image to be eliminated as possible image positions of glyph samples. This aspect of the model permits a wide variety of input 2D images to be accommodated as glyph sample sources, and the model may be constructed to describe any one of a number of classes of input 2D images, including, for example, images of printed music, images of equations, and images with fixed or known structural features such as business letters, forms and telephone yellow pages. Transcription ordering information is expressed as the set of rules that define how message substrings are sequentially arranged in the transcription.

The formal 2D image model expresses transcription label information as the set of rules that define the mapping between the information indicated by the message substrings in the transcription and actual message substrings, in terms of character labels, that appear in a 2D image, and, for each substring, what its appearance is in the image. This mapping effectively establishes a mapping between the set of possible 2D images, the set of possible transcriptions, and the set of character templates that enables the training technique to determine which one of the possible 2D input images—that is, which sequence of characters in which sequence of lines of text strings—best matches a specific 2D input image associated with a specific transcription. From this best match information, the model enables the training technique to determine the positions of the glyph samples in the 2D image, and to assign character labels to the samples. The specific position information about the glyph samples that needs to be determined by the training technique is a function of the particular template model that defines the character templates. The template model defines how character templates, and therefore glyph samples, are spatially arranged or positioned with respect to one another in an image. If the template is defined as a segmentation-based model, the training technique must be able to produce information indicating glyph bounding boxes from the mapping established by the formal model. If the template is defined as a non-segmentation-based model, such as the sidebearing model, the training technique must be able to produce information indicating glyph origin positions from the mapping established by the formal model.

The design of the formal 2D image model to be used as the input to the training procedure is influenced by the type and content of the transcription to be used, and so permits further flexibility to the user in providing training data to the training procedure. The information included in the formal 2D image model about the structural and functional features of the transcription is only that information needed by the model to establish the requisite mapping between glyph samples and character labels, which in turn is the additional information needed by the model to specify a specific image from the set of possible images defined by the model. The farther removed the information in the transcription is from a literal transcription of an associated input 2D image source of glyphs, the more information is needed in the 2D image model to establish the correct mapping.

Any formal 2D image source model having the characteristics and properties described above is suitable for the training technique and system of the present invention, and is intended to be encompassed by the appended claims. An example of an implementation of the formal 2D image source model of the type intended to be used in the present invention, and that is used in the illustrated embodiment described below, is a stochastic finite state transition network that represents its production rules as a regular grammar, and that explicitly defines the sidebearing model of letterform shape description and positioning as its character template model. A simplified, general illustration of this model as a Markov source is schematically shown as model 820 in FIG. 9, and is described in more detail below in the discussion of a particular implementation of the present invention. Further information about the types of formal 2D image source models suitable for use in the present invention may be found in P. A. Chou and G. E. Kopec, "A stochastic attribute grammar model of document production and its use in document image decoding," presented at IS&T/SPIE 1995 Intl. Symposium on Electronic Imaging, San Jose, Calif., Feb. 5-10, 1995 (hereafter, "Chou and Kopec, 'A stochastic attribute grammar model'".)

B. General Features

Figure 11:
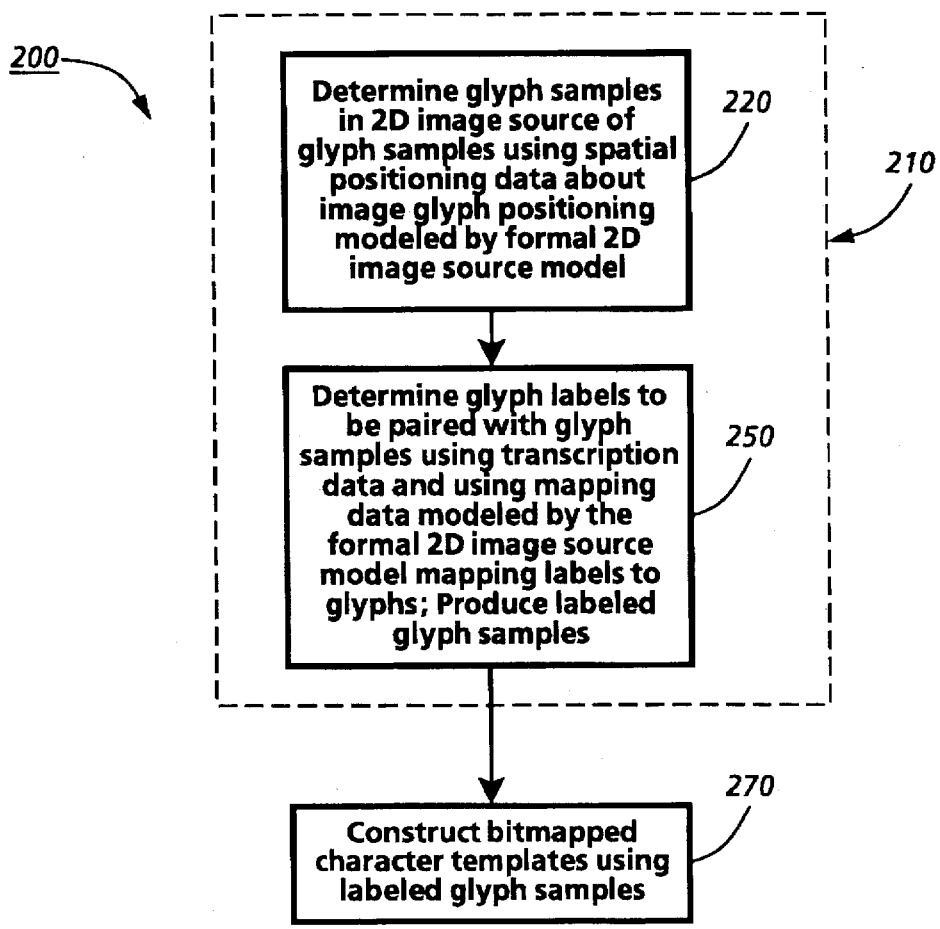
FIG. 11 is a flow chart illustrating the general steps of the character template training technique of the present invention.

FIGS. 10–11 illustrate the general features and operation of the present invention. FIG. 10 is a block diagram showing the input and output data flow of the present invention. The general steps of the character template training technique of the present invention are illustrated in FIG. 11.

1. Input data structures

The character template training technique 200 of the present invention illustrated in the block diagram of FIG. 10 is provided with inputs of the 2D image source of glyph samples 10, a formal transcription model 810, and an image model 40, all of which have been defined above. Character template training technique 200 uses these input sources of data to produce character template data structure 20 which includes a set of character templates and their respective character label data items for a particular character set.

The present invention recognizes that the 2D image source of glyph samples typically contains multiple sample images of a unique character in a character set in a particular font, and that, if information indicating the 2D image x,y coordinate positions and the character identity of each sample were known, a trained character template for each unique character in the 2D image, in the specific font of the samples, could be derived from the pixel colors of the set of pixels that make up each glyph sample. The present invention also recognizes that a transcription associated with the 2D image provides identity and sequence information for each of the glyphs in the 2D input image that may be used to identify the character of a respective one of the glyph samples. The grammar-based 2D image source model, explicitly specified as an input to the invention, defines spatial positioning information about the glyphs that occur in the 2D image source of glyph samples in order to locate the glyph samples, and defines mapping data indicating a mapping of a respective one of the glyphs occurring in the 2D image to a glyph label indicating the character in the glyph sample character set.

Character template training technique 200 is capable of producing a labeled character template only for those characters for which glyph samples occur in 2D image 10, and the completeness of the character set for which character templates are trained is dependent on the 2D image source of glyph samples 10 having at least one glyph sample for each character in the character set. For example, because the English letters "j," "q," "x" and "z" do not appear in the portion of 2D image 10 shown in FIG. 2, character template training technique 200 will not produce these templates when only that portion of 2D image 10 is used as the source of glyph samples. For convenience hereafter, the character set for which character templates are being trained will be referred to as the "glyph sample character set," to indicate its dependence on the glyph samples that occur in 2D image source of glyph samples 10. The quality of each trained template is generally dependent on the number of glyph samples available in the 2D image source of glyph samples 10 for each character in the glyph sample character set. Thus, in a particular implementation of the technique, it may be preferable to use a 2D image 10 data structure that includes images of a relatively small set of glyphs occurring a relatively large number of times in multiple positions in the 2D image without scaling or rotation. It may also prove useful to select a 2D image 10 in which the glyphs occurring therein are mostly all in a single font or in only a few fonts.

2. Overview of the training technique

The general steps of the character template training technique 200, illustrated in FIG. 11, include, in box 220, determining the position of each glyph sample in 2D image 10 using the spatial positioning information defined by grammar-based 2D image source model 40, and determining, in box 250, a glyph label for each glyph sample located in 2D image 10 using transcription 70 and the mapping data defined by 2D image source model 40 mapping a respective one of the glyph samples occurring in 2D image 10 to the glyph label indicating the character in the glyph sample character set represented by the glyph sample. The result of steps 220 and 250 is to produce a data structure indicating a set of labeled glyph samples which is the training data from which character templates may be produced. Then, in box 270, character templates are constructed using the data structure indicating the set of labeled glyph samples. In a particular implementation of character template training technique 200, glyph samples and their labels may be determined contemporaneously, and the functions in steps 220 and 250 could be viewed as being combined to produce the training data that is input to step 270; this combined functionality is indicated in FIG. 11 by procedure 210 enclosing steps 220 and 250 in a dotted line box.

The organization and content of the output data structure indicating the training data produced by steps 220 and 250 may take one of several forms determined by several interrelated factors that reflect aspects of the particular implementation of character template training technique 200. Table 2 below summarizes these factors, and presents three possible data structure organizations for the training data. Table 2 also illustrates that there are at least two template construction methods that may be used to produce the trained binary character templates, and that the method to be used depends on the organization and content of the training data. Table 2 is not intended to limit in any way the implementation of the present invention to produce training data only in the formats suggested; character template training technique 200 is intended to include implementations that produce training data in forms other than those listed in Table 2 that are consistent with the present invention as set forth in the appended claims.

TABLE 2

| 2D Image Source Model | | | |
|---|---|---|---|
| Spatial Image Structure; Glyph Appearance | Character Template Model | Training Data: Labeled Glyph Samples | Template Construction Method |
| 2D image defined in terms of rectangular concatenated image regions; glyph samples must be segmentable; | Segmentation-based Model | (1) List of labeled x,y coordinate positions in 2D image indicating a bounding box for each glyph sample; OR (2) image definition data structures each indicating an isolated glyph sample in a bounding box, extracted from 2D image | Pixel averaging of sets of individual samples in bounding boxes |
| Glyph samples defined with constraint only that glyphs have disjoint supports; glyph samples need not, but may, be segmentable | (1) Sidebearing model OR (2) Segmentation-based model | List of labeled x,y image origin positions, each image origin position representing a single glyph sample | contemporaneous, multiple template construction technique, using template contribution measurements computed using pixels in sets of aligned samples |

Figure 21:
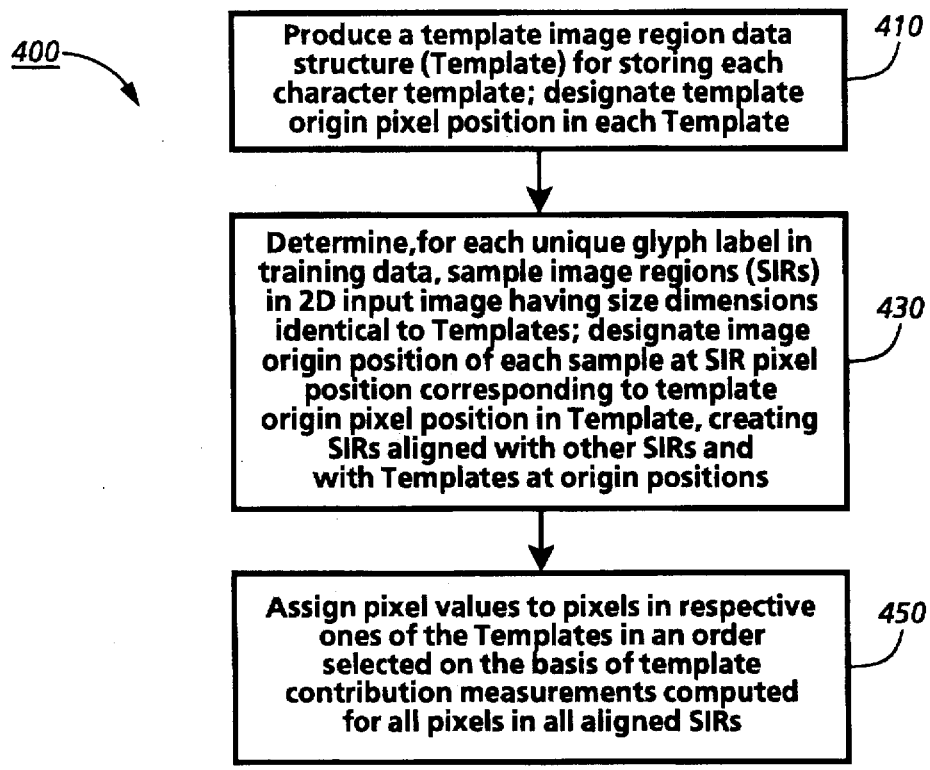
FIG. 21 illustrates the general steps of the template construction technique used in the illustrated implementation of the present invention.

As presented in Table 2, when the character template model of the character templates being trained is the sidebearing model, procedure 210 must produce training data that indicate labeled glyph samples, each of which is identified by an x,y position in 2D image source of glyph samples 10 that indicates the image origin position of the glyph sample in 2D image 10. A novel template construction technique, described in detail beginning with the discussion accompanying FIG. 21, is used in step 270 to construct the binary character templates using a list of labeled glyph image origin positions indicating image origin positions of glyph samples in 2D image 10.

When the character template model of the character templates being trained is a segmentation-based model, step 220 finds bounding boxes for each glyph sample in 2D image 10, and produces as training data a list of labeled bounding box coordinates, or a set of labeled, isolated glyph samples extracted from 2D image 10. Any well-known pixel averaging and thresholding technique may then be used in step 270 to produce the binary character templates from the segmented or isolated training data. In one such technique, the number of foreground and background pixels for each pixel location in each of the samples is counted and divided by the total number of samples, and a threshold value is used to evaluate whether the average should yield a foreground or background determination.

Table 2 illustrates that character templates for a segmentation-based character template model may also be trained using training data that indicates only the list of labeled image origin positions for the glyph samples in 2D image 10, and not bounding boxes, by using the novel template construction technique. As indicated by the discussion below of the template construction technique, training character templates for a segmentation-based character template model in this manner eliminates the need to produce segmented training data from 2D image 10, and may result in improved templates when 2D image 10 is noisy.

C. An illustrated implementation of the training technique

An embodiment of the present invention has been implemented as a software program on a SUN SparcStation 10 computer running the SUN Solaris-1 operating system, available from Sun Microsystems, Inc., of Mountain View, Calif. The system was configured with 64 MB RAM memory and a disk swap space of 600 MB. The software program is written in a standard version of the Common Lisp programming language, using a compiler obtained from Lucid, Inc. of Menlo Park, Calif. (now available from Harlequin, Inc. of Cambridge, Mass.) Portions of the software were written in the C programming language, compiled using the GCC compiler available from the Free Software Foundation, Inc., of Cambridge Mass. The compiled C programs were accessed from Lisp via the Lucid Common Lisp foreign function interface.

The description of the illustrated implementation that follows requires a familiarity with the details of the invention that is the subject matter of commonly assigned U.S. Pat. No. 5,321,773, issued to Kopec and Chou, inventors herein, and entitled "Image Recognition Method Using Finite State Networks." The disclosure of this patent is hereby incorporated by reference as if set out in full herein for all that it teaches. Additional information about the image model and image decoding discussed in the illustrated implementation may also be found in the article by Kopec and Chou, "Document Image Decoding," referenced earlier in the background discussion, which is also hereby incorporated by reference herein as if set out in full. In the context of the discussion that follows of the illustrated implementation, the term "2D image decoding" or "document image decoding" or simply "decoding" will be used to refer to a recognition operation that includes matching a bitmapped image of a character to a character template in order to assign a character code to the character image.

The description of the illustrated implementation also presumes an understanding of probability and decision theory as they relate to pattern matching problems, and presumes a working knowledge and familiarity with the application to and implementation of hidden Markov models for modeling the occurrence of a sequence of observable symbols. One useful text in this regard is *Hidden Markov Models for Speech Recognition* by Huang, Ariki and Jack (Edinburgh University Press, 1990). In particular, chapter 2, "Fundamentals of Pattern Recognition" at pp. 10–51; chapter 5, "Hidden Markov Models and Basic Algorithms" at pp. 136–166; and chapter 6, "Continuous Hidden Markov Models" at pp. 167–185 provide relevant background. All of these chapters are hereby incorporated herein by reference for all purposes, as if set out in full. Other sources of information about hidden Markov models include L. Rabiner, "A Tutorial on Hidden Markov Models and Selected Applications in Speech Recognition", in *Proceedings of the IEEE*, Vol. 77, No. 2, February, 1989, at pp. 257–285, and L. Rabiner and B. Juang, "An Introduction to Hidden Markov Models", in *IEEE ASSP Magazine*, January 1986, at pp. 4–16. Both of these articles are also hereby incorporated herein by reference for all purposes, as if set out in full.

Figure 12:
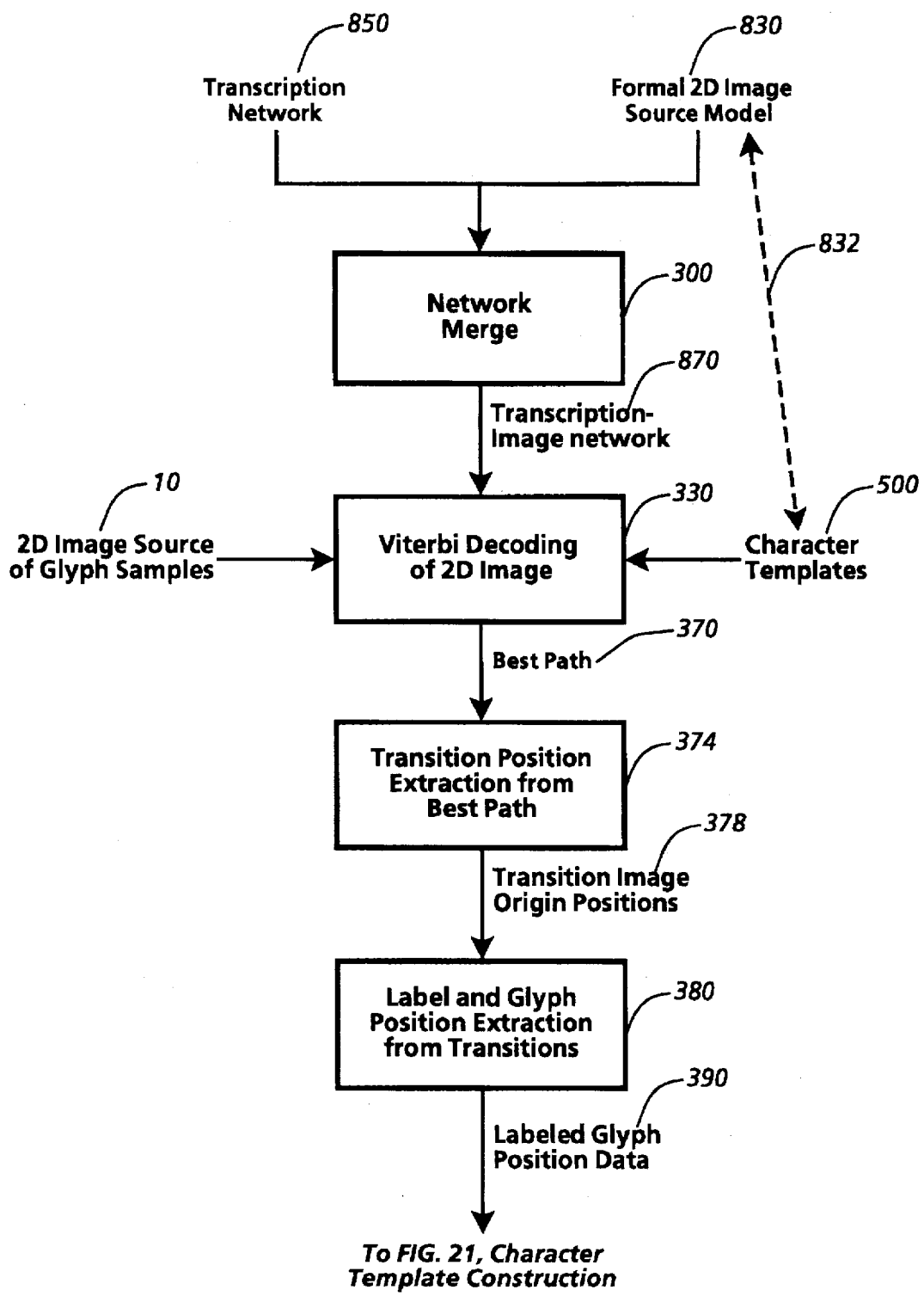
FIG. 12 is a simplified block diagram illustrating the input and output data structures of a portion of an illustrated software implementation of the training technique and system of the present invention that produces the training data input to template construction.
Figure 13:
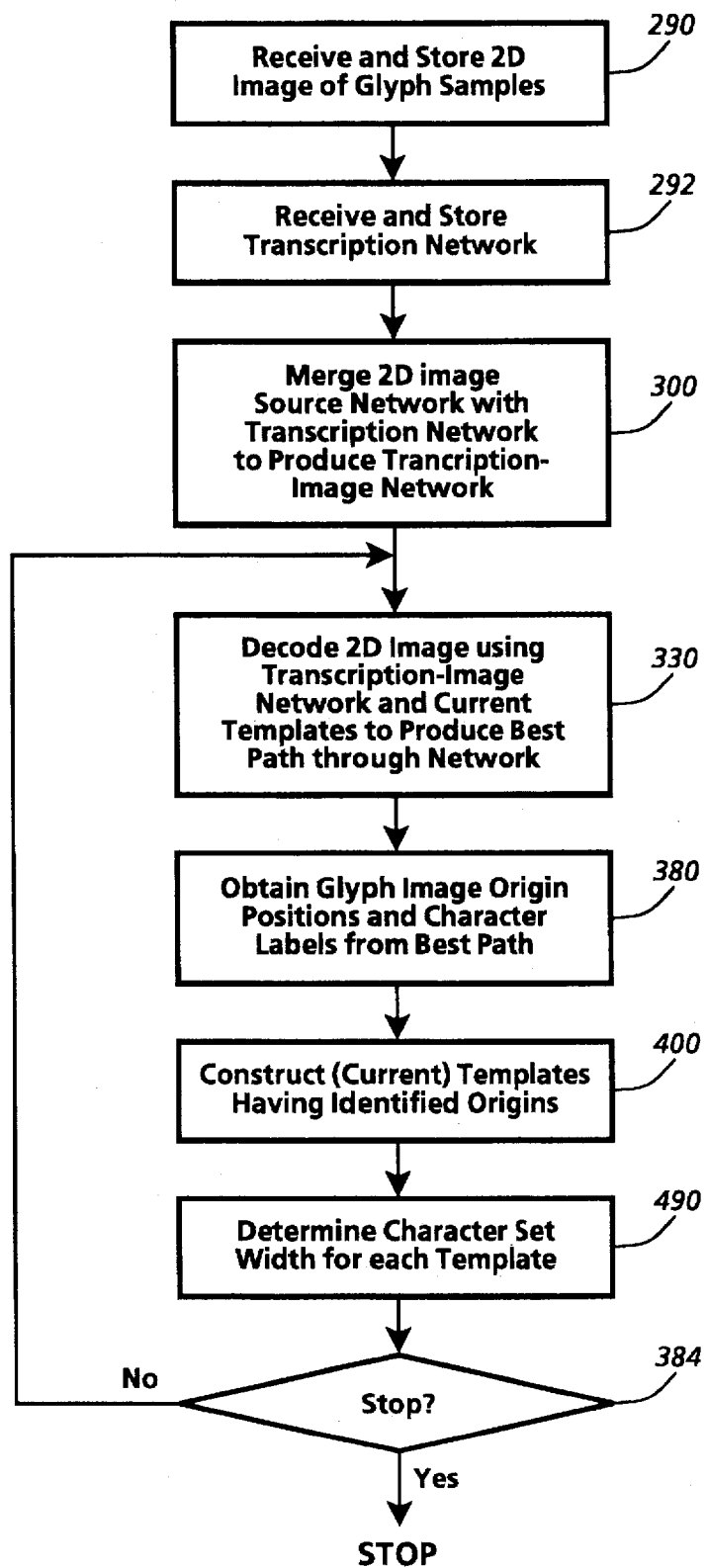
FIG. 13 is a flow chart illustrating the general steps of the portion of the illustrated implementation of the present invention that produces labeled glyph image origin positions as training data.
Figure 14:
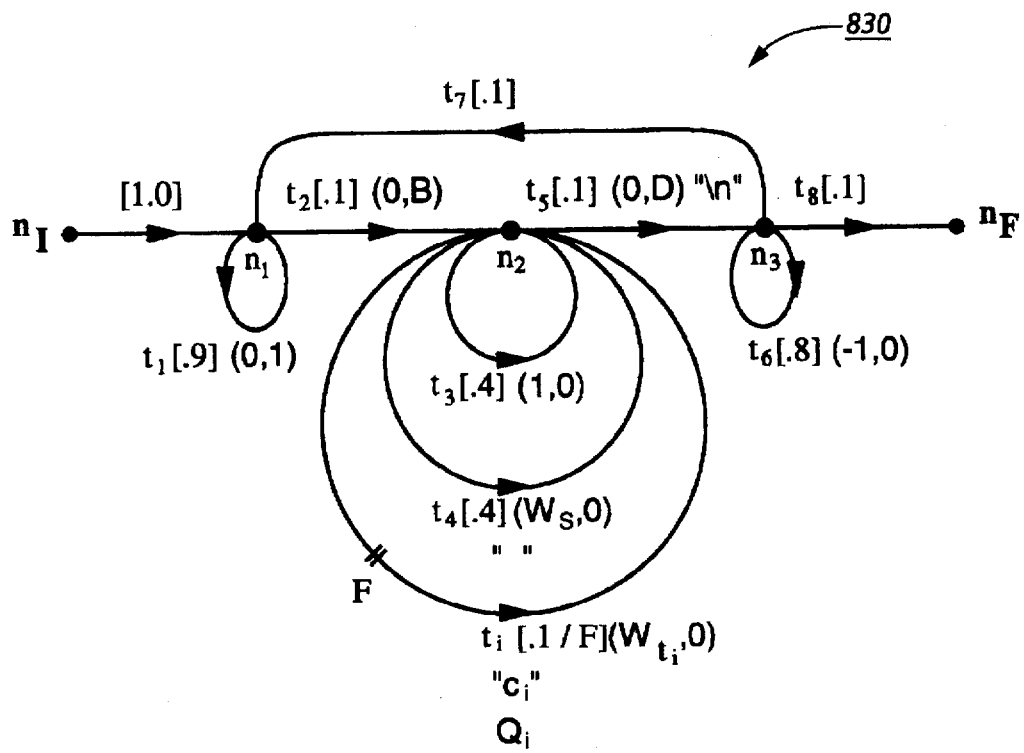
FIG. 14 is a diagram illustrating a finite state transition network modeling a class of 2D images having a spatial structure of a single text column, such as the 2D image of FIG. 2, used in the illustrated implementation of the character template training technique of the present invention.
Figure 15:
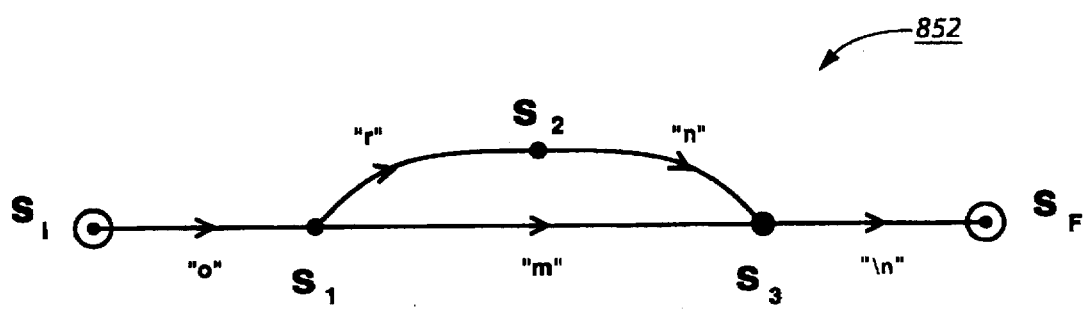
FIG. 15 is a diagram illustrating a simplified portion of the transcription network of FIG. 8 used in the illustrated implementation of the character template training technique of the present invention.

The discussion of the illustrated implementation is organized into two main parts: first, an illustrated embodiment for finding and labeling glyph sample image origin positions in 2D image source of glyph samples 10 is presented; then an implementation of a novel template construction process is discussed. FIGS. 12–20 illustrate the features of an illustrated embodiment of the present invention for finding and labeling glyph sample image origin positions in 2D image 10. The block diagram of FIG. 12 shows the data flows of the illustrated implementation, and the flowchart of FIG. 13 illustrates the general steps for producing training data indicating labeled glyph sample image origin positions. FIG. 14 illustrates a finite state transition network, called the 2D image source network, modeling a set of 2D images having the common spatial structure of a single column of text, of which 2D image 10 is a representative image. FIG. 15 illustrates a finite state transition network modeling a portion of an input transcription. FIGS. 16, 17, 18 and 19 present a sequence of diagrams illustrating how the 2D image source network is merged with the transcription network. The flowchart in FIG. 20 presents the steps of decoding using a Viterbi decoder, and of obtaining labeled glyph image origin positions as the output of the decoding step. In the mathematical notation used in this description, the symbols x and $\Delta_t$ in bold type will be used to denote vectors x and $\Delta_t$, respectively, and an equation defined in the discussion will be subsequently referenced by its equation number in parentheses.

1. Implementation data flow and steps

With reference to FIG. 12, 2D image source model 830, represented as a stochastic finite state transition network similar to that disclosed in U.S. Pat. No. 5,321,773, and finite state transcription network 850 are inputs into network merge process 300 which produces a merged finite state network called a transcription-image network 870. This merged network is then used to decode 2D image source of glyph samples 10 using a Viterbi decoding process 330 that produces a best sequence of transitions, or path, through the merged network. An initial set of character templates 500 is used during this decoding process; dotted line 832 indicates that initial set of character templates 500 is part of finite state transition network 830 since, as noted earlier, character templates may be attributes on transitions in network 830. Process 374 identifies the transitions and their corresponding image origin positions in 2D image 10 that compose the best path through transcription-image network 870, as produced by Viterbi decoding process 330. Process 380 then determines the image origin positions and message strings from the transitions that have non-null character template attributes; these image origin positions indicate estimated locations of glyph samples in 2D image 10. The training data, i.e., labeled glyph image origin positions 390, are the output of this sequence of processes.

The flowchart in FIG. 13 illustrates the steps of an implementation of the character template training of FIG. 11 that uses finite state transition network 830 as the formal 2D image source model and transcription network 850 to represent the transcription. The decoding step 330 uses a current set of templates to determine the best path through transcription-image network 870. For the initial iteration of decoding, an initial set of character templates having arbitrary content may be generated by the processor, for association with the transitions in transcription-image network 870. The decoding, training data extraction, template construction and character set width determination steps, in boxes 330, 380, 400 and 490, are iterated until a stopping condition is met, which is tested in box 384, and the set of templates used in decoding step 330 during iterations subsequent to the initial iteration is the current set of templates produced as the output of template construction step 400. Training data extraction from the best path produced by decoding 2D image 10, illustrated in FIG. 12 as processes 374 and 380, is shown as combined process 380 in FIG. 13. Processes 300, 330 and 380 are now discussed in more detail.

2. The 2D image source model represented as a stochastic finite state transition network Formal 2D image source model 40 (FIG. 10) is represented in the illustrated embodiment as a finite state image model of the type disclosed in U.S. Pat. No. 5,321,773 and discussed and described in Kopec et al.,"Document Image Decoding." The general characteristics of this finite state image model and its mathematical constructs are repeated here for convenience, followed by a discussion of the specific finite state image model that models a set of 2D images having the common spatial structure of a single column of text, of which 2D image source of glyph samples 10 is a representative image.

With reference to FIG. 9, the structure of a set of images is captured formally by modeling image generation as image source model 820, which is also called a Markov source. A Markov source consists of a finite set of states (nodes, vertices), N, and a set of directed transitions (branches, edges) B. Each transition t connects a pair of states, $L_t$ and $R_t$, that are called, respectively, the predecessor (left) state and the successor (right) state of t. Two distinguished members of N are the initial state hi, denoted by reference numeral 822, and the final state $n_F$, denoted by reference numeral 824. It is assumed that no transition has $n_F$ as its predecessor, so that the final state is a trap state. With each transition t is associated a 4-tuple of attributes 826, $(Q_t, m_t, \alpha_t, \Delta_t)$, where $Q_t$ is the template, $m_t$ is the message string, $\alpha_t$ is the transition probability, and $\Delta_t$, denoted by reference numeral 828, is the vector displacement of t, analogous to set width for characters. (See the earlier discussion accompanying FIG. 1 for a description of the character set width.) In the illustrated implementation, some of these attributes may be null for particular transitions, each transition message string $m_t$ of image source model 820 is assumed to be either the empty string $\epsilon$ or else contains a single character, and vector displacement 828 may have negative, zero or positive scalar component values. The template $Q_t$ is defined over the entire image plane $\Omega$, although normally its support (set of non-zero, foreground pixels) will be localized within a small region near the origin of the local template coordinate system.

A "path" in a Markov source is a sequence of transitions $t_1 \ldots t_P$ for which $L_{t_i}=n_i$ and $$R_{t_i}=L_{t_{i+1}} \tag{1}$$

for $i=1, \ldots, P-1$. A "complete path" is a path for which $R_{t_P}=n_F$. A "cycle" or "loop" is a sequence of transitions $t_1 \ldots t_P$ for which $L_{t_1}=R_{t_P}$. Associated with each path $\pi$ is a composite message, or message string, $$M_\pi = m_{t_1} \ldots m_{t_P} \tag{2}$$

formed by concatenating the message strings of the transitions of the path. A message string in this context is another term for the transcription, and the terms message, message string, transcription and transcription string are used interchangeably in the discussion of the illustrated implementation. The set of transcriptions generated by complete paths through a Markov image source is a regular language and the source model itself is a finite state automaton that accepts that language. A Markov image source model defines a probability distribution on complete paths by $$Pr\{\pi\} = \prod_{i=1}^{P} \alpha_{t_i} \tag{3}$$

and induces a probability distribution on messages by $$Pr\{M\} = \sum_{\pi | M_\pi = M} Pr\{\pi\} \tag{4}$$

where $M_\pi$ is the message associated with path $\pi$ and the summation is taken over complete paths.

Also associated with each path $\pi$ is a sequence of vector image pixel positions $x_1 \ldots x_{P+1}$ recursively defined by $$x_1 = 0 \tag{5}$$

$$x_{i+1} = x_i + \Delta_{t_i} \tag{6}$$

where $x_{P+1}$ is introduced for convenience, and a composite image Q defined by $$Q_\pi = \bigcup_{i=1}^{P} Q_{t_i}[x_i] \tag{7}$$

where $Q[x]$ denotes Q shifted so that the origin of its local coordinate system is located at x, and the union of two template images is an image that has foreground pixels where either of the two template images has a foreground pixel. For a path $\pi$, $$\Delta_\pi = x_{P+1} - x_1 = \sum_{i=1}^{P} \Delta_{t_i} \tag{8}$$

is defined to be the displacement of the path and $\Delta x_\pi$ and $\Delta y_\pi$ denote the x and y components of $\Delta_\pi$, respectively. A pair $(x_i, t_i)$ consisting of one of the positions defined by (5) or (6) and the corresponding transition of the Markov source will be called a "labeled transition image origin position." The set of all such pairs defined by a complete path is called the set of labeled transition image origin positions of the path. For each transition t, let $N_t$ denote the number of transition image origin positions of the path that are labeled with t and let the corresponding transition image origin positions be denoted $x_1^{(t)} \ldots x_{N_t}^{(t)}$. Thus, $$P = \sum_{t \in B} N_t \tag{9}$$

Based on the premise that fonts are typically designed so that the foreground pixels of the character glyphs do not overlap (i.e., share the same foreground pixels) in text strings, image source models of the type illustrated in FIG. 9 and in this illustrated implementation are required to be designed so that $$Q_{t_i}[x_i] \cap Q_{t_j}[x_j] = \phi \tag{10}$$

for $i \neq j$, for every path $\pi$. The requirement expressed in (10) may be referred to as the "template disjointness constraint" of neighboring template supports.

Image source model 820 (FIG. 9) defines a relation, or mapping, between message strings and images via an underlying path and (2) and (7) that is bi-directional. While the primary concern in document recognition is decoding—that is, recovering messages (i.e., transcriptions) from observed images—image source model 820 can also function as an imaging model for use in generating an image of a specified message. Equation (7), in view of (10), defines an imaging model that can be conceptually viewed as follows: Imagine a collection of transparent plastic sheets, on each of which is painted one copy of some template Q, with the origin of Q at the center of the sheet. For each transition $t_i$ of path $\pi$, a sheet containing $Q_{t_i}$ is placed on top of a stack of transparencies with the center of the sheet aligned at $x_i$. (The template disjointness constraint ensures that the support of $Q_t$ does not overlap with the support of a template on a previous transparency.) Individual plastic sheets are likely to overlap significantly, and it is permissible for template bounding boxes to overlap, since bounding boxes play no particular role in this imaging model. The complete stack of transparencies defines the image, $Q_\pi$.

As noted above, an image source model defines a finite state acceptor for the language of messages generated by the model. Thus, given a message string M, it is straightforward to determine if there is a complete path $\pi$ for which $M_{90}=M$, and, if such a path exists, to find one. The image $Q_\pi$ defined by (7) is then an image of M. If the image source model defines a deterministic acceptor for the message language, the process of message imaging using the image source model admits a simple procedural interpretation, similar to the "turtle geometry" interpretation for strings generated by Lindenmayer systems in computer graphics. Imagine an imager automaton (referred to as an "imager") that draws what may be called an "ideal" image in an output image plane under the control of an input message "program". The structure of the imager is defined by a finite state image source model of the type illustrated in FIG. 9. The imager begins at location (0,0) of the output image plane in internal state $n_I$. The imager examines the first character in the input message, compares it with the message labels on the transitions from $n_I$, and selects the branch whose message matches the input character. If the template associated with the selected branch is non-null, the imager draws a copy of the template on the output image plane, with the template origin aligned with the imager's current image position. The imager then increments its image position by the branch displacement and updates its internal state to the successor node of the selected branch. This process is repeated for each character of the input message until ideal image $Q_\pi$-and a path through the network from initial node, $n_I$ to the final node, $n_F$-is completed.

As an image decoder, image source model 820 may be used to extract simple text strings from an observed image to produce a literal text transcription of the image (i.e., a transcription without formatting or logical structure tags.) These text strings are extracted from the message string attribute associated with each transition included in a path identified through model 820 as the observed image is being decoded. Image source model 830 in FIG. 14 models a set of 2D images having the common spatial structure of a simple text column and will be used to illustrate the process of image decoding in more detail. A simple text column consists of a vertical sequence of text lines, alternating with white (background) space. Horizontally, a text line is a sequence of characters typeset according to the sidebearing model shown in FIG. 1. 2D image source of glyph samples 10 is a representative image of the type modeled by image source model 830. Model 830 models a path through a 2D image of a single column of text that follows the conventional reading order for a text in the English language, assuming that the path through the image starts at the top left corner of the image and proceeds to the bottom right corner, and proceeds from the left of the image to the right in repeated 1D line sequences. Each transition $t_i$ between nodes in the network has the associated 4-tuple of attributes, shown in FIG. 14 in the order $[\alpha_{t_i}]$ $(\Delta_t)$, $m_t$, $Q_t$, where, when a template $Q_t$ is associated with a transition, the message string $m_t$ identifies the character represented by the template. It can be seen that some of these attributes are null for some transitions.

With reference now to FIG. 14, state $n_1$ corresponds to the creation of vertical white space. Each time branch $t_1$ is traversed, the imager moves down one row without drawing anything on the output image plane, since no image template is associated with $t_1$. At some point, the imager reaches the top of a text line and follows branch $t_2$. The displacement (0,B) of $t_2$ moves the cursor down to the text baseline; B is the font height above baseline. State $n_2$ represents the creation of a horizontal text line. The self-transitions from $n_2$ to $n_2$ are of two types. The F transitions $t_i$ that are labeled with image templates $Q_i$ and single-character message strings "$c_i$" are used to draw individual glyphs on the output image plane. The horizontal displacement associated with each of these branches is the character set width, $W_{t_i}$. Branches $t_3$ and $t_4$ have blank templates associated with them and represent white space. Branch $t_3$ represents a white space of minimal (1 pixel) width and is used for fine spacing adjustment. Branch $t_4$ corresponds to a real space character of font-dependent width $W_s$ and is labeled with a space message " ". At the end of a text line, the imager traverses $t_5$ ("line feed") and enters "carriage return" state $n_3$. The message on $t_5$ is the new line character "\n". The vertical displacement associated with $t_5$ is the font depth D. Each traversal of branch $t_6$ moves the imager left by one pixel. Finally, transition $t_7$ returns the imager to state $n_1$ and the process is repeated for the next text line. After the last text line has been created, the imager traverses $t_8$ into final state $n_F$.

The transition probabilities illustrated in FIG. 14 have been set manually. Actual experience with image source model 830 suggests that the exact values of the transition probabilities are not important in determining the most likely path through the network, given an observed image, except when the observed image alone is insufficient to reliably distinguish between alternative possibilities, for example, as a result of noise.

It can be seen that glyph image origin positions and character labels are available from the best path through the network produced from decoding an observed image. However, successful decoding of an observed 2D image using 2D image source models of the type illustrated in FIGS. 9 and 14 assumes an existing set of character templates of a certain level of quality and suitability for the decoding task. When such a set of character templates does not exist prior to training, decoding an observed 2D image for the purpose of producing training data, with no other information available about the glyphs in the image, would be highly inefficient and would be unlikely to provide accurate training data. The illustrated implementation of the present invention is premised on the discovery that decoding using the finite state image source model could be the basis for producing accurate training data if a transcription were provided of the observed 2D image used as the source of glyph samples, regardless of whether an existing, good-quality set of character templates existed. The role of the transcription in the production of high quality training data is discussed next.

3. The transcription network

Transcription data structure 70, which represents a set of possible transcriptions associated with 2D image source of glyph samples 10, is also represented as a finite state network, referred to hereafter as a "transcription network." Transcription network 850 is a simplified form of a finite state image source model of the type illustrated in FIG. 9 in which each transition is associated with a message string $m_t$, but no other attributes. FIG.15 shows a simple example of a portion 852 of transcription network 850 for transcription 70, representing the set containing the two transcription strings "orn\n" and "om\n" where the symbol "\n" represents the new line character. In the illustrated implementation, as is the case with image source model 830, each transition message string $m_t$ of transcription network 850 is assumed to be either the empty string $\epsilon$ or else contains a single character. It is known that a network that contains message strings with multiple characters may be transformed into an equivalent network in which each message string contains either zero or one character by introducing additional nodes and transitions. Thus, this assumption incurs no loss of generality. The data structure representing transcription network 850 is a received and stored, in box 292, as an input to the template training method in the illustrated embodiment. Transcription network 850 may be produced from transcription data structure 70 by a prior manual or automated process, such as by a process that uses conventional tools for producing finite state string grammars and transition networks.

Transcription network 850 is capable of generating a complete path through the network from which one of the set of transcriptions 70 associated with 2D image 10 is available from the transitions composing the path. Thus image source model 830 and transcription network 850 jointly define an ideal image that is a spatial arrangement of copies of character templates placed at specified image locations in the ideal image and selected according to a message string consistent with the transcription, and this ideal image is an approximation of the actual input 2D image with which the transcription is associated. It follows from this that decoding 2D image 10 using image source model 830 would be most efficient if decoding were able to be constrained to generate only ideal images, and consequently paths, that were consistent with the paths, and consequently message strings, generated by transcription network 850. Such a constraint can be imposed on the decoding process that uses image source model 830 by merging image source model 830 with transcription network 850.

4. Merging the transcription network with the 2D image source image network

The inputs to the network merge step 300 (FIGS. 12 and 13) are 2D image source model 830 and transcription network 850. The output of this step is a second Markov image source model of the type illustrated in FIG. 9, called the transcription-image network 870. Transcription-image network 870 is defined by the following two properties: (a) for each complete path $\pi$ in the transcription-image network there is a complete path in image source model 830 which has the same transcription string and image as $\pi$; and (b) for each complete path $\pi$ in image source model 830, if the transcription of $\pi$ is in the set of transcriptions generated by transcription network 850, then there is a complete path in transcription-image network 870 which has the same transcription string and image as $\pi$. The set of transcriptions generated by the transcription image network is the intersection of the set of transcriptions generated by image source model 830 and the set of transcriptions generated by transcription network 850. The ideal images generated by the transcription-image network that have a given transcription are the same as those generated by image source model 830 having that transcription.

For Markov image sources and finite state transcription networks as defined in the illustrated implementation, network merging step 300 may be implemented as follows. Let $N=\{n_0 \ldots n_{N-1}\}$ be the states of image source model 830, where $n_0$ is the initial state $n_I$ and $n_{N-1}$ is the final state $n_F$. Similarly, let $S=\{s_0 \ldots s_{T-1}\}$ be the states of transcription network 850, where $s_0$ and $s_{T-1}$ are the initial and final states, respectively. For each image source model or transcription network transition t, it is assumed that message $m_t$ is either the empty string $\epsilon$ or a string containing exactly one character, as discussed previously. The network formed from combining image source model 830 and transcription network 850 contains NT states, which correspond to pairs of image source and transcription network states. The set of states of a combined transcription-image network may be written $$\{(n_i,s_j) | i=0 \ldots N-1, j=0 \ldots T-1\} \quad (11)$$

Network merging step 300 is essentially concerned with constructing transitions between pairs of image source and transcription network states in the merged transcription-image network such that the transcription-image network satisfies the two properties (a) and (b) defined above. These transitions are constructed according to the following three steps.

1. For each transition t of image source model 830 for which $m_t=\epsilon$ (i.e. the message associated with t is the null string) and for each j=0 ... T−1: add to the transcription-image network a transition from node $(L_t, s_j)$ to node $(R_t, s_j)$. The message, template and displacement associated with each such transition of the transcription-image network are the same as those of t.

2. For each transition t of image source model 830 for which $m_t \neq \epsilon$ (i.e. the message associated with t is a single-character string) and for each transition t' of transcription network 850 for which $m_{t'}=m_t$: add to the transcription-image network a transition from node $(L_t,L_{t'})$ to node $(R_t,R_{t'})$. The message, template and displacement associated with each such transition of the transcription-image network are the same as those of t.

3. For each transition t' of transcription network 850 for which $m_{t'}=\epsilon$ and for each i=0 ... N−1: add to the transcription-image network a transition from node $(n_i,L_{t'})$ to node $(n_i,R_{t'})$. The message and template associated with each such transition of the transcription-image network are both empty, and the displacement is the vector 0.

Figure 16:
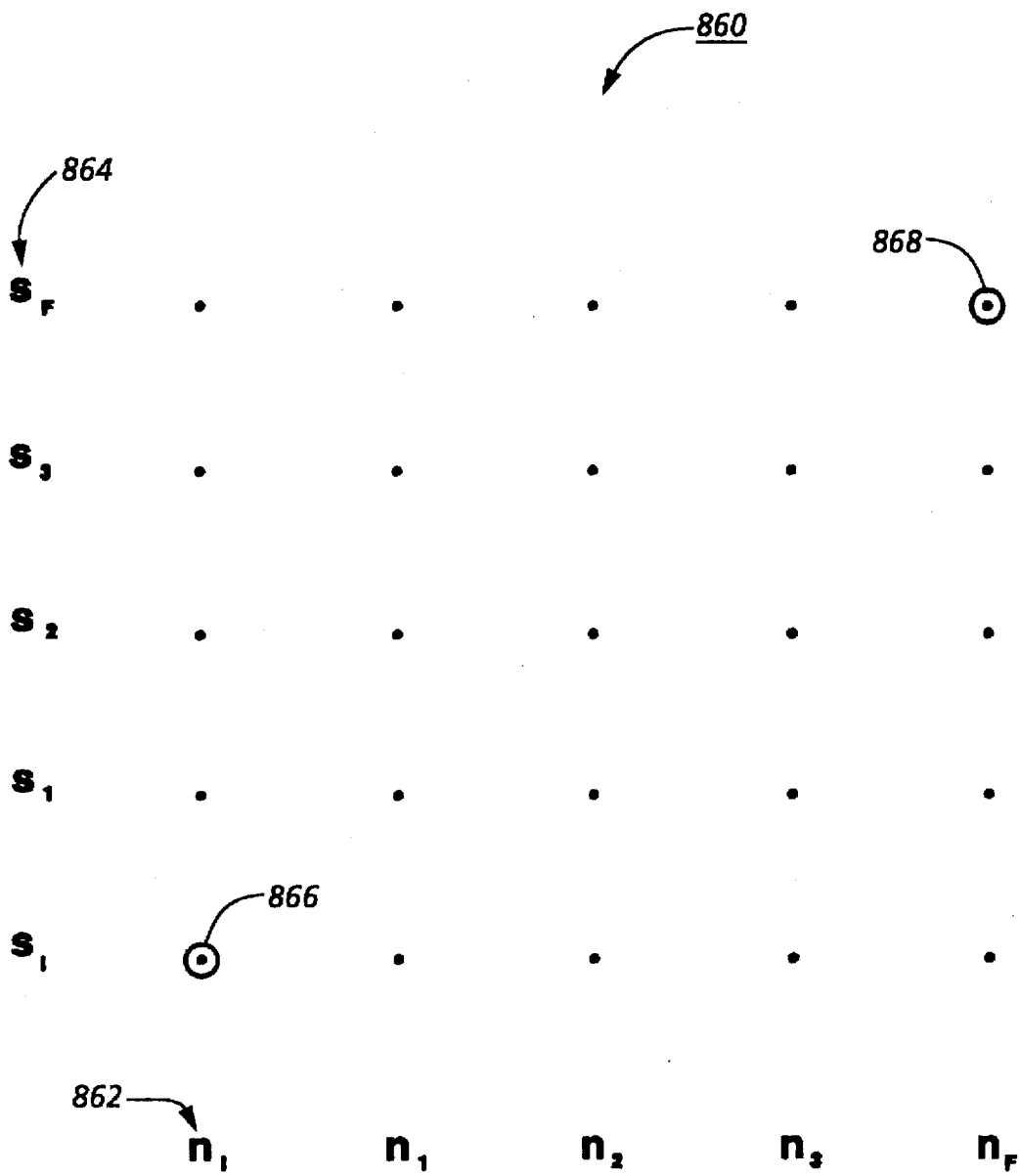
FIGS. 16, 17, 18 and 19 schematically illustrate the merging of the finite state transition network of FIG. 14 with the transcription network of FIG. 15, according to the illustrated implementation of the present invention.
Figure 17:
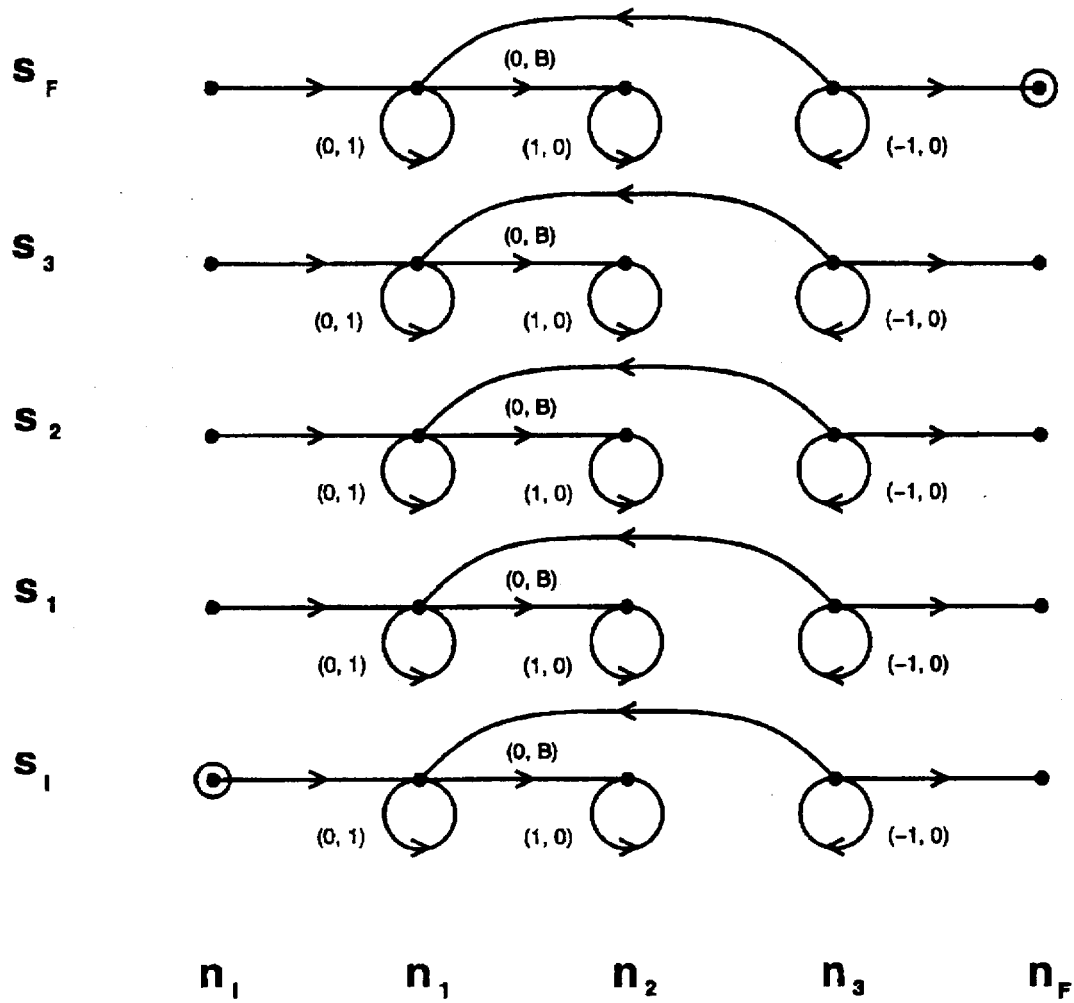
Figure 18:
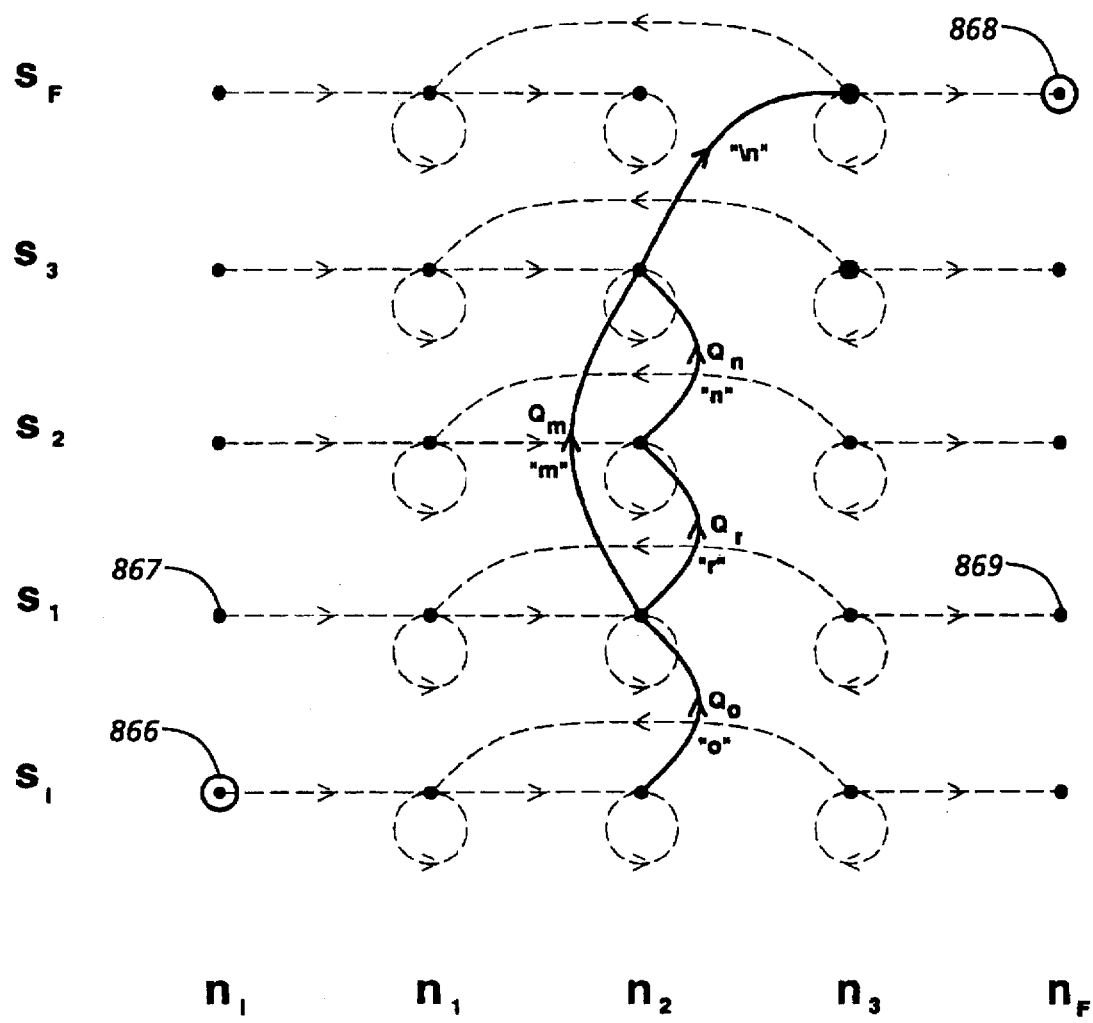
Figure 19:
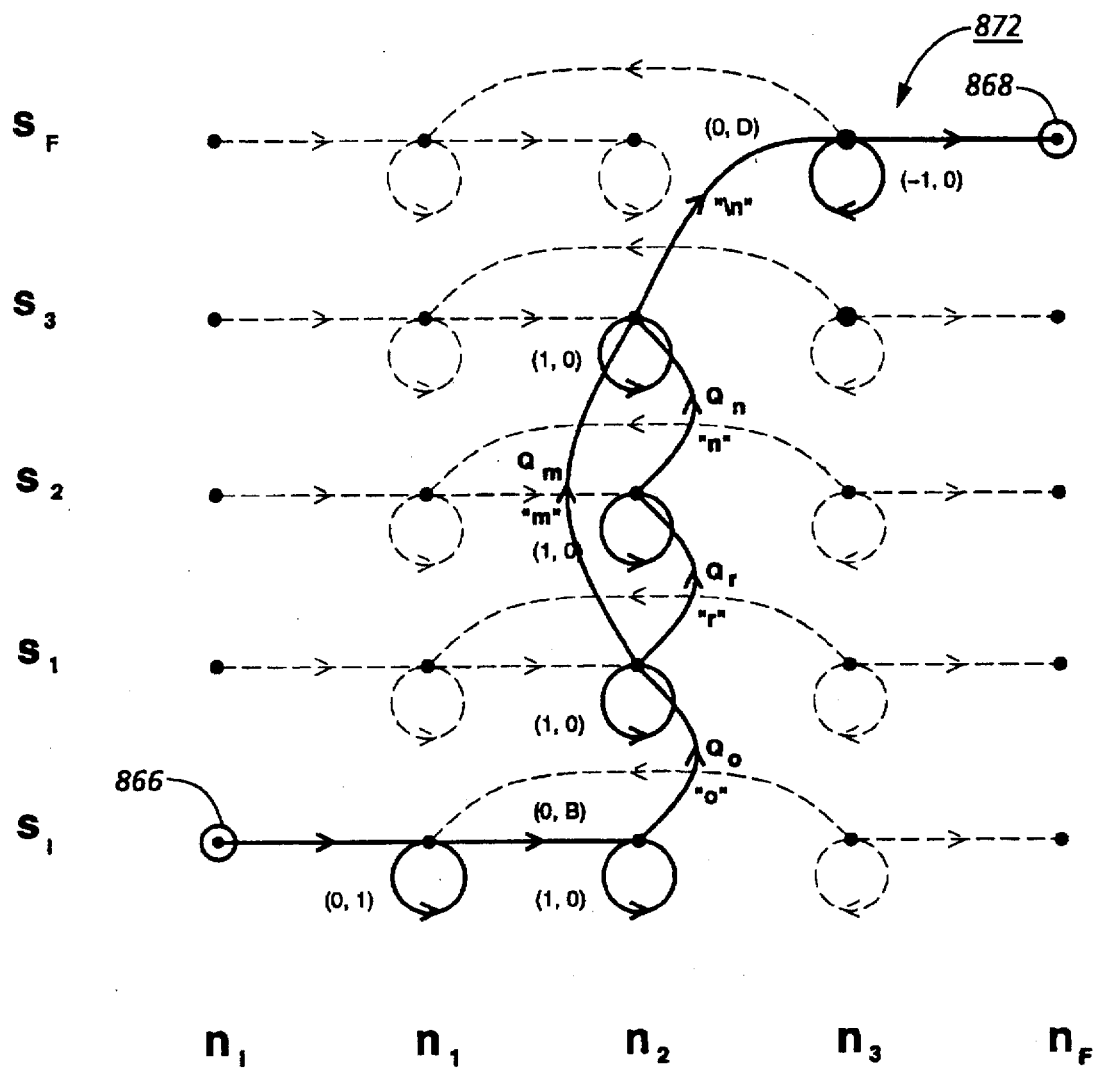
Figure 20:
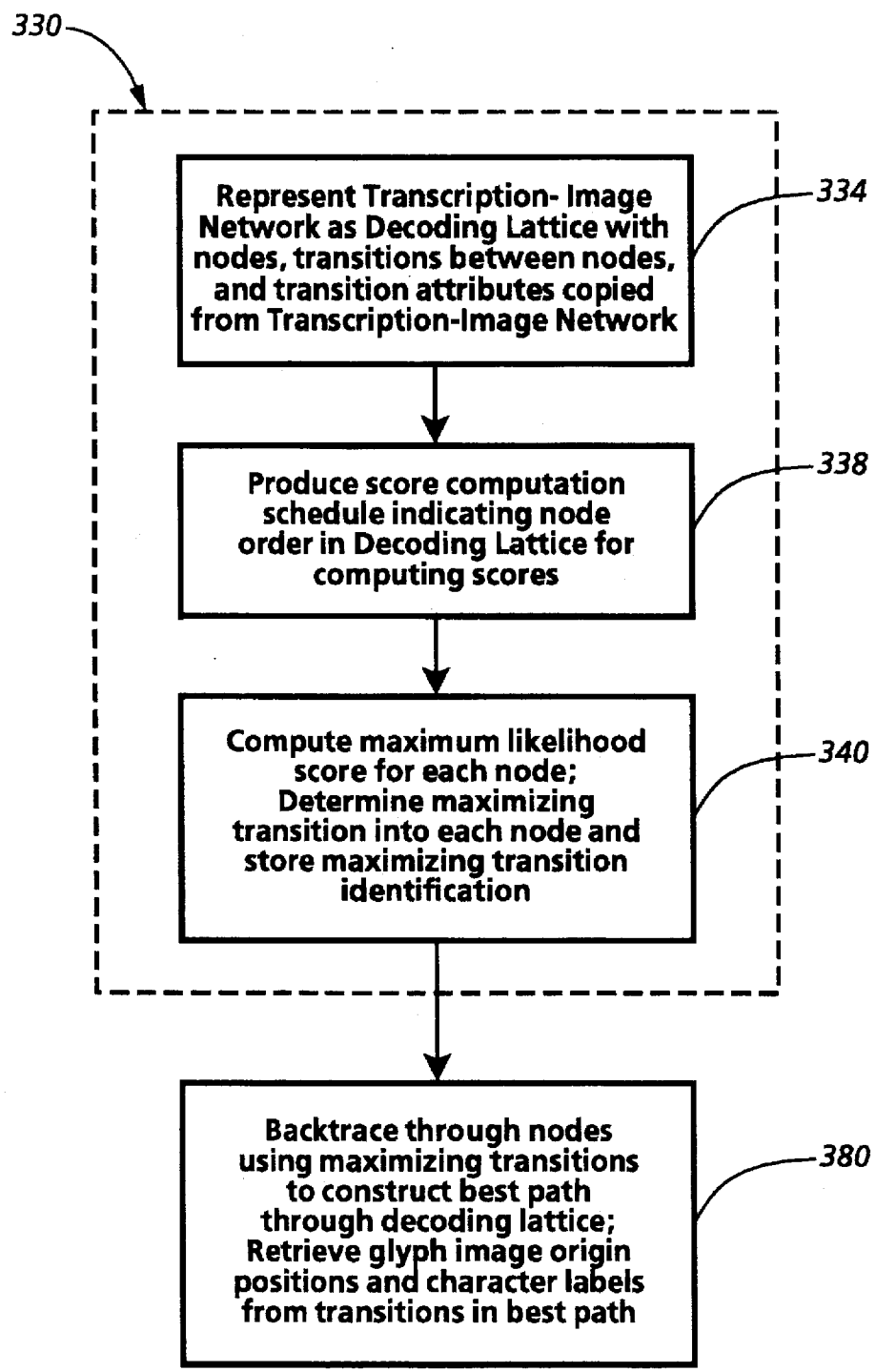
FIG. 20 is a flow chart illustrating the decoding step in the flowchart in FIG. 13 as a Viterbi decoder, according to the illustrated implementation of the present invention.

The construction of a portion of transcription-image network 870 is schematically illustrated in FIGS. 16, 17, 18 and 19 using image source model 830 of FIG. 14 for the simple text column and portion 852 of transcription network 850 shown in FIG. 15. FIG. 16 illustrates the nodes of the transcription-image network constructed by network merge process 300 as dots or points in a two-dimensional (2D) lattice 860, with image source model nodes 862 positioned horizontally and transcription network nodes 864 positioned vertically in 2D lattice 860. The lattice points 866 and 868 for the initial state $(n_I,s_I)$ and the final state $(n_F,s_F)$, respectively, are each represented by a circle around a dot. FIG. 17 shows the transcription-image network after constructing transitions in the transcription-image network according to step (1) of the above procedure. For simplicity, transition probabilities are not shown. FIG. 18 shows the transitions of FIG. 17 added in step (1) of the network merge process as dotted lines, and shows the transitions that are added to the transcription-image network in step (2) of the above procedure in solid lines. Again, transition probabilities and displacements are not shown. Because transcription network 850 in FIG. 15 contains no transitions with empty message strings, step (3) of the above procedure for constructing transitions is not applied in this example.

During the decoding step 330 of FIGS. 12 and 13 (described below), the decoder finds the best complete path through the transcription-image network, i.e., a path from initial state 866 to the final state 868. It is clear from FIG. 18 that some of the nodes in the combined transcription-image network cannot possibly lie on a complete path, since either there is no way to reach them from start node 866 or no way to reach final node 868 from them. For example, there is no path from the start node 866 to node 867, $(n_i,s_1)$. Similarly, there is no path from node 869, $(n_F,s_1)$, to final node 868. Any node that cannot lie on a complete path may be deleted from the combined transcription-image network prior to its use in decoding, as can all transitions that enter or leave a deleted node. FIG. 19 depicts the portion 872 of the combined transcription-image network that remains after this simplification is performed. Note that this simplified, or merged, network contains significantly fewer states and transitions than the combined transcription-image network of FIG. 18. Thus, network simplification after merging, typically leads to faster decoding of the input source of glyph samples.

5. Decoding the 2D image source of glyph samples to produce labeled glyph sample image origin positions Decoding process 330 (FIG. 13) may be accomplished using any type of software- or hardware-implemented decoder suitable for decoding 2D image 10 using the merged transcription-image network to produce the labeled glyph image origin positions indicating the glyph samples in 2D image 10. In particular, a decoder based on a dynamic programming algorithm that minimizes the probability of error between the original input 2D image and a target ideal 2D image, $Q_n$, is likely to be the most appropriate decoding process to use for a particular implementation. More information on suitable decoding processes is available in the earlier-referenced Chou and Kopec, "A stochastic attribute grammar model."

In general, a decoding process of the type suitable for use in the present invention will identify some or all of the complete transcription-image paths through the transcription-image network, each of which indicates a target ideal 2D image, $Q_t$, and will determine which one of the identified paths is the best path, by determining which target ideal 2D image best matches the 2D image source of glyph samples according to a defined matching criterion. The best path through the network is the transcription-image path that indicates the best-matched target ideal 2D image; transition image origin positions in the 2D image source of glyph samples can be computed from the transitions that make up this best path, and glyph image origin positions and their labels are available, in turn, from selected ones of the transitions and their transition image origin positions. The matching criterion may be any suitable image measurement; typically, the matching criterion will involve optimizing a pixel match score for the target ideal image compared to the 2D image source of glyph samples.

Decoding process 330 (FIG. 13) in the illustrated implementation is accomplished using a Viterbi decoder, described in detail in Kopec and Chou, "Document Image Decoding," and in U.S. Pat. No. 5,321,773. It finds the maximum a posteriori (MAP) path through the transcription-image network, using the assumed asymmetric bit flip channel model, also described in Kopec and Chou, "Document Image Decoding," and shown in FIG. 5 therein. The purpose of the Viterbi decoder is to maximize a recursive MAP decision function over all complete paths through the transcription-image network in order to determine the most likely path through the network. As noted above in the discussion of decoding using image source model 830, each complete path through the transcription-image network corresponds to an ideal image produced during decoding. Thus, the Viterbi decoder determines which ideal image, of the possible ideal images produced from complete paths through the network, is closest in appearance (by pixels) to the input image being decoded, i.e., 2D image 10. It does this by computing a likelihood measurement, or likelihood score, for a path defining an ideal image that is the summation of scores for individual transitions in the path. The general operation of the Viterbi decoder is discussed next; the references cited above should be consulted for the mathematical foundation of decoding process 330 and for additional details about the process.

FIG. 20 is a flow chart illustrating the sequence of steps implementing the Viterbi decoder of decoding process 330 of the illustrated embodiment. Viterbi image decoding involves path-finding in a three-dimensional decoding lattice, also called a decoding trellis. The decoding lattice is composed of nodes that may be viewed as forming a stack of image planes, one for each node or state of the source model. There is a one-to-one correspondence between paths in the transcription-image networks and paths in the lattice, and corresponding transitions between nodes in the lattice have the same attribute information as transitions between states in the transcription-image network. Thus, in step 334, transcription-image network 870 is first represented in a data structure as the decoding lattice. Next, in box 338, the order in which scores for the nodes in the lattice are to be computed must be determined; this is accomplished by producing a score computation schedule for the recursion, indicating in which order the nodes of the lattice are to be visited and consequently, in which order the node scores are to be computed. Then, the maximum likelihood scores for each node, in the order prescribed by the schedule, are computed, in box 340. For each node, the transition into that node that maximizes the likelihood score is identified and stored. The steps of decoding process 330 have been illustrated as being performed in a particular sequence for purposes of describing the functions that are performed during decoding according to the illustrated implementation; they may be, and usually are, performed contemporaneously in an actual software implementation.

At the conclusion of decoding, after the likelihood score for the $n_F$ image plane in the decoding lattice has been computed, the most likely complete path found by the Viterbi decoder is retrieved, in box 374, by backtracing through the stored transitions from the final node to the initial node in the decoding lattice to identify the transitions that compose the best path, and to compute the transition image origin positions $(x_i, t_i)$ in 2D image 10 using equations (5) and (6) above. Each transition of the best path defines one transition image origin position. However, not all of these image positions in 2D image 10 are of interest; a filtering step 380 identifies the transitions that indicate estimated glyph image origin positions in 2D image 10 (i.e., the transitions that include as attributes non-null character templates for characters in the glyph sample character set), extracts these image origin positions from all of the identified transition image origin positions, and pairs these image origin positions with the respective character label of the template attribute on each of the identified transitions.

Decoding provides an estimate of the image origin position of a glyph sample in 2D image 10, but does not provide information about the extent or size of the glyph sample in the image. The image origin positions are considered to be estimates of positions of glyph samples in the input image because decoding may produce imperfect results such as, for example, when an errorful transcription or a noisy 2D image 10 is an input into the training procedure.

Figure 22:
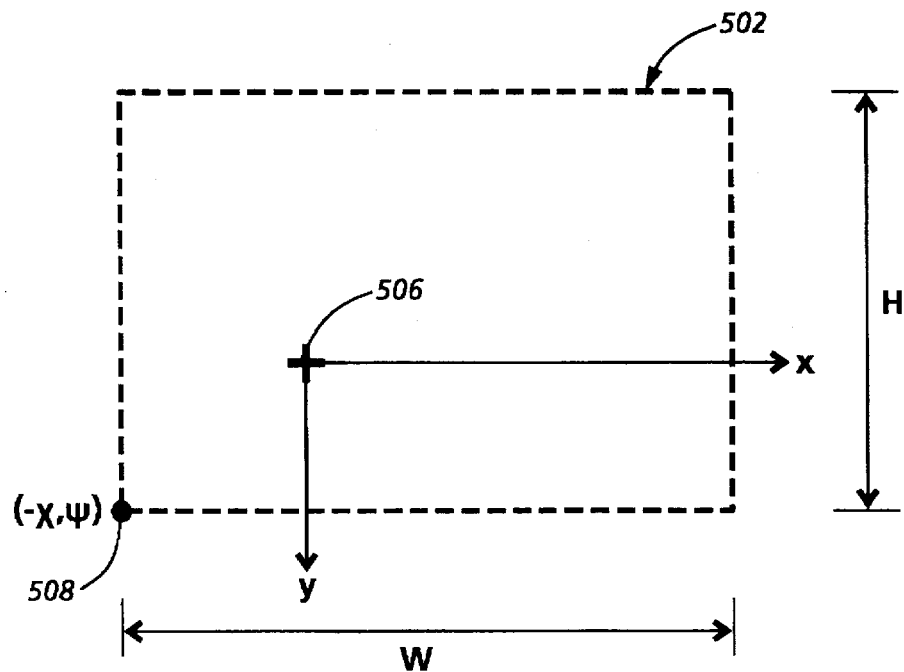
FIG. 22 illustrates the concept of a template image region used for storing a trained template during the template construction technique illustrated in FIG. 21.
Figure 23:
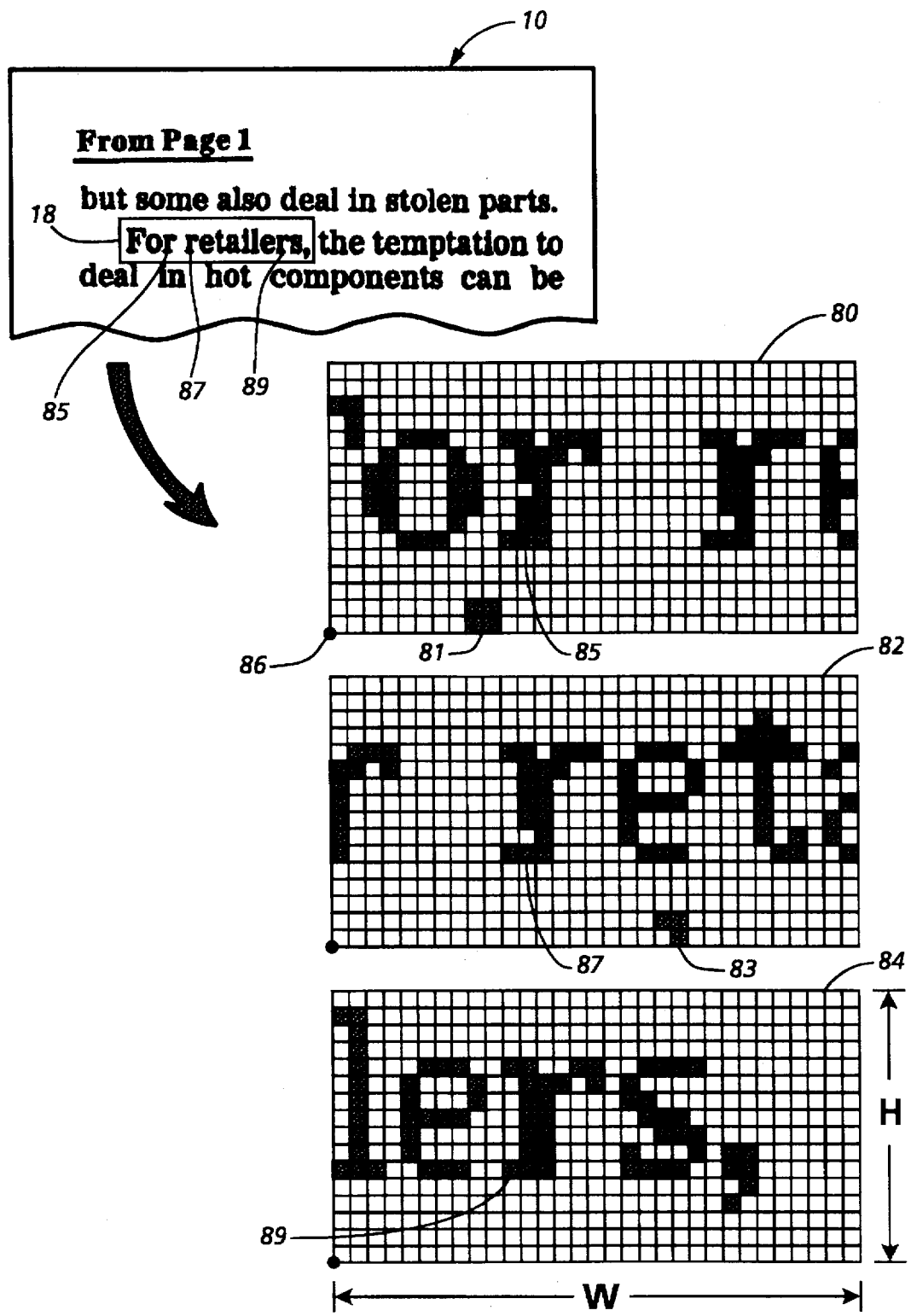
FIG. 23 illustrates the sample image regions that are identified in the 2D image source of glyph samples from which the templates are trained according to the template construction technique illustrated in FIG. 21.
Figure 24:
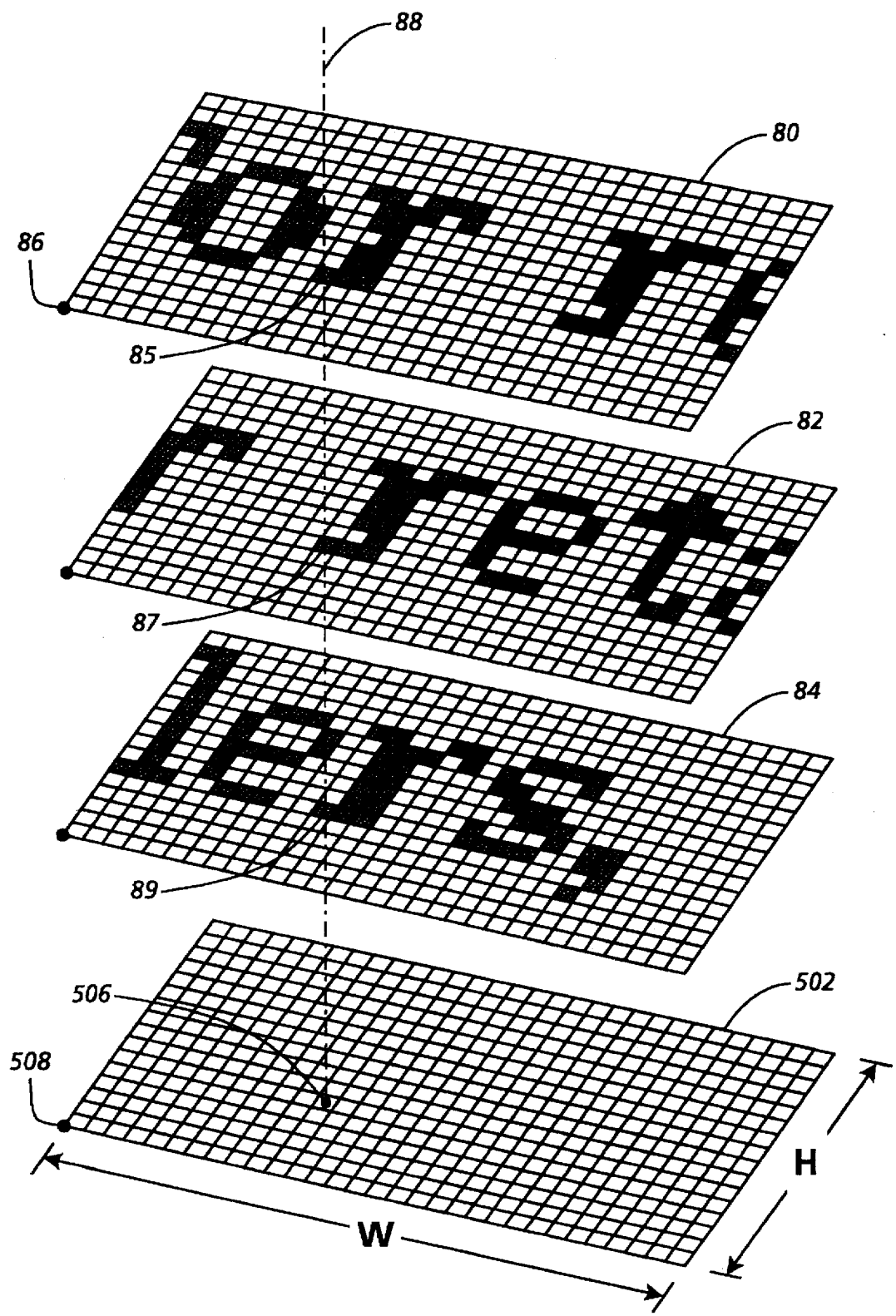
FIG. 24 is a schematic image of three sample image regions of the 2D image of FIG. 2, layered above the template image region of FIG. 22, illustrating the concept of sample image regions aligned at image origin positions of the glyph samples, according to the illustrated implementation of the present invention.
Figures 26, 28:
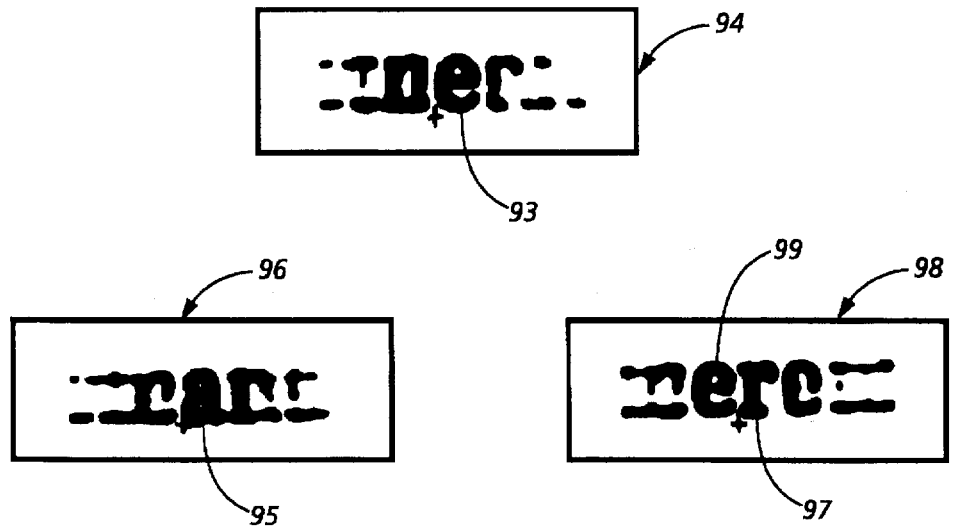
FIG. 26 shows three exemplary but unsatisfactory templates produced using a technique that does not observe an important mathematical constraint imposed on character templates.
FIG. 28 shows a final set of trained templates produced according to the novel template construction technique illustrated in FIG. 27.

6. Template construction from training data composed of labeled glyph sample image origin positions Character template construction process 270 (FIG. 11) has been implemented as novel template construction technique 400 in FIG. 13 and produces a set of trained, labeled character templates without prior segmentation of the training data into isolated glyph samples and without identifying bounding boxes for the samples. Template construction technique 400 identifies each glyph sample in the training data using only the x,y coordinate position in 2D image source of glyphs 10 indicating an image origin position and the label identifying the character represented by the glyph sample located at the respective image origin position. FIGS. 21 through 28 illustrate the template construction technique of the present invention. FIG. 21 illustrates the general steps of the template construction technique. FIG. 22 illustrates the concept of a template image region used for storing a trained template, while FIG. 23 illustrates the sample image regions that are identified in the 2D image source of glyph samples from which the templates are trained. FIG. 24 illustrates the concept of aligning the sample image regions at respective image origin positions, and shows the pixel relationships between aligned sample image regions and a template image region. FIG. 25 shows a collection of sample image regions clipped from the 2D input image for use in training a template. FIG. 26 shows three exemplary but unsatisfactory templates produced using a technique that does not observe an important mathematical constraint imposed on character templates, while FIG. 28 shows a final set of trained templates produced according to the novel template construction technique illustrated in FIG. 27 that substantially observes the template constraint.

a. Creating template image regions for storing templates

With reference to FIG. 21, the first step in template construction is to create a template image region, in box 410, for storing each binary character template to be produced from the training data. Each pixel position in each template image region initially indicates a background pixel color value. In principle, the template image region for each character extends over an entire image plane that is unbounded in all directions. However, the support of a template is typically localized to a relatively small region surrounding the template's origin pixel location so that the template image region is selected to be some bounded image region smaller than the entire image plane, but large enough to contain the entire support of a template. FIG. 22 illustrates exemplary template image region 502 which assumes that the support of each template $Q_t$ lies within a rectangle of height H and width W. Template image region 502 will also be referred to as the "canvas" of the template. The shape of the template canvas is fundamentally arbitrary, and is typically selected on the basis of assumptions about the character set for which templates are being trained, and about the samples in the training data. For example, the use of a rectangle having a width greater than its height as the shape for the canvas in this illustrated implementation is based on the fact that images of characters in the English language character set are placed along horizontal text lines that are divided by horizontal areas of white space. In addition, the canvas shape may also be selected or modified for purposes of optimizing the performance of the template construction procedure.

The selection of the vertical and horizontal size dimensions of the canvas, i.e. the height H and width W canvas parameters, is made on the basis of two factors that make use of information about the characters in the character set being trained. First, H and W canvas parameters are selected so that the resulting image region created is large enough to entirely contain the support of a single template; in effect, selection of the H and W canvas parameters reflects the decision that pixels outside the canvas are assumed not to be part of the template and are assumed to be the background (white) color. Secondly, as will be discussed shortly, the canvas is used to establish regions of the 2D image in which glyph samples are assumed to be contained; therefore, selection of the H and W canvas parameters is also made so that the resulting image region created in the 2D input image is large enough to entirely contain at least a single glyph sample. Moreover, the canvas should be large enough to completely contain at least a single glyph even when the glyph origins are inaccurately determined during the previously-described decoding process.

While it might appear that the canvas image area is somewhat similar to the concept of a bounding box because it establishes an image boundary within which it is assumed that a template or glyph sample is entirely contained, such an image boundary is only very roughly-defined and the defined region is not a minimal one. Selection of the canvas shape and size is not made with the same intent with which bounding boxes for glyph samples are found in conventional segmentation processes; the goal of such segmentation is typically to find precise and minimal image dimensions for use in assigning pixels to one glyph sample as opposed to another, while the goal of the canvas rectangle is to find an image region for which it can be said that all pixels outside the canvas rectangle are not included in the template or glyph sample, a concept clearly distinguishable from a bounding box. In addition, the template construction procedure may provide for the user of the training system to enter the H and W canvas parameters as an input into the procedure. In the illustrated embodiment, the template construction procedure has been implemented using a template canvas selected to be from three to five times the size of the largest template bounding box for the characters in the character set being trained.

With continued reference to FIG. 22, template canvas 502 has a local coordinate system associated with it in which x increases to the right, y increases downward, and the origin 506 of the coordinate system is at $(X, -\psi)$ relative to the lower left corner 508 of canvas 502; thus lower left corner 508 of canvas 502 has coordinates at $(-X, \psi)$ relative to the local coordinate system, where $0 \leq X < W$ and $0 \leq \psi < H$. The canvas rectangle 502 is denoted by C, so that $$C = [-x, -x + W - 1] \times [\psi - H + 1, \psi] \qquad (12)$$

Canvas parameters H, W, X and $\psi$ need not be uniform for all templates, and may vary by the particular character template being stored; it is usually more convenient to use the same canvas parameters for each template being trained. The template image regions in the illustrated embodiment have uniform canvas parameters.

Each character template includes a pixel position designated as the template's origin that is assumed to lie within canvas 502. The template origin pixel position is illustrated in FIG. 22 as template origin 506. Designation of template origin 506 within canvas rectangle 502 is arbitrary, subject to the constraint that the template to be stored in canvas rectangle 502 must be entirely contained within canvas rectangle 502 when its origin is placed at selected template origin 506. In the illustrated embodiment, satisfactory results have been achieved when template origin 506 is designated to be a pixel position to the left of and below a center pixel position in canvas rectangle 502.

b. Identifying sample image regions in the 2D input image

With reference again to FIG. 21, the next step in the template construction procedure of the present invention, in box 430, is to determine a sample image region in the 2D image source of glyphs 10 for each labeled glyph image origin position included in the training data produced as the output of the network merging and decoding processes described above. In theory, the sample image region could be defined to be the entire 2D image 10. However, in practice, it is more efficient to work with a smaller, bounded image region within 2D image 10. Template image region 502 is used as a pattern, or guide, in determining two important characteristics of each of these sample image regions: first, the sample image region in 2D image 10 for each labeled glyph image origin position in the training data has vertical and horizontal size dimensions identical to the vertical and horizontal size dimensions (the H and W canvas parameters) of canvas rectangle 502; secondly, the glyph image origin position of the glyph sample is located in the sample image region at a pixel position that is coincident with, or respectively paired with, the pixel position in canvas rectangle 502 designated as template origin position 506. The result of identifying the sample image regions in this manner is to produce a collection of sample image regions in 2D image 10 for each unique character identified by the glyph labels associated with glyph image origin positions in the training data.

FIG. 23 illustrates three sample image regions 80, 82 and 84 identified for glyph image origin positions 85, 87 and 89 in image region 18 of 2D image 10, each having a glyph label indicating the character "r." Each sample image region has the same height, H, and width, W, of canvas rectangle 502, shown by the H and W designations at the periphery of sample image region 84. Each sample image region has a local coordinate system having its origin aligned at the glyph image origin position, as illustrated in FIG. 23 by origin 85 of representative sample image region 80. Glyph image origin positions 85, 87 and 89 are located at pixel positions in sample image regions 80, 82 and 84 that have x and y displacements from the respective lower left corners of the sample image regions identical to the x and y displacements of template origin 506 from the lower left corner 508 of template canvas rectangle 502. It can be seen that the H and W canvas parameters of canvas rectangle 502 have been selected to be large enough to entirely contain the simplified glyph samples for the character "r," and in fact are large enough to contain all or portions of adjacent glyph samples. Sample image regions 80 and 82 also contain portions 81 and 83 of glyph samples occurring in an adjacent line of text in 2D image 10. It can also be seen that sample image regions 80, 82 and 84 are probably large enough to entirely contain the glyph samples for the character "r" even if glyph image origin positions had been inaccurately determined by several pixel positions in either the vertical or horizontal direction.

Identifying the sample image region for a labeled glyph image origin position can be summarized as follows: if vector $x_i=(x_i,y_i)$ is a glyph origin position within an image of text, the corresponding glyph sample image region is defined to be that portion of the text image within the region defined by $x_i-X \leq x < x_i-X+W$ and $y_i+\psi-H < y \leq y_i+\psi$. That is, the glyph sample image for a glyph position is that portion of the text image within the template canvas, when the template origin is coincident with the glyph origin.

Identifying glyph samples in 2D image 10 in this manner effectively accomplishes a partial segmentation and isolation of the glyph samples without performing a conventional segmentation process on 2D image 10. This type of partial segmentation reduces the processing needed to produce templates from samples that are the size of the entire 2D image, but because a sample image region is typically much larger than a bounding box that would contain the actual sample, this technique of partially segmenting the glyph samples is unlikely to introduce segmentation errors of the type introduced in conventional segmentation when pixels are assigned to one glyph sample as opposed to another. No such pixel assignments have been made at this point in the template construction procedure; identification of the sample image regions merely reflects the partial segmentation decision that all pixels outside each sample image region are not included in the glyph sample contained within the sample image region.

The term "aligned sample image regions" is introduced to denote the characteristic of each sample image region of the image origin position of the glyph sample being located at a pixel position in the sample image region that has x and y displacements from the lower left corner of the sample image region identical to the x and y displacements of the template image origin 506 from lower left corner 508 of template canvas rectangle 502. The concept of aligned sample image regions is illustrated in FIG. 24 which shows sample image regions 80, 82 and 84 of 2D image 10 from FIG. 23 stacked in layers, one on top of another, above canvas rectangle 502. Respective image origin positions 85, 87 and 89 of sample image regions 80, 82 and 84 are "vertically" aligned with each other, and with template origin position 506, along dotted line axis 88. Alignment of same-sized sample image regions at respective image origin positions in this manner establishes a spatial relationship, or pairing, among each respective pixel location in each of the sample image regions relative to the local coordinate system of the sample image region, and establishes the same spatial relationship, or pairing, between the set of paired pixel locations in the collection of sample image regions and a pixel position in canvas rectangle 502 relative to the template coordinate system. Each set of pixels in aligned sample image regions related in this manner will be referred to as "respectively paired pixels" or "aligned pixels."

All of the sample image regions identified in 2D image 10 for a particular one of the characters in the character set for which templates are being trained are referred to as a "collection" of sample image regions. In the illustrated implementation, the collection of sample image regions is represented in a separate data structure of sample image regions that are aligned with each other and with template image region 502 at the image origin position. FIG. 25 illustrates data structure 90 that is the collection of sample image regions for the character "a" in the entire scanned newspaper article that is the image represented by 2D image 10. Data structure 90 is presented in FIG. 25 in rows and columns of concatenated, aligned sample image regions clipped from 2D image 10 according to the pattern provided by canvas rectangle 502; the sample image regions are shown with borders for purposes of illustration. Looking down column 92 of sample image regions, it can be seen that glyph samples of the character "a" are located at approximately the same position in each sample, which is coincident with the template origin position of the template canvas (not shown) for character "a." As FIG. 25 illustrates, a sample image region typically contains glyphs and/or parts of glyphs in addition to the glyph sample located at the template origin. Sample image region 91 has been identified to illustrate a mislabeled sample. It can be seen that as a result of the decoding operation, the label "a" has been given to an image origin position for a glyph that appears to be the character "s" in 2D image 10.

c. Mathematical foundation for constructing templates from aligned sample image regions using template pixel contribution measurements With reference again to FIG. 21, the next step in the template construction procedure of the present invention, in box 450, is to assign foreground pixel color values to the pixels in each canvas rectangle 502 for each character template to be produced, on the basis of the pixel color values in the sample image regions. Conventional character template construction techniques are concerned with assigning a color to each pixel of a template, given a set of isolated glyph samples for the character associated with that template, and require that the assignment of input image pixels to appropriate glyph samples be completed prior to template construction, as part of a character segmentation operation that creates isolated glyph samples. By contrast, the template construction procedure of the present invention constructs a set of character templates substantially contemporaneously by assigning a color to each pixel in a set of character templates, given a collection of glyph sample images for each of those characters. Unlike conventional practice, a glyph sample image in the technique of the present invention is permitted to contain parts of adjacent glyphs, as illustrated in FIG. 25. The template construction procedure of the present invention effectively determines, while character templates are constructed, which of the foreground pixels within a glyph sample image belong to the central glyph (i.e. the glyph whose origin is aligned with the template origin) and which belong to adjacent glyphs. The mathematical foundation for the template construction procedure proceeds as follows. The reader is reminded that the symbol x is used to denote a vector x and that an equation previously defined in the discussion is subsequently referenced by its equation number in parentheses. Recall also that C denotes a template canvas defined according to equation (12).

Let $q_t(x)$ denote the color of the pixel at position x of template $Q_t$, where t∈B is a transition of the Markov image source. A foreground pixel color is represented by a bit value of 1 (one), and a background pixel color by a bit value of 0 (zero). The objective of template construction is to assign a value to $q_t(x)$ for each transition t∈B and for each x∈C, given a set of labeled glyph image origin positions $(x_i, t_i)$, i=1 ... P.

Template construction according to the present invention is based on a maximum likelihood (ML) criterion. Let $(x_i, t_i)$, i=1 ... P be the set of labeled glyph image origin positions in some observed 2D image Z. As described above, these glyph image origin positions define a composite ideal image $Q_\pi$ by (7). As discussed in Kopec and Chou, "Document Image Decoding," for the asymmetric bit flip channel model shown in FIG. 5 therein, the log normalized likelihood of Z, given $Q_\pi$, may be written $$L(Z|Q_\pi) = \sum_{i|q_i=1} \left[ z_i \log \frac{\alpha_1}{1-\alpha_0} + (1-z_i) \log \frac{1-\alpha_1}{\alpha_0} \right] \quad (13)$$

$$= \sum_{i|q_i=1} \left[ \log \frac{1-\alpha_1}{\alpha_0} + z_i \log \frac{\alpha_0 \alpha_1}{(1-\alpha_0)(1-\alpha_1)} \right] \quad (14)$$

$$= \left[ (\text{\# of 1's in } Q_\pi) \cdot \log \frac{1-\alpha_1}{\alpha_0} \right] +$$

$$\left[ (\text{\# of 1's in } Q_\pi \wedge Z) \cdot \log \frac{\alpha_0 \alpha_1}{(1-\alpha_0)(1-\alpha_1)} \right] \quad (15)$$

$$= \gamma \|Q_\pi \wedge Z\| + \beta \|Q_\pi\| \quad (16)$$

where the symbol $\|X\|$ denotes the number of 1's in X and $$\gamma \equiv \log \frac{\alpha_0 \alpha_1}{(1-\alpha_0)(1-\alpha_1)} \quad (17)$$

$$\beta \equiv \log \frac{1-\alpha_1}{\alpha_0} \quad (18)$$

Note that the first term on the right hand side of (16) can be simply computed by counting the nonzero bits in the logical and of images $Q_\pi$ and Z, while the second term is a template-dependent bias that is independent of Z. Note that $\gamma > 0$ and $\beta < 0$ if $\alpha_1 > 1 - \alpha_0$. This condition simply means that the probability of a foreground template pixel producing a black pixel in the observed image is greater than the probability of a background pixel being observed as black. This is the normal situation.

The log normalized likelihood possesses an important decomposition property. If composite ideal image $Q_\pi$ is expressed as a disjoint union of templates $Q_{t_1} \ldots Q_{t_P}$, so that $$Q_\pi = \bigcup_{i=1}^{P} Q_{t_i}[x_i] \quad (19)$$

and $$Q_{t_i}[x_i] \cap Q_{t_j}[x_j] = \emptyset \quad (20)$$

for i≠j, then from (16) it is clear that $$L(Z|Q_{\pi m}) = \sum_{i=1}^{P} L(Z|Q_{t_i}[x_i]). \quad (21)$$

Note that (20) expresses a constraint on the supports, not the bounding boxes, of $Q_{t_i}$ and $Q_{t_j}$. Thus, (21) can be used to compute the log normalized probability (16) for a composite image even when the bounding boxes of the constituent templates overlap, as long as the constituent supports are disjoint. In particular, because of template disjointness constraint (10), the preconditions for decomposition (21) are satisfied if $Q_\pi$ is the composite image associated with path π through a Markov source and we have $$L(Z|Q_\pi) = \sum_{i=1}^{P} L(Z|Q_{t_i}[x_i]) \quad (22)$$

$$= \sum_{t \in B} \sum_{i=1}^{N_t} L(Z|Q_t[x_i^{(t)}]) \quad (23)$$

$$= \sum_{t \in B} \sum_{i=1}^{N_t} \{\gamma \|Q_t[x_i^{(t)}] \wedge Z\| + \beta \|Q_t\|\}. \quad (24)$$

By expanding the right hand side of (24) in terms of individual template pixel positions and color values, (24) may be expressed as $$L(Z|Q_\pi) = \sum_{t \in B} \sum_{x \in C} q_t(x) \left[ \gamma \sum_{i=1}^{N_t} z(x + x_i^{(t)}) + \beta N_t \right] \quad (25)$$

where $z(x) \in \{0, 1\}$ is the color of the observed image Z at pixel x. Template construction using the maximum likelihood criterion involves assigning values to $q_t(x)$ to maximize (25), subject to the template disjointness constraint (10).

The significance of template disjointness constraint (10) to the template construction technique of the present invention can be easily illustrated. If the template disjointness constraint is ignored, template construction using the ML criterion becomes straightforward and consists of separately maximizing each term of the right hand side of (25). Since $q_t(x) \in \{0, 1\}$, the ML decision rule is $$q_t(x) = \begin{cases} 1 & \text{if } S_t(x;Z) > 0 \\ 0 & \text{otherwise} \end{cases} \quad (26)$$

where $$S_t(x;Z) \equiv \gamma \sum_{i=1}^{N_t} z(x + x_i^{(t)}) + \beta N_t \quad (27)$$

The reason for explicitly noting the dependence of $S_t(x;Z)$ on Z becomes clear shortly from the following discussion. The condition $S_t(x;Z) > 0$ may be written as $$\frac{1}{N_t} \sum_{i=1}^{N_t} z(x + x_i^{(t)}) > \frac{-\beta}{\gamma} \quad (28)$$

which has the following interpretation: The left hand side of (28) is the fraction of pixels at location x that are black (i.e., foreground pixels) in the collection of aligned sample image regions for $Q_t$. Thus, $S_t(x;Z)$ may be referred to as an "aligned pixel score" or a "template contribution measurement" at location x for template $Q_t$. The ML decision rule (26) prescribes that the template pixel at x should be black if the fraction of black pixels at location x in the aligned sample image regions exceeds a threshold; equations (17) and (18) indicate that this threshold may be computed from the channel noise parameters $\alpha_0$ and $\alpha_1$. Simply, if the template disjointness constraint is ignored, each ML template may be independently computed by averaging and thresholding the collection of aligned sample image regions for the template, pixel by pixel.

FIG. 26 shows three templates 94, 96 and 98, selected from a set of templates, constructed from collections of sample image regions for the characters "e," "a" and "r," respectively, using (26) without observing template disjointness constraint (10). The sample image regions used were similar to those in FIG. 25 and were extracted from the scanned image of a newspaper column similar to 2D image 10. It can be seen that templates 94, 96 and 98 clearly include the "correct" template images 93, 95 and 97, aligned at the origin of each canvas rectangle (indicated by the "+".) However, it can also be seen that each template canvas includes black pixels that clearly do not belong to the template. These extra black pixels occur in the templates when the averaging and thresholding operations of (26) are performed on neighboring glyphs in each of the sample image regions in the collection for a template. The extra pixels clearly arise as a result of using sample image regions that contain multiple glyphs, as opposed to a single, isolated glyph. If the sample image regions had contained only the central glyph of interest, e.g. as required in conventional template construction techniques, these extra pixels would be missing.

In addition, it can be seen from an examination of templates 94, 96 and 98 that template disjointness constraint (10) has not been observed. The pixels referenced by reference numeral 99 in template 98 for character "r" resemble the character "e." This type of pixel averaging and thresholding might occur, for example, when the sample image regions for the character "r" frequently contain the neighboring glyph for the character "e" preceding the character "r," such as would occur when an input 2D image source of glyph samples contains words that frequently include the character pair "er." If templates 94 and 98 were to be used in the imaging model defined by (7) to synthesize an image $Q_\pi$ that included the character pair "er," it can be seen that template 98 would include black pixels in pixel group 99 that were also included in template 94; because these templates share the same black pixels, the supports of these templates are not disjoint, and the template disjointness constraint expressed by (10) is clearly violated.

d. Constructing templates contemporaneously from the sample image regions

Maximizing (25), subject to the template disjointness constraint (10) is a computationally difficult problem, in the formal sense of being NP-complete. Rather than use an exponential algorithm to solve the constrained ML template construction problem exactly, the template construction technique of the present invention provides an approximate but effective solution that produces templates that substantially observe the template disjointness constraint. This solution, illustrating the details of box 450 in FIG. 21, is summarized in pseudo code in Table 3, and shown in flowchart form in FIG. 27.

TABLE 3

Procedure for contemporaneous template construction procedure (B,C,Z) do begin
   while max $S_t(x;Z) > 0$ do begin $$\begin{Bmatrix} t \in B \\ x \in C \end{Bmatrix}$$

$(s,w) := \arg\max S_t(x;Z)$ $$\begin{Bmatrix} t \in B \\ x \in C \end{Bmatrix}$$

$q_s(w) := 1$
   for $i = 1 \ldots N_s$ do $z(w + x_i^{(s)}) := 0$
   end
end

The basic strategy of the solution illustrated in Table 3 of assigning foreground pixel color values to individual character templates is as follows. Rather than apply (26) independently to each template pixel included in a single template, on a pixel-by-pixel basis, a value of 1 is assigned, in some sequential order, to each template pixel—in any template—for which $S_t(x;Z) > 0$, thereby producing assigned template pixels. After each such assignment, the observed image Z—that is, the sample image regions clipped from the 2D image source of glyph samples in the illustrated embodiment—is modified by setting to zero (0) all aligned sample pixels at locations that are paired with, or coincident with, the newly assigned template pixel. For example, suppose that template pixel $q_s(w) = 1$ has just been assigned. Then the pixels of Z at locations $w + x_i^{(s)}$, $i = 1 \ldots N_s$ are set to 0 before the next template pixel assignment is made to a remaining unassigned template pixel. The effect of setting sample pixels in the observed image to zero after a coincident template assignment has been made, which may be called "clearing pixels of Z," is to reduce the value of $S_t(x;Z)$, for subsequent computations of $S_t(x;Z)$, for overlapping template pixels that have not yet been set to 1, thereby decreasing the likelihood that the overlapping pixels will be set to 1 subsequently. The sequential assignment continues as long as $S_t(x;Z) > 0$ for some unassigned template pixel. The net result of the template construction technique of the present invention is to produce the entire set of trained character templates contemporaneously, with no one template being complete until no positive $S_t(x;Z)$ remains.

Figure 27:
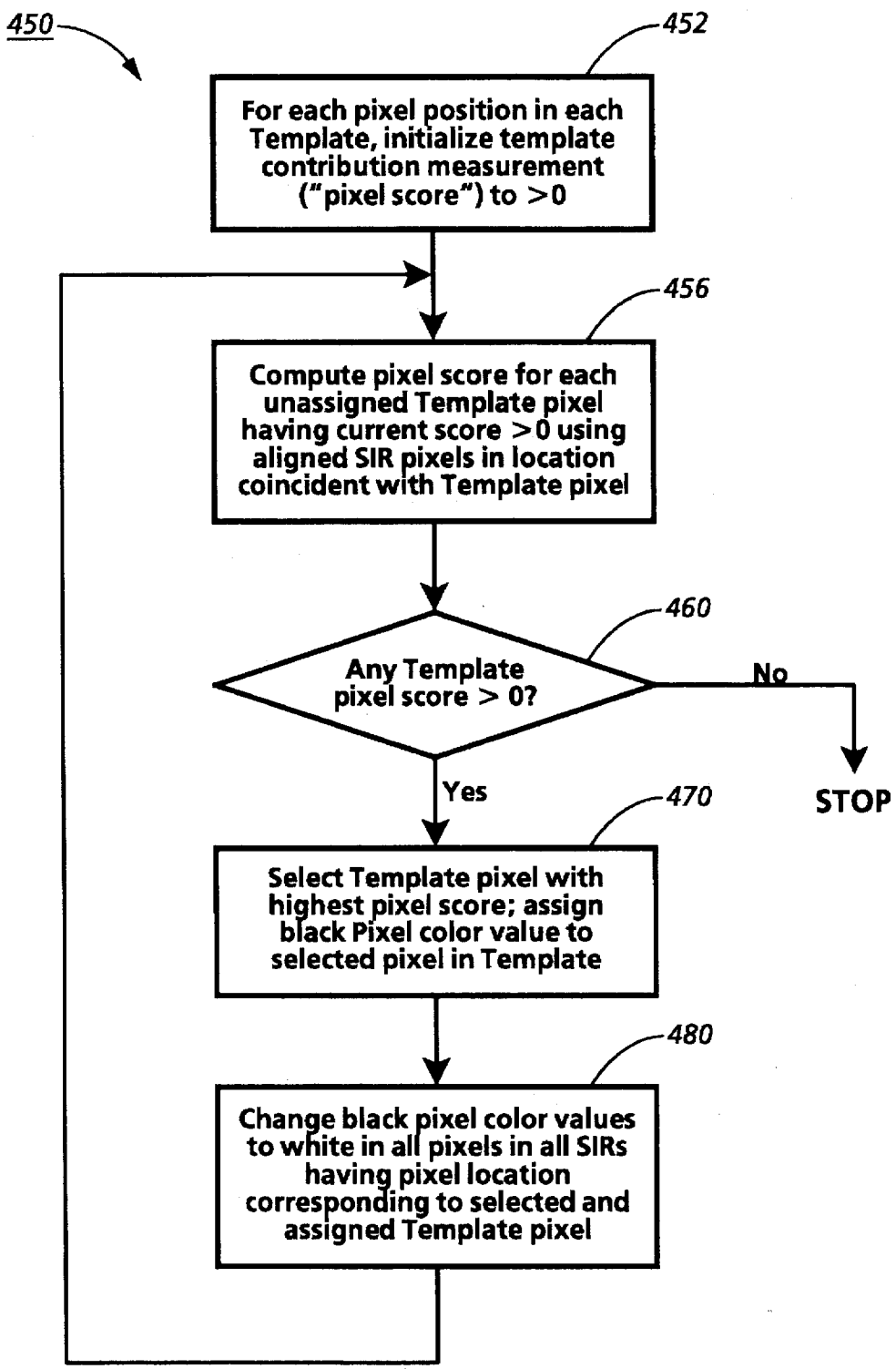
FIG. 27 is a flow chart illustrating the steps for contemporaneously constructing all of the character templates using template image regions of FIG. 22 and aligned sample image regions of FIG. 24 and FIG. 25, according to the template construction technique of the illustrated implementation of the present invention.

With reference to FIG. 27, after initializing pixel scores, or template contribution measurements, $S_t(x;Z)$, associated with each pixel position in each template canvas, in box 452, to some value greater than zero, $S_t(x;Z)$ is computed, in box 456, for each unassigned template pixel in each template having a currently positive pixel score, using the respectively paired aligned sample pixel positions in the collection of aligned sample image regions for that template. The pixel scores are then tested in box 460, and if any one of the computed pixel scores is greater than zero, the procedure proceeds to box 470 where the template pixel, in any template, having the highest positive pixel score is selected, and a foreground color value is assigned to that selected template pixel. The color values of the aligned pixels in the collection of aligned sample image regions paired with the selected template pixel are then set to zero (i.e., the background color value) in box 480. Then processing returns to box 456 where pixel scores are again computed for remaining unassigned template pixels.

Modifications may be made to the algorithm illustrated by the pseudo code in Table 3 that result in either reducing computation time or in improving template quality, or both. The specific details of such modifications will depend on the features available in the programming language used to implement the template construction technique, but, in general, modifications to reduce computation time will involve reducing the number of pixel scores, $S_t(x;Z)$, to be computed. One such modification that has actually been implemented involves computing pixel scores once, for all template pixels in all templates, and making a rank ordered list of the positive scores computed. Then the template pixel having the highest positive score from this list is selected, the selected template pixel is assigned a foreground pixel color value, and the color values of the aligned pixels in the collection of aligned sample image regions paired with the selected template pixel are set to the background color value. Then, only the next highest score in the rank ordered list of scores is computed next; if this recomputed score is now zero or less, the template pixel having this recomputed score is ignored, and the next highest template pixel score is selected next for template pixel assignment. If the recomputed score is still positive, then the template pixel having this recomputed score is selected next. The next selected template pixel is assigned a foreground pixel color value and the aligned pixels in the aligned sample image regions are cleared. This technique for selecting the next template pixel for assignment by recomputing only the next highest score continues while there are still positive scores in the rank ordered list of scores. Significantly fewer pixel scores are computed for the template pixels in this variation and consequently template construction processing time is reduced, but the general observation from its implementation is that the resulting templates produced are of lower quality than the templates produced using the steps summarized in Table 3 and shown in the flowchart of FIG. 27.

Another modification that can result in faster execution without changing the resulting templates in any way concerns the step of setting pixels of Z to zero after each template pixel is assigned. In the algorithm of FIG. 27 and Table 3, the score of each candidate template pixel, $S_s(x;Z)$, is computed using equation (27) after every template pixel assignment. If the number of glyph samples is large, this may require significant computation. Furthermore, if all candidate template pixels are re-ranked every time a pixel is assigned (e.g. as in the algorithm of FIG. 27), this computation might be repeated many times. Some of the $S_s(x;Z)$ computations may be avoided by noting that $S_s(x;Z)$ will not change when a template pixel for template s is assigned unless one of the glyph sample images for s overlaps one of the glyph sample sample images for t. Thus, $S_s(x;Z)$ only needs to be recomputed when a pixel is assigned to such a potentially overlapping template. Before pixel assignment begins, a table can be constructed that lists, for each template s, the templates t that have at least one glyph sample image that overlaps a glyph sample image of s. When a pixel is assigned to s, only the values of $S_s(x;Z)$ for those templates listed in the table entry for s need to be recomputed.

FIG. 28 shows the results of applying the template pixel color assignment algorithm of Table 3 to the same glyph sample image data used to generate the templates shown in FIG. 26. The set of templates 510 in FIG. 28 are arranged in the order "space", lowercase letters, uppercase letters, numerals and punctuation. If a character does not occur in the input image its template is given as a solid black square. Compared with FIG. 26, templates 510 in FIG. 28 contain significantly fewer extra black pixels, reflecting the effect of the "Z pixel clearing" step of the algorithm. In particular, templates 516, 514 and 518 representing characters "e," "a" and "r," respectively, have been called out for purposes of comparing them to templates 94, 96 and 98 in FIG. 26. As noted in (27), computation of the pixel scores requires use of the factors γ and β, where γ>0 and β<0. In the illustrated embodiment that produced the templates shown in FIG. 26, the values used for these factors were 2.237 and −1.629, respectively, corresponding to channel noise parameters $\alpha_0$=0.9 and $\alpha_1$=0.51.

Figure 29:
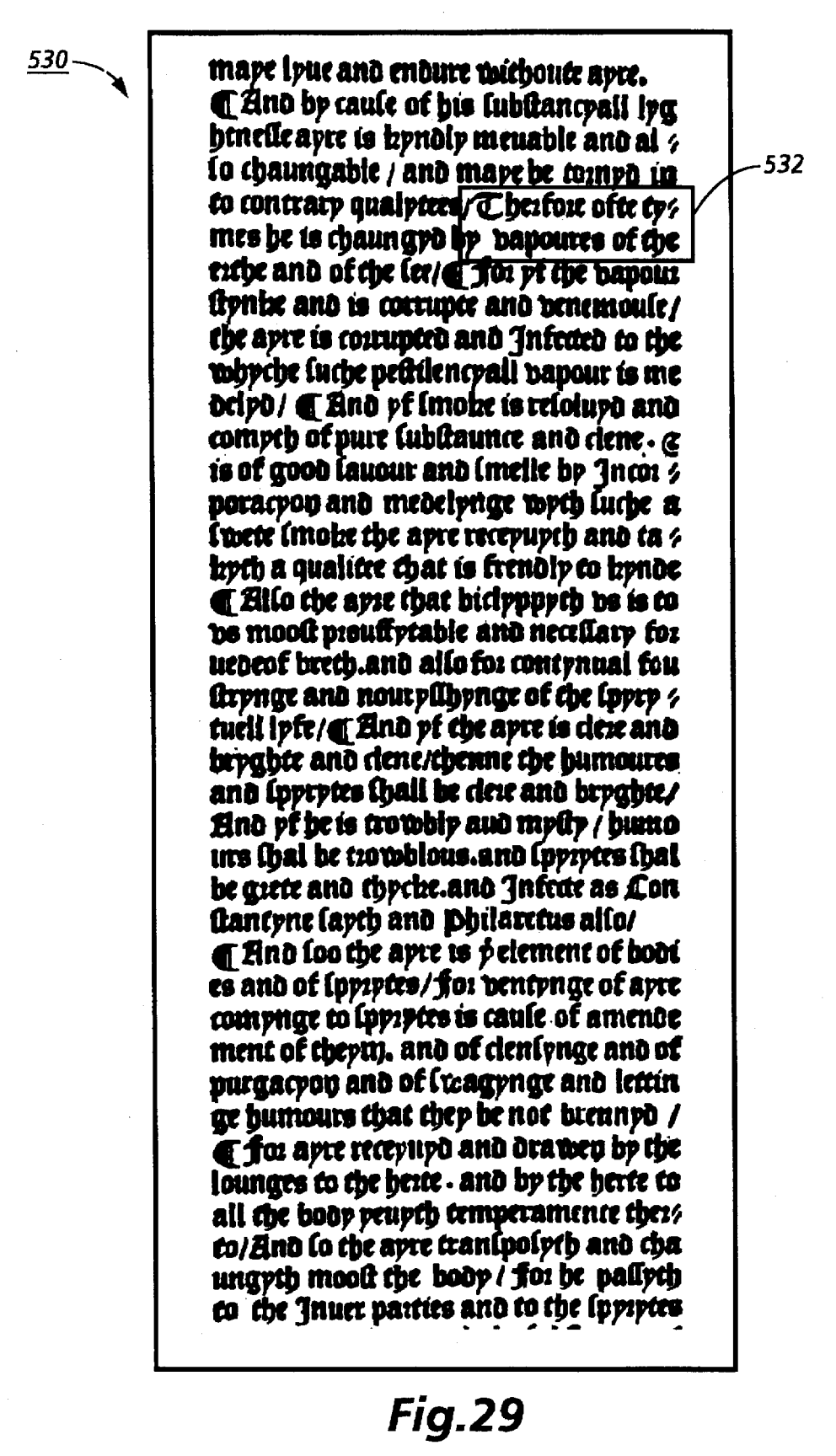
Figure 30:
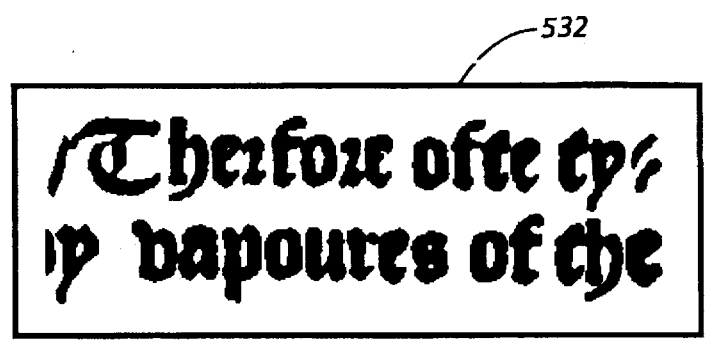
FIG. 30 illustrates an enlarged image portion of the 2D image of FIG. 29 showing the typeface and letter spacing of the glyphs more clearly.
Figure 31:
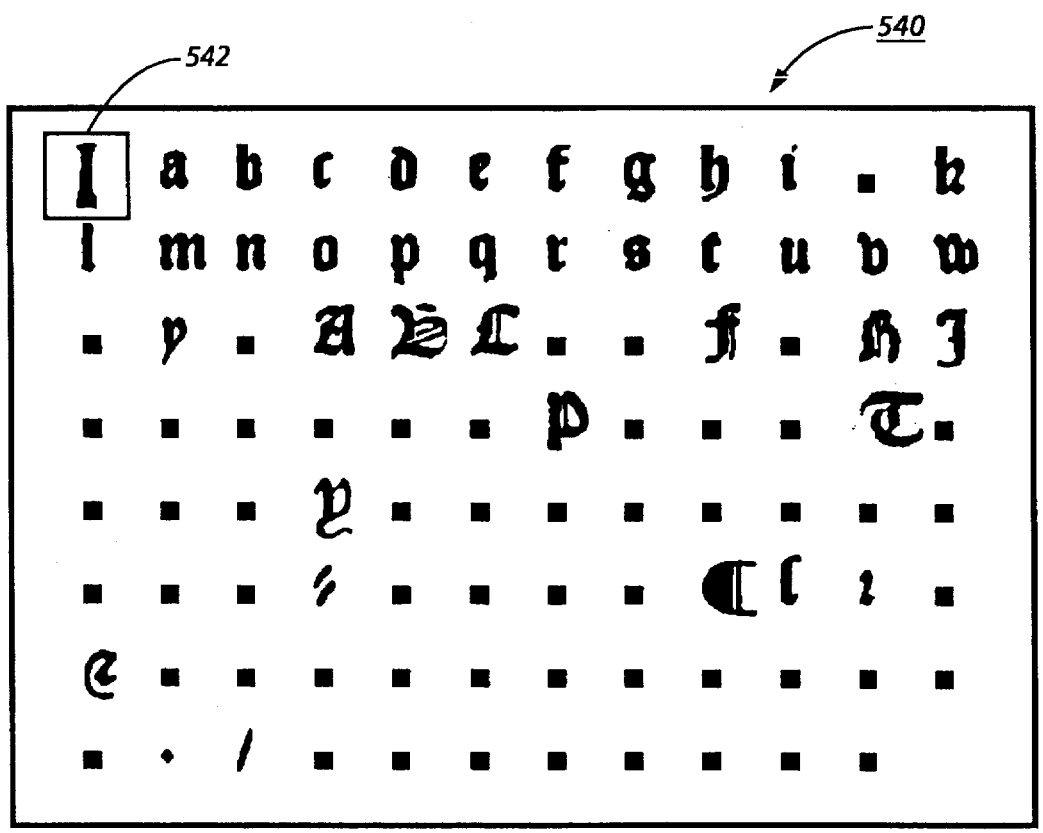
FIG. 31 illustrates the set of binary character templates constructed from the glyph samples in the image of FIG. 29 according to the the steps in the illustrated implementation of FIG. 13 and the template construction technique of FIGS. 21 and 27.

FIGS. 29, 30 and 31 illustrate another example of training binary character templates that shows the versatility and power of the training technique of the present invention. FIG. 29 illustrates image 530 of a portion of a column of Gothic text that was produced from scanning a document showing the text. Image portion 532 has been specifically called out and is shown enlarged in FIG. 30 to illustrate the typeface and letter spacing more clearly, and to show the tendency of some glyph pairs to merge in the image. Using as input data structures 2D image source model 830 (FIG. 14) modeling a column of text, a manually-generated literal transcription (not shown) of image 530, and an initial set of 95 character templates defined as small black rectangles, representing the character set used in image 530, the steps in the illustrated implementation of FIG. 13 were carried out to produce labeled glyph image origin positions of the glyph samples occurring in image 530. The set of binary character templates 540 illustrated in FIG. 31 was constructed according to the technique just described using collections of sample image regions for the samples identified in image 530 by their respective image origin positions.

7. Determining character set widths for constructed templates

In the earlier discussion of image decoding using the finite state network illustrated in FIG. 14, it was noted that each transition $t_i$ between nodes in the network has the associated 4-tuple of attributes, shown in FIG. 14 in the order $[\alpha_{t_i}]$ ($\Delta_{t_i}$), $m_{t_i}$, $Q_{t_i}$. When a template, $Q_i$, is associated with a transition $t_i$, such as those illustrated with the F transitions $t_i$, in FIG. 14, the horizontal displacement, $\Delta_i$, associated with that transition is the character set width, $W_{t_i}$, of the template. As noted earlier, the character set width is the vector displacement $\Delta$=($\Delta x$, $\Delta y$) from the glyph origin position to the point at which the origin of the next glyph is normally placed when imaging consecutive characters of a word. The character set width is one of the font metrics needed to completely describe a character template that is modeled by the sidebearing model of letterform shape description and positioning. Therefore, in addition to constructing the character templates according to template construction procedure 400, it is also necessary to determine the character set widths for the constructed templates.

The character set width of each binary template is determined using the collection of sample image regions identified for that template. Because identifying glyph image origin positions of glyph samples in the 2D input image is a process of estimation, it is likely that at least some of the identified samples will have inaccurate image origin positions identified. However, the set width of each glyph sample included in a sample image region can be computed from knowledge of the image origin position of the next adjacent glyph sample in the 2D image. Therefore, computing a set width for a template includes computing the set width for each sample identified for that template using the collection of sample image regions and the displacement from each image origin position in each sample to the image origin position of the next adjacent glyph in the 2D image. The collection of computed set widths for the glyph samples is then used to arrive at a set width for the template; for example, the mean or median set width value for all of the samples may be determined to be the set width for the template. Or the minimum set width computed using the samples may be used as the template's set width.

FIG. 13 shows this step of determining the character set widths as box 490, following template construction procedure 400. However, as just described, in the illustrated implementation the set width of each template is determined using the collections of sample image regions, and not from using the constructed templates. Therefore, the determination of character set widths is not dependent on the completion of template construction, and may take place at any point after the decoding and backtracing steps produces the labeled glyph image origin positions for the glyph samples in the 2D input image. In addition, FIG. 13 shows this step as being included in an iterative processing loop that repeats the decoding, backtracing and template construction steps 330, 380 and 400, respectively; the reasons for iterating the template construction process are explained below. Determining updated character set widths in each iteration of template construction is likely to lead to improved accuracy in identifying the labeled glyph image origin positions in the input 2D image, which in turn will produce more accurate templates using sample image region collections that are aligned more accurately at glyph sample image origins. However, from a computational efficiency perspective, it may not be necessary to determine set widths in each iteration of template construction. In the illustrated implementation, initial template training experiments included determining set widths once, after the stopping condition in box 384 (FIG. 13) had been met, and after the final templates had been produced; no intermediate character set width updating took place. Subsequent experimentation that included determining set widths once every so many iterations showed that templates are improved when the character set widths are updated during the iteration process. When updating character set widths during the template training process, the preferred method for computing the set width is to determine the minimum set width from the set widths computed for the collection of sample image regions, and then to take a percentage of that minimum, for example 90 per cent, as the set width for the template, in order to ensure that the set widths used for character positioning during subsequent iterations of the decoding process is always going to be less than the actual set widths used for positioning the glyphs in the input 2D input image. The process of determining intermediate set widths may of course be different from the process used to compute a final set width for each template after template construction is completed and the stopping condition in box 384 (FIG. 13) has been met.

8. Iterating decoding and backtracing steps with the current set of character templates produced from the template construction step Once template construction procedure 400 has been completed one time using the labeled glyph image origin positions produced as a result of decoding and backtracing steps 330 and 380 respectively, a stopping condition is tested, in box 384. If the stopping condition has not been met, processing control returns to decoding step 330, where decoding is again performed, using the current set of character templates constructed in the previous iteration of template construction procedure 400.

The illustrated embodiment of character template training technique 200 is fundamentally an iterative process because, as has been previously noted, image decoding of an observed 2D image using 2D image source models of the type illustrated in FIGS. 9, 14 and 19 assumes the use of an initial set of character templates. When, as is typical in the situation of training, an initial set of templates is not available, the illustrated embodiment includes processing, prior to decoding step 330, for generating a character template data structure indicating an initial set of character templates for use during decoding. Each template in this initial set of character templates may have any arbitrary pixel content that is of practical use by decoding process 330, and in the illustrated embodiment each template has the arbitrary initial pixel content of a solid black rectangular image, and has no specific pixel information about the character it represents. Given such an initial set of templates of rectangular black images, decoding and backtracing steps 330 and 380 respectively are likely to produce improved estimates of labeled glyph image origin positions of glyph samples in 2D image 10 with each subsequent iteration, using the character templates constructed in the previous iteration.

The stopping condition used to control the completion of character template construction may be heuristically determined, or may be a function of one or more processing parameters. In the illustrated embodiment, the stopping condition is a fixed number of iterations that has proven from experience to be the number of iterations that produces the highest quality templates and after which subsequent observable improvements to the templates are of little or no significance. The stopping condition may also be based on a threshold related to the maximum likelihood score computed during decoding.

D. Application of the Character Template Training Technique to the Text Line Image Environment The character template training technique of the present invention is applicable to the single text line image environment where a series of individual, pre-segmented text line images is used as the source of glyph samples, and a transcription segment associated with each isolated text line is used as the source of glyph labels. In the terminology used herein, the text line image environment is considered to be a one-dimensional (1D) image environment, in contrast to the 2D image environment that is typically exemplified by an image of a document page. This discussion of the application of the character template training technique to the line image environment assumes for simplicity that the term "text line image" or "line image" refers to a horizontal row of glyphs imaged across a page in a substantially colinear arrangement, as is, for example, conventionally found in English text and in musical scores. It is noted here that the term "text line image" is equally applicable to substantially colinear arrangements of consecutive glyphs in vertical columns, or in any other arrangement that is characteristic of a particular character system and its notational form, and that complies with the mathematical definition of a text line image source as described below.

1. Two character template training domains in the text line image environment

Figure 32:
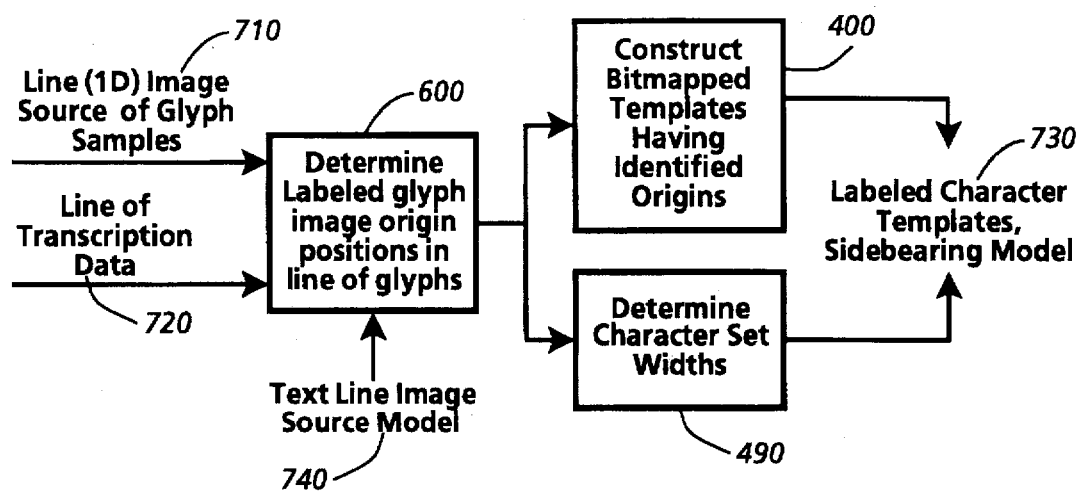
FIG. 32 is a simplified block diagram illustrating the input and output data structures of the training technique and system of the present invention for training character templates defined by the sidebearing model in the text line image environment.
Figure 33:
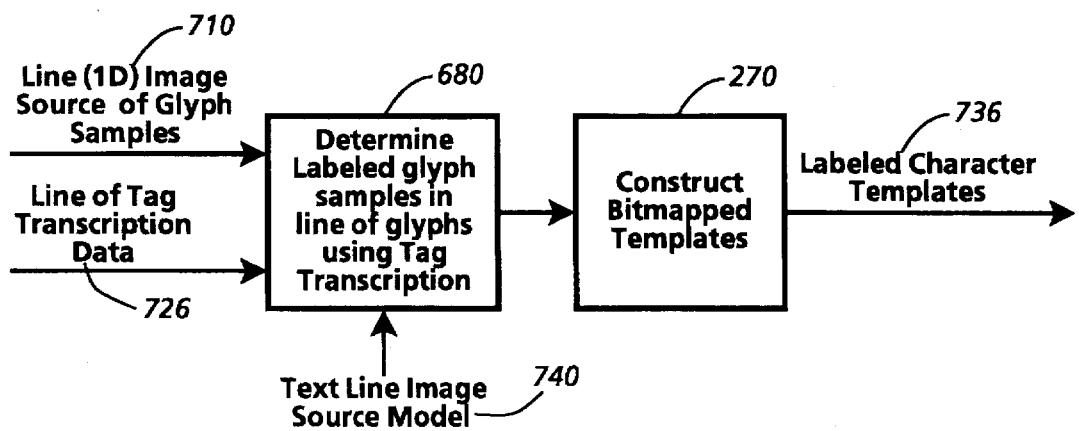
FIG. 33 is a simplified block diagram illustrating the input and output data structures of the training technique and system of the present invention for training character templates using an input tag transcription in the text line image environment.

Two important character template training domains are realized with the application of the character template training technique in the 2D environment to the text line, or 1D, environment. The first is the domain of training character templates that are modeled on the sidebearing model of letterform shape description and positioning, using any available transcription data structure format. Traditional supervised training systems have been exclusively focused on the training of segmentation-based character templates. The present invention, when applied in the 1D image environment, produces character templates modeled on the sidebearing model where adjacent character images in a text line are permitted to have overlapping bounding boxes as long as their foreground pixels are substantially nonoverlapping (i.e., their supports are substantially disjoint.) Conventional supervised training systems have also typically utilized manually-entered character labels that can be observed to visually match on a one-for-one basis the glyph samples to be used for training. Such a restrictive form of input for supplying the source of glyph labels provides little flexibility for automating the training process. The second domain of training binary character templates in the 1D environment is the training of character templates based on any character spacing model using a tag transcription as the source of glyph labels. FIGS. 32 and 33 illustrate, in general block diagrams, the data flow and processing components of these two domains of the character template training technique in the text line image environment; these diagrams show that the data flow and processing components of these training techniques parallel that of the 2D environment, shown in FIG. 10. Input line image 710 may be manually isolated from a 2D image by a user, or may be automatically isolated using known text line segmentation methods. The associated line transcription data structures 720 and 726 may also be automatically determined from a transcription of the entire 2D image, if the contents of the input transcription data structure include information from which line transcription data may be identified or derived. The explicit input line image source model 740 is, in the terminology used herein, a 1D model that models the spatial structure of a set of line images as a grammar; the input 1D line image source of glyph samples 710 is included in the set of text line images modeled by model 740.

2. Definition and examples of the text line image source model a. Mathematical principles.

Figure 34:
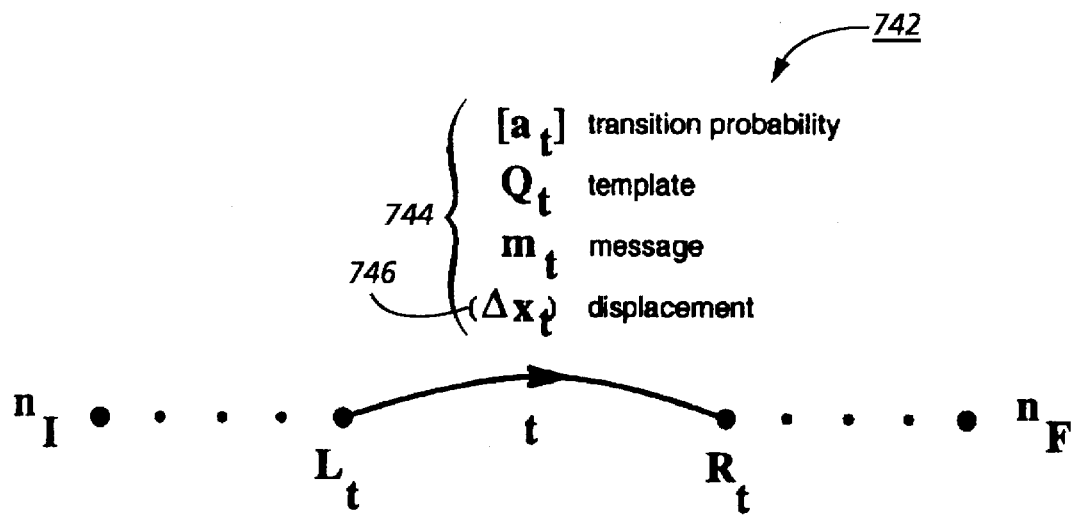
FIG. 34 illustrates a formal line image source model represented in its general form as a simplified, finite state transition network.

An implementation of the training techniques shown in FIGS. 32 and 33 utilizes a finite state transition network to represent the input image source model, in a manner similar to that of the 2D environment described above. FIG. 34 shows the general form of a line image source model 742, and is similar in structure to the 2D image source model 820 of FIG. 9. Line image source model 742 models the spatial structure of a set of line images as a finite set of states and a set of directed transitions. Each transition connects a pair of states, $L_t$ and $R_t$, that are called, respectively, the predecessor (left) state and the successor (right) state of the transition. Formally, the Markov line image source model 742 of FIG. 34 is a special case of the Markov image source 820 of FIG. 9 in which each complete path $\pi$ through the model has the same y coordinate of path displacement; that is, $\Delta y_\pi$ is the same for each $\pi$, where the path displacement $\Delta_{90}$ is defined by equation (8) above.

A simple and very common form of text line image source model models a horizontal text line image in which the y component of each branch displacement is zero, i.e., $\Delta y_t = 0$ for each transition t. It is clear from (8) that $\Delta y_\pi = 0$ for each complete path $\pi$ through such a source. Moreover, from equations (5) and (6) above, the y coordinates of all of the image positions $x_i$ defined by $\pi$ will be equal to the y coordinate of the initial position $x_1$. Normally, $x_1 = 0$, as discussed previously. However, the choice of initial position is arbitrary. Thus, by setting the y, position appropriately, a line image source can be used to describe horizontal text lines aligned at any vertical baseline position. When all branch y displacements of a line image source are zero, they can be omitted from the description of the model, suggesting the characterization of the model as being "one-dimensional." This is illustrated in FIG. 34 by showing transition displacement 746 as only the 1D (scalar) displacement $\Delta x_t$, in contrast to FIG. 9 which shows 2D vector displacement 828 ($\Delta_t$).

Note also, however, that since a text line image may include glyphs that are imaged both above and below the text baseline (i.e., glyphs whose image origin positions occur above or below the vertical position that has been determined to be the baseline, relative to other nearby glyphs that are imaged at the baseline), and that such an image is represented as a two-dimensional array of pixels, there clearly may be instances where the text line image source model will be defined to include as a transition data item a 2D vector displacement, $\Delta_t$. The image model described below in the discussion of the treatment of tag transcriptions in fact illustrates such a text line image model. The key to defining a one-dimensional image source model in the present context is that $\Delta y_\pi$ for each complete path $\pi$ through the model equals some constant path displacement that is independent of the path.

More information on line Markov sources is available in A. Kam and G. Kopec, "Separable source models for document image decoding", *IS&T/SPIE 1995 Intl. Symposium on Electronic Imaging*, San Jose, Calif., Feb. 5–10, 1995 (hereafter, Kam and Kopec, "Separable source models"), and in A. Kam, "Heuristic Document Image Decoding Using Separable Markov Models", S. M. Thesis, Massachusetts Institute of Technology, Cambridge, Mass., June, 1993 (hereafter, Kam, "Heuristic Document Image Decoding"). The text line image source model described herein corresponds exactly to what is called a "horizontal subsource with constant y displacement" in the first of these references, and corresponds to what is called a "child HMM" in the second of these references. Both of these references are hereby incorporated by reference herein for all that they teach.

Figure 35:
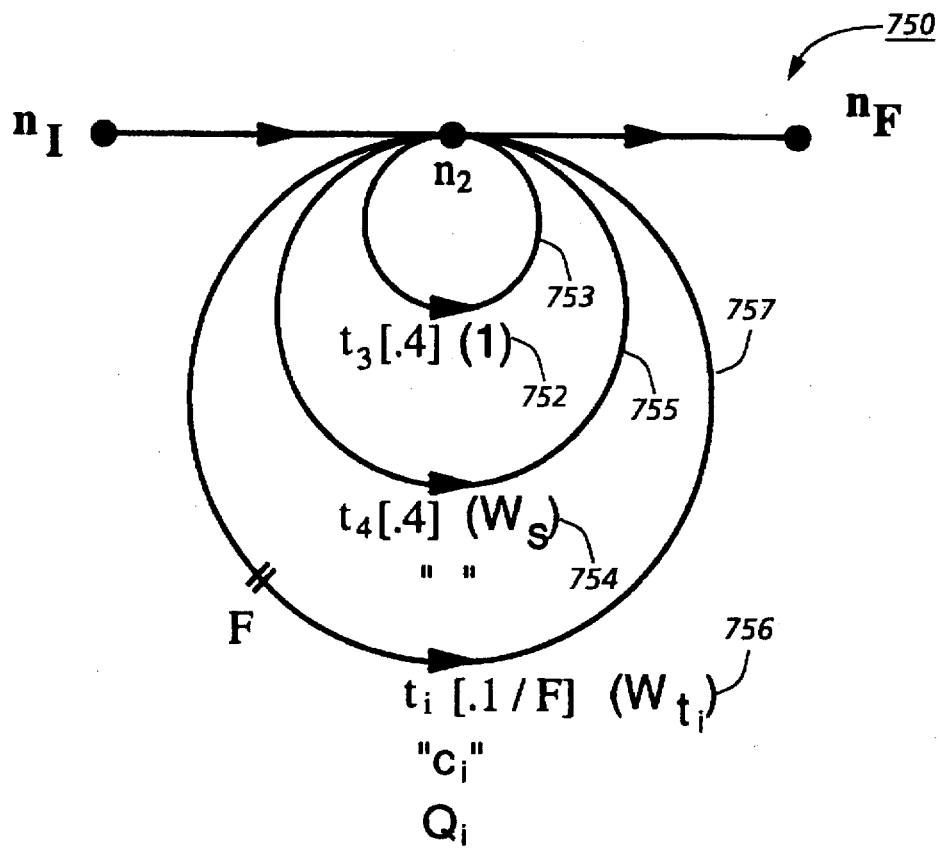
FIG. 35 is a diagram illustrating a finite state transition network modeling a set of line images having a spatial structure of a single text line, used in the implementation of the present invention illustrated in FIG. 36 in the text line image environment.

FIG. 35 shows a simple line image source model 750 for lines of printed text. It can be seen that model 750 is the same as the subgraph of the text column model 830 (FIG. 14) and consists of state $n_2$ and the self-transitions 753, 755 and 757 from $n_2$ to $n_2$. As discussed previously, the portion of the text column model around node $n_2$ represents the creation of a horizontal text line. In fact, text line image source model 750 in FIG. 35 may be viewed as the result of extracting the portion of text column model 830 around node $n_2$ and making it a separate model. The branch displacements in FIG. 35 are one-dimensional, as noted above. Self-transition 753 provides for fine horizontal spacing along the baseline; self-transition 755 provides for the imaging of a space character of displacement $W_s$; and self-transition 757 provides for the imaging of a character template $Q_i$ having a horizontal displacement equal to character set width $W_{t_i}$. The message strings generated by the line image model of FIG. 35 differ from those generated by the text column model of FIG.14 in that they do not include the newline character \n that appears in text column model 830 in FIG. 14 on the transition from state $n_2$ to $n_3$. The newline characters in a text column message are viewed as line separators that are logically part of the page-level markup, rather than as parts of the text lines themselves.

b. User directed implementation of the training technique in the 1D image environment The template training technique of the present invention may be directly and entirely implemented in the text line image environment under the direct control of a user. In such an implementation, the user of the training technique manually excises text line images from a document page image presented on a display using an appropriate input device, and manually enters a line of literal transcription for each such segmented text line image. A text line image source model of the type illustrated in FIG. 35 is defined to model the segmented text line images, and the processor executes the instructions of the training technique to produce a transcription network for each input transcription line, merges the transcription network with the text line image source model, decodes the input segmented text line image with which the transcription is associated to produce labeled glyph image origin positions, repeats these steps until all text line images have been processed, and constructs character templates using collections of sample image regions identified for each template in the input text line images by the labeled glyph image origin positions.

c. Obtaining a text line image source model from a 2D image source model

When it is desirable to reduce the manual involvement of the user in the template training process, the training technique as implemented in the 2D image environment is the preferred implementation, since template training may be carried out substantially automatically when a suitable transcription data structure is available that requires no manual modification by a user. From the perspective of processing efficiency, the 2D implementation as described in Section C above, and in particular the Viterbi decoding of the 2D image, involves a computationally complex algorithm, particularly when the decoding is constrained by the transcription message string(s); decoding of a 2D image may execute in a time frame that is commercially unacceptable, or may require a prohibitively large amount of storage. The 2D implementation may be simplified by factoring the 2D image source model into a 1D vertical image source model and one or more 1D horizontal text line image source models. Factoring the 2D image source into its 1D constituent models has the effect of improving the performance of several aspects of Viterbi decoding; decoding is significantly simpler than decoding using a full 2-dimensional model. In particular, the Viterbi algorithm for line image sources is essentially identical to the well-known segmental form of Viterbi algorithm used in speech recognition.

Certain types of 2D image source models are of a form that are able to be automatically factored into 1D constituent models without modification. When a particular 2D image source model is of the type that is able to be factored in this manner directly, without modification, it is called a "separable" source model. Other types of 2D image models may only be able to be factored after being converted to an equivalent model that is of a separable form. Generating 1D vertical and horizontal source models from a 2D image source model most efficiently, and, for separable 2D models, automatically, in order to take advantage of the improved decoding performance is discussed in detail in Kam and Kopec, "Separable source models" and in Kam, "Heuristic Document Image Decoding." 2D image source model 830 illustrated in FIG. 14 may be factored into text line image source model 750 in FIG. 35 using the techniques described in these two references.

Figure 36:
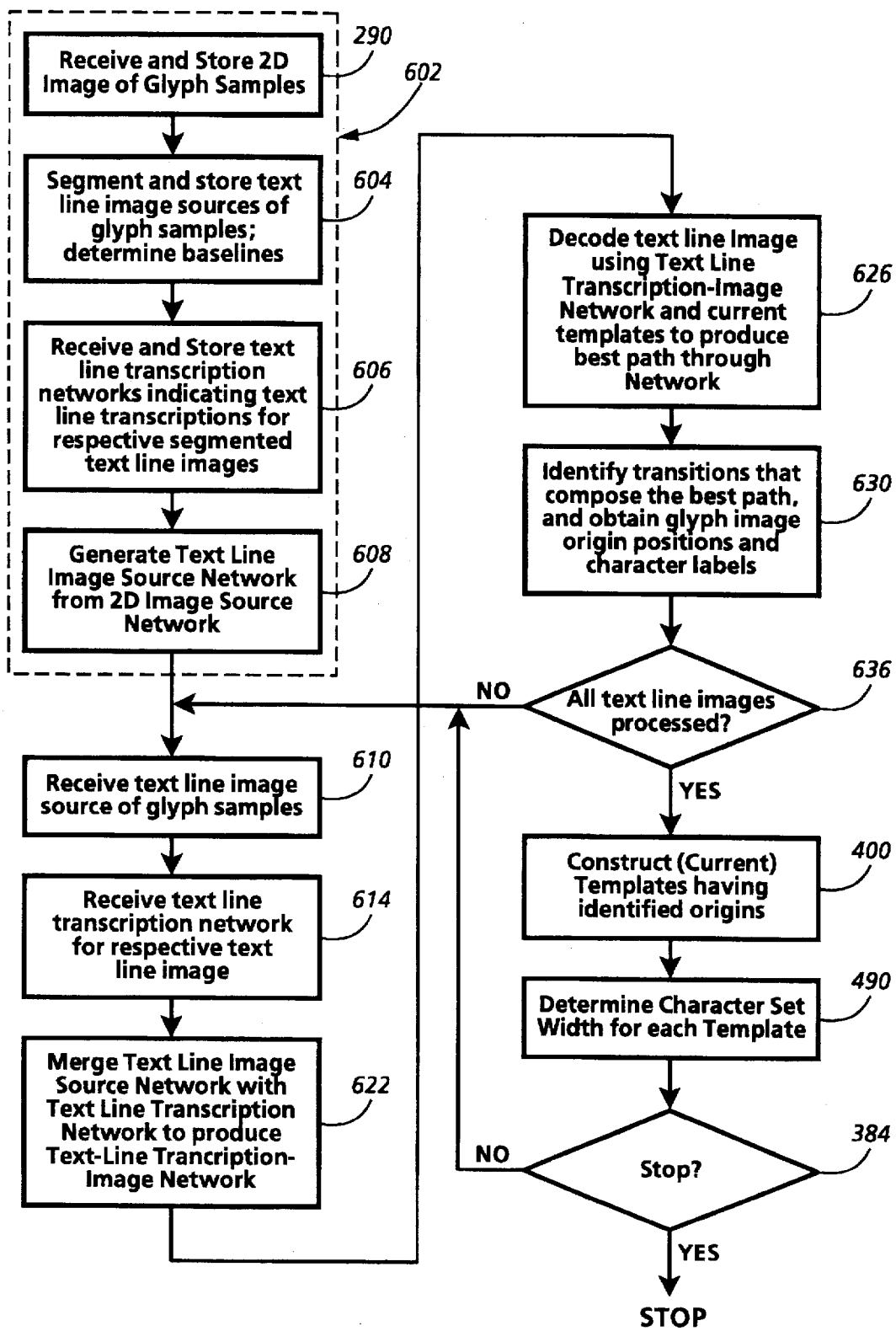
FIG. 36 is a flow chart illustrating the general steps of the illustrated implementation of the present invention in the text line image environment.

3. An illustrated implementation of character template training carried out in the 1D image environment An implementation of the training techniques shown in FIGS. 32 and 33 that minimizes or eliminates user involvement in the preparation of the training data is similar to the illustrated implementation for the 2D environment described above and illustrated in FIG. 13. The flowchart of FIG. 36 illustrates the steps of an implementation of the template training technique that is carried out in the text line environment, that utilizes finite state networks as data structures for representing the text line image source model and the transcription, and that trains templates modeled according to the sidebearing model of character positioning. The steps illustrated in FIG. 36 are directly applicable to the template training technique in the 1D environment that utilizes a tag transcription to train templates defined according to either the segmentation-based or the sidebearing model, with the exception that template measurement computations in place of or in addition to character set width computations might be necessary, depending on the template model used. A description of how a tag transcription is represented as a finite state network, and how it is merged with the image source model in this illustrated implementation is omitted from the description here and may be found below in Section E.

The processing steps in dotted line box 602 illustrate the preliminary processing steps necessary to convert the 2D inputs into text line forms suitable for processing in the text line context. In particular, text line images are isolated from an input 2D image in box 604 using known text line segmentation techniques; the vertical baseline position of each text line is determined using any suitable known method for finding text baselines. Individual transcription substrings, associated with respective segmented text line images from box 604 and which may have been segmented from a transcription of the entire input 2D image, are represented as text line transcription networks in a prior process and are received and stored, in box 606. A text line image source model is generated, in box 608, as a separate model from the 2D image source network using the methods described above.

Figure 37:
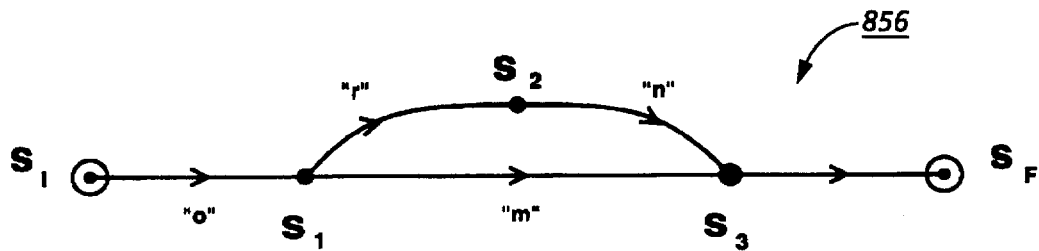
FIG. 37 is a diagram illustrating a simplified portion of the transcription network of FIG. 8 used in the illustrated implementation of the character template training technique of the present invention in the text line image environment.

A processing loop begins with box 610 where a text line image source of glyph samples is received. The transcription network for the respective text line image is received in box 614. Transcriptions and transcription networks associated with line images have exactly the same general form as those used in the 2D context. FIG. 37 shows a sample transcription network 856 produced from transcription 72 shown in FIGS. 7 and 8 and associated with the first text line of 2D image 10 (FIG. 2). Network 856 is the same as the portion of text column transcription network 852 illustrated in FIG. 15 except that the trailing newline character \n is omitted.

Figure 38:
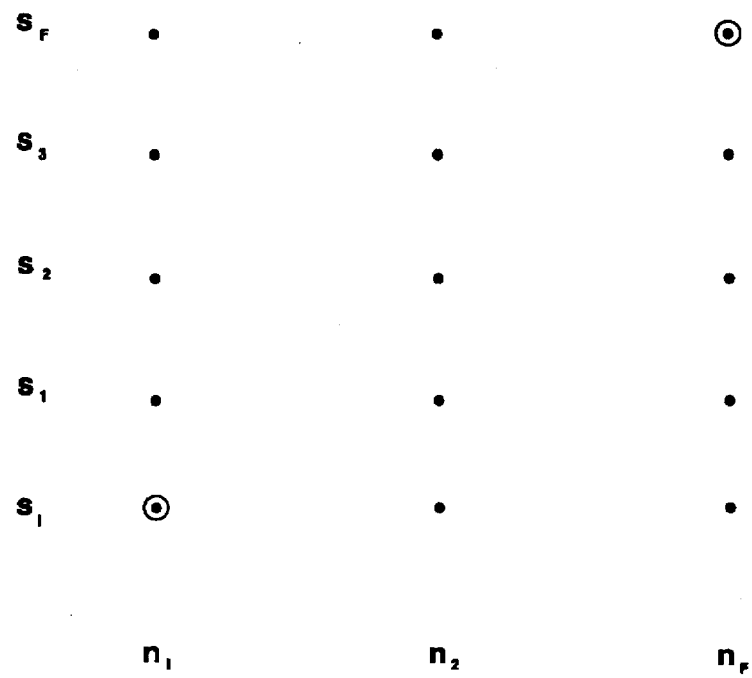
FIGS. 38, 39, 40, 41 and 42 schematically illustrate the merging of the finite state transition network of FIG. 35 with the transcription network of FIG. 37, according to the illustrated implementation of the present invention.
Figure 39:
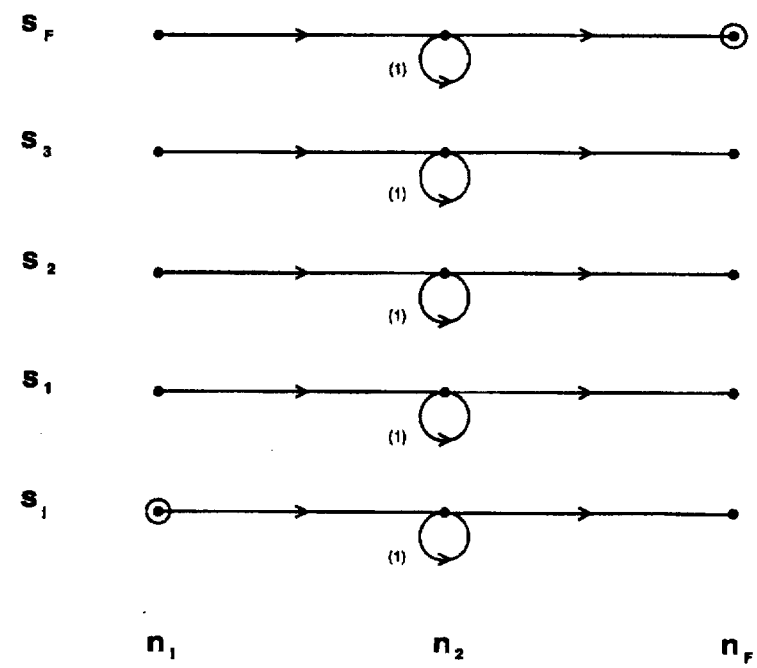
Figure 40:
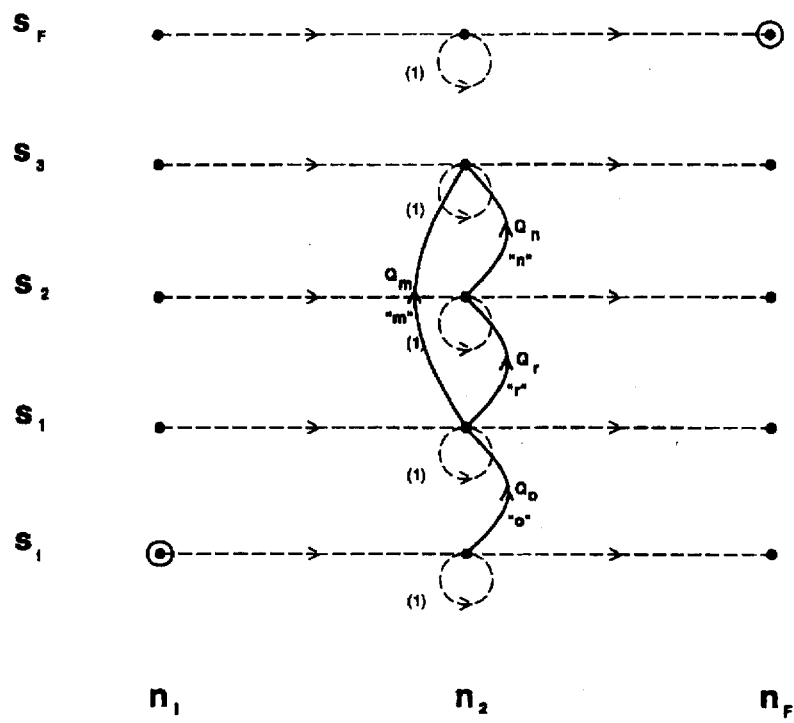
Figure 41:
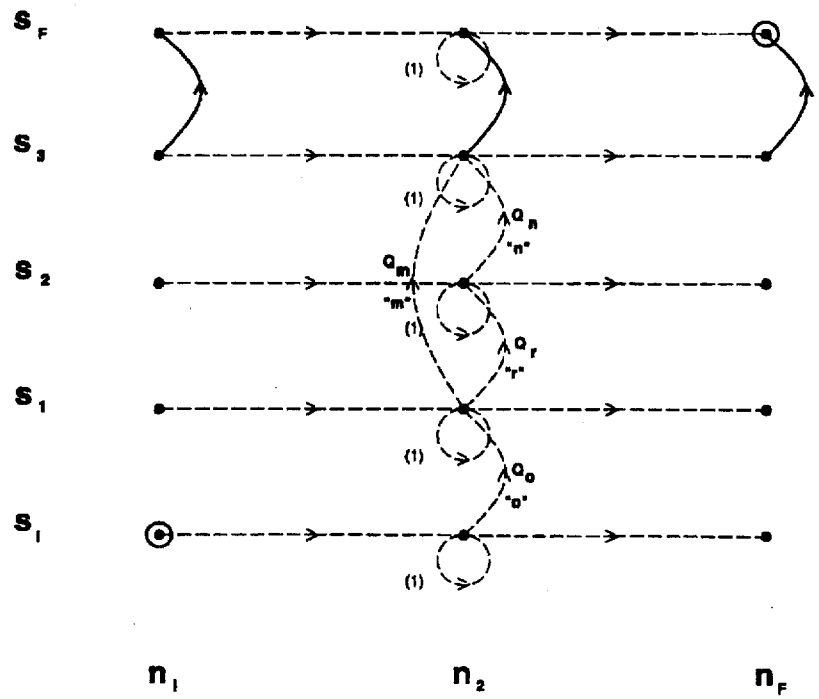
Figure 42:
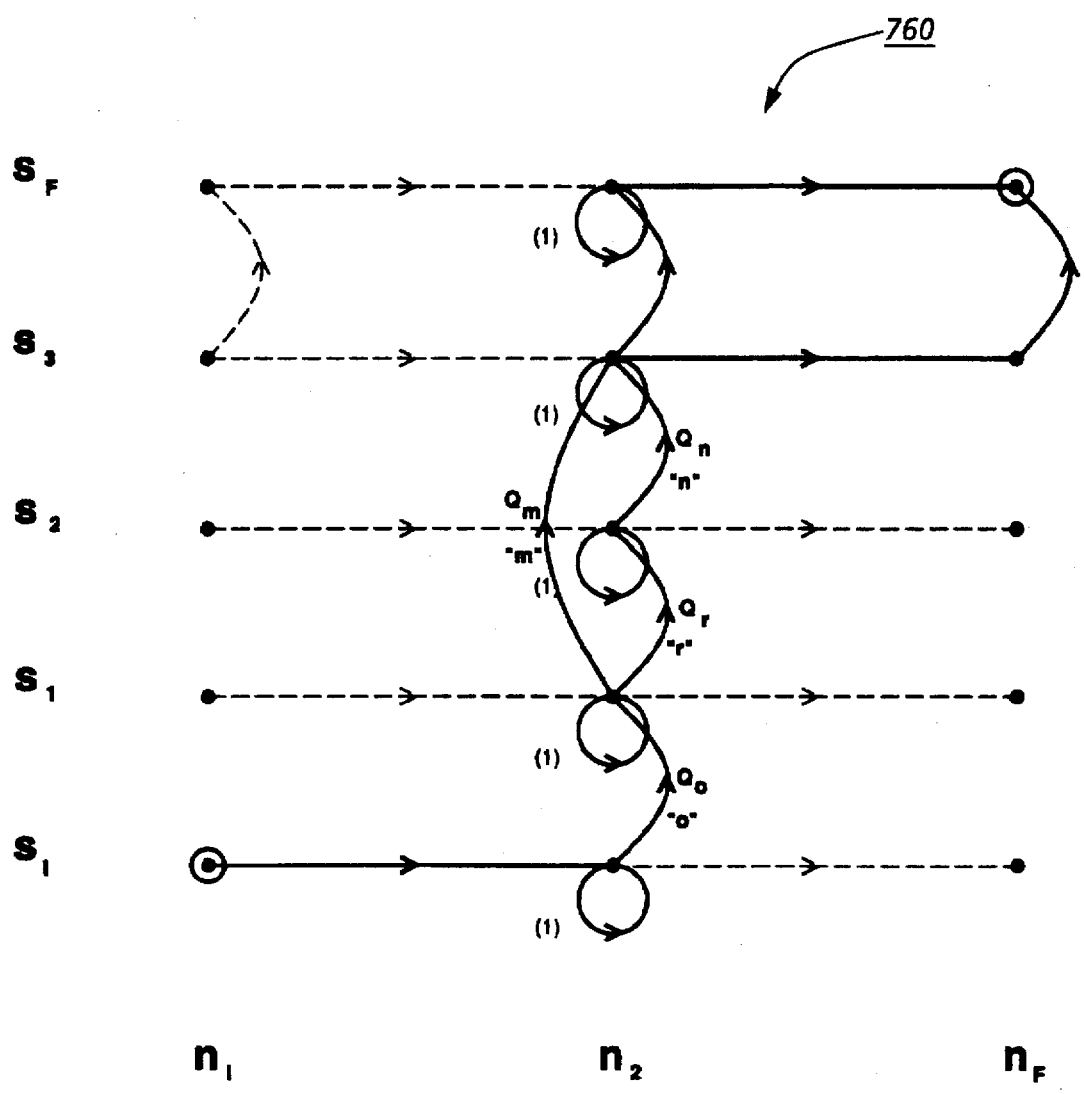

As in the 2D implementation, identifying labeled glyph positions in the text line image source of glyph samples includes analogous steps: network merging in box 622, Viterbi decoding in box 626, and label and glyph position extraction from transition positions of the best path in box 630. With respect to network merging, the functional properties of the merged text line transcription image network are the same as those presented previously in the context of the 2D implementation in Section C.4 (referred to there as network properties (a) and (b)). The step of network merging in box 622 produces a modified line image source model that is constrained to generate only transcriptions from the set of transcriptions defined by the text line transcription network. FIGS. 38, 39, 40, 41 and 42 illustrate the process of merging a line image source model, specifically model 750 of FIG. 35, with a text line transcription network, specifically transcription network 856, to form a line transcription image network. The states of the merged model are all pairs of line image source states and transcription network states, as shown in FIG. 38. The merging process follows the three steps for adding transitions to the states in FIG. 38 that are described above in Section C.4. The transitions added to the network after the first step are shown in FIG. 39. As before, these are constructed from line image source transitions for which $m_t=\epsilon$ (i.e. the message associated with t is the null string). The transitions added after the second step of adding transitions are shown in FIG. 40 in solid lines, while the transitions added in step one shown in FIG. 39 are shown in FIG. 40 as dashed lines. Finally, the transitions added in the third step are shown as solid lines in FIG. 41, with the transitions added in steps one and two shown in FIG. 41 as dashed lines. These are constructed from transcription network transitions for which $m_t=\epsilon$, in this case, the transition from $s_3$ to $s_F$ in line transcription network 856 (FIG. 37). Recall that in the previous example of network merging described in Section C.4 no transitions were added in the third step because the transcription network of FIG. 15 does not include any transitions with null message strings. Finally, FIG. 42 shows line transcription image network 760 that results from removing nodes and transitions that cannot lie on any complete path. The transitions of this simplified network 760 are shown as solid lines, with deleted transitions shown as dashed lines.

Decoding the text line image source image to produce the best path through the line transcription image network is accomplished in box 626. In the illustrated implementation, Viterbi decoding is used, and, as noted above, since line image source models are essentially 1-dimensional, Viterbi decoding using line image sources is significantly simpler than decoding using a full 2-dimensional model. The transitions, and their image positions, that compose the best path are obtained from backtracing through the nodes of the best path in the same manner as previously described, and labels and glyph sample image origin positions are extracted from the appropriate transitions. The glyph sample image origin positions that are directly defined by a path through line transcription image source network 760 are just x coordinates. Complete glyph sample image origin positions indicating samples in a line image are generated, trivially, by pairing each of these x coordinates with the line baseline y position.

Once decoding of a first text line image is completed, a test is made in box 636 to determine whether all text line images of glyph samples have been processed; if not, processing returns to step 610. When all samples have been identified, processing continues with template construction process 400, which is carried out in the same manner as previously described. Producing templates defined according to the sidebearing model requires determination of character set widths, in box 490, as described above. Finally, the entire process of identifying samples and constructing templates is iterated until a stopping condition is met.

E. Using a Tag Transcription as a Source of Glyph Labels

1. Relationship of the transcription to the image source network

As noted earlier, the illustrated embodiment of the present invention imposes the functional requirement that image source model 830 and transcription network 850 jointly define an ideal image that is (a) a spatial arrangement of copies of character templates placed at certain image locations in the ideal image and selected according to a message string consistent with the transcription, and (b) an approximation of the actual input 2D image with which the transcription is associated. The significance of having both the 2D image source model and the transcription represented as formal models and of having the 2D image source model represented as an explicit input to the training procedure is that the information needed to meet this functional requirement may be effectively shared in virtually any allocation between image source model 830 and transcription network 850, as long as they jointly define the ideal image as required. This results in the additional benefit that a transcription available for a particular 2D image source of glyph samples may be able to be tailored by a user of the training technique to comply with the requirements of an existing image source model modeling the particular 2D input image, or that an image source model may be designed to accommodate the information present in an existing transcription.

This flexibility expands the concept of what is traditionally thought of as the type of transcription suitable for training templates—namely, the literal transcription—to include a wide variety of other message strings. For example, a situation may arise in which the 2D input image source of glyph samples used for training is always one of set of specific documents having known, fixed transcriptions. Transcription networks, or transcription-image networks, modeling these predetermined transcriptions may be produced and stored in advance of training for each of these specific transcriptions, and what the user enters as a "transcription" is actually a name identifying the specific transcription to be associated with the 2D image source of glyph samples to be used in training.

In another example, an available data structure that includes markup labels, or tags, indicating the logical structure and formatting information for the character codes in a 2D image may also be used as the input transcription, without the user having to manually strip out the tags and transform the data structure into a literal transcription. If these markup data structures are available in document depositories along with their document images, the training technique of the present invention makes it possible to train character templates using any such document image and its associated tag transcription. The discussion now turns to describing the modeling of such a nonliteral, tag transcription and of an image spatially structured according to the tags in a transcription associated with the image.

2. Examples of an image source model that accommodates a tag transcription and a tag transcription network As defined previously, a tag transcription, also referred to as a tagged transcription, is a type of nonliteral transcription that includes at least one transcription label, called a tag, that indicates markup information about the document image. Information on the subject of document markup may be found in J. Coombs, A. Renear and S. DeRose, "Markup systems and the future of scholarly text processing," *Comm. of the ACM*, Vol. 30, no. 11, Nov., 1987, pp. 933–947. The use of tagged transcriptions in the template training technique of the present invention requires no functional modifications to the image models described thus far because accommodating tags essentially involves the handling of the message strings in the image source network, and the general form of Markov image source model given in FIG. 9 allows independent specification of the message string and template for each transition. Moreover, either or both of the message and template may be omitted from a transition attribute set. Thus, tags may be accommodated without modification to the modeling framework, as will be illustrated below. An example of the use of logical tags in an image source model is illustrated in Kopec and Chou, "Document Image Decoding," in the context of decoding two-dimensional telephone yellow pages. For simplicity of illustration, the use of a tag transcription as the input source of glyph labels for the template training invention is described herein in the context of a text line image environment, rather than a full-generality 2-dimensional Markov source. However, as can be seen from the previous discussion of the template training procedure in the text line image environment and its relationship to the 2D image environment, the discussion of the use of the tag transcription in the line image environment is in fact derived from its use in the context of the more general 2D model.

Figure 43:
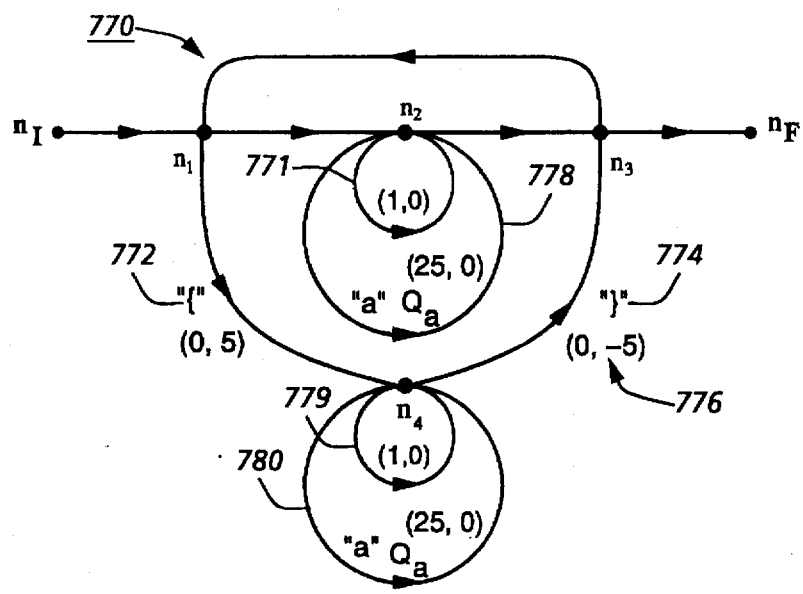
FIG. 43 is a diagram illustrating a finite state transition network modeling a set of line images having a spatial structure of a single text line and accommodating message strings consistent with an exemplary tag transcription.

FIG. 43 shows a line image source model 770 that images simple text lines that contain subscripts. The transition probabilities have been omitted from this model. The line images defined by model 770 consist entirely of glyphs of the character "a" with various amounts of intercharacter space. The states and their transitions in model 770 show that glyphs can be placed either on the baseline or 5 pixels below, to simulate subscripts. From the transition attributes shown in model 770, it can be seen that state $n_2$ and its self-transitions 777 and 778 image consecutive templates of the character "a" that are aligned on the main baseline, and generate message strings of "a." It can also be seen from the displacement vector on transition 778 that the set width of the "a" in the horizontal x direction is given as 25. Model 770 permits the imaging of glyphs on a subscript baseline by the transition from state $n_1$ to state $n_4$ which shows, as transition attributes, a positive y displacement of 5 that moves the current imaging position down in the image plane, and message string 772, "{", but no template. State $n_4$ and its self-transitions 779 and 780 image consecutive templates of the character "a" that are aligned on a subscript baseline, and also generate message strings of "a." The transition from state $n_4$ to state $n_3$ returns the current imaging position to the main baseline, as shown by displacement 776; this transition also has message string attribute 774, "}", and no template. Because of the transition from $n_3$ to $n_1$, a line may contain any number of subscript strings alternated with strings on the main baseline. (Because model 770 models a set of images that includes text that is imaged below a main text baseline, all branch displacements are specified as 2-dimensional vectors. However, it is simple to verify that all complete paths through model 770 have zero y displacement, i.e., $\Delta y_\pi = 0$ if $\pi$ is a complete path. Thus, the model satisfies the defining condition to be a line model, i.e., every complete path has the same y displacement.)

Figure 44:
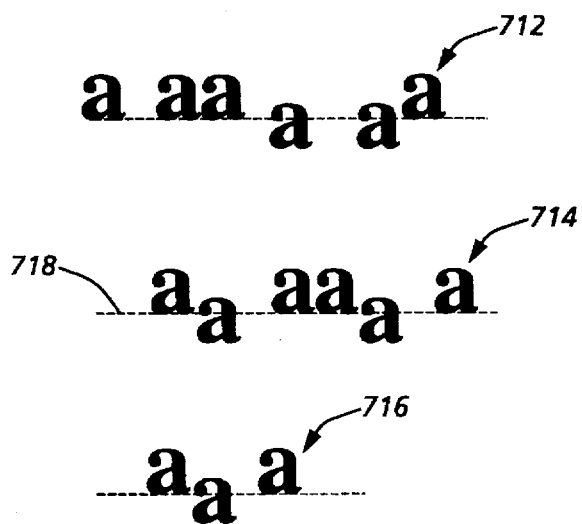
FIG. 44 illustrates sample line images that are modeled by the finite state transition network of FIG. 43.

FIG. 44 shows several examples of line images 712, 714 and 716 that are included in the set of line images modeled by line image source model 770. For purposes of illustration, the vertical displacement of the subscripts in FIG. 44 is greatly exaggerated, and the dashed lines, such as line 718, are shown to illustrate the main text baseline. In its decoding mode, model 770 decodes line images 712, 714 and 716 as the message strings (transcriptions) "aaa{aa}a", "a{a}aa{a}a" and "a{a}a", respectively. Or conversely, line images 712, 714 and 716 could be viewed as line images that model 770 generates in its image synthesis mode, given the input message strings "aaa{aa}a", "a{a}aa{a}a" and "a{a}a", respectively. In either event, the actual message strings "{" and "}" cannot be visually paired with glyphs in any of the line images 712, 714 and 716 in FIG. 44, a fact that is supported by the missing templates on the transitions from state $n_1$ to state $n_4$ and from state $n_4$ to state $n_3$. When encountered in model 770, message strings "{" and "}" indicate a perceptible change in the imaging of one or more glyphs in an image generated by the model. Message strings "{" and "}" thus function as tags that mark text between them as having a formatting or logical change in imaging from text that precedes or follows them; in this case, they mark text that is to be interpreted and typeset as a subscript.

Figure 45:
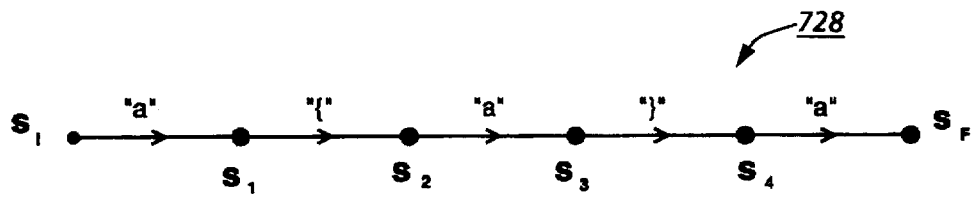
FIG. 45 is a diagram illustrating a tag transcription network.

FIG. 45 shows a transcription network 728 for the simple tagged transcription "a{a}a" associated with line image 716 in FIG. 44. It can be seen that transcription labels "{" and "}" are included in this transcription to mark the character that is to be interpreted as a subscript, but that they cannot be visually paired with glyphs in line image 716. FIG. 45 also shows that these transcription labels are placed on transitions in transcription network 728 in the sequence in which they are encountered in the transcription data structure, along with the character labels that indicate the character identity of the glyphs in associated line image 716.

3. Merging a tag transcription network with an image source model

Figure 46:
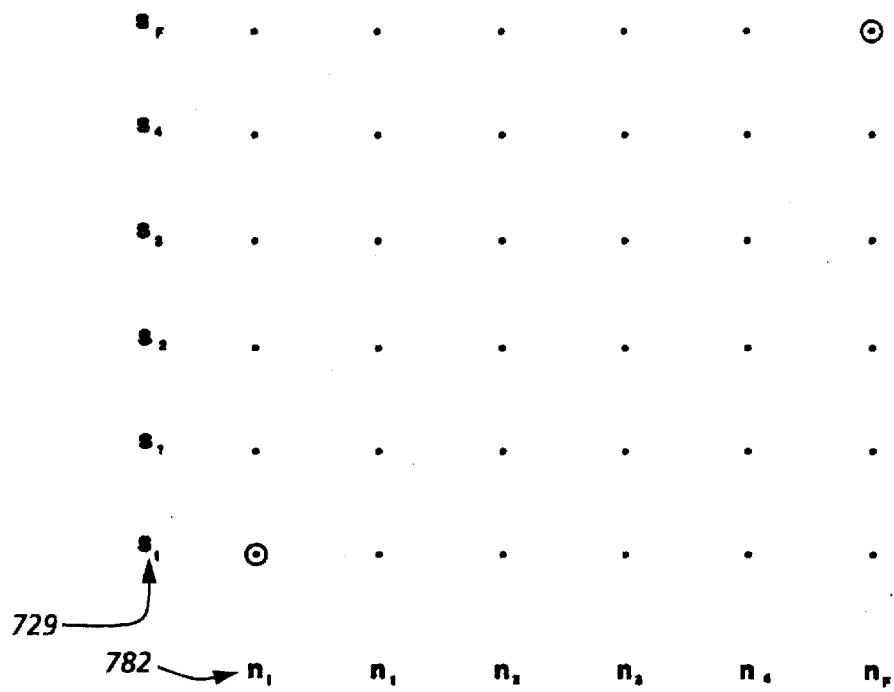
FIGS. 46, 47, 48, and 49 schematically illustrate the merging of the finite state transition network of FIG. 43 with the tag transcription network of FIG. 45, according to the illustrated implementation of the present invention.
Figure 47:
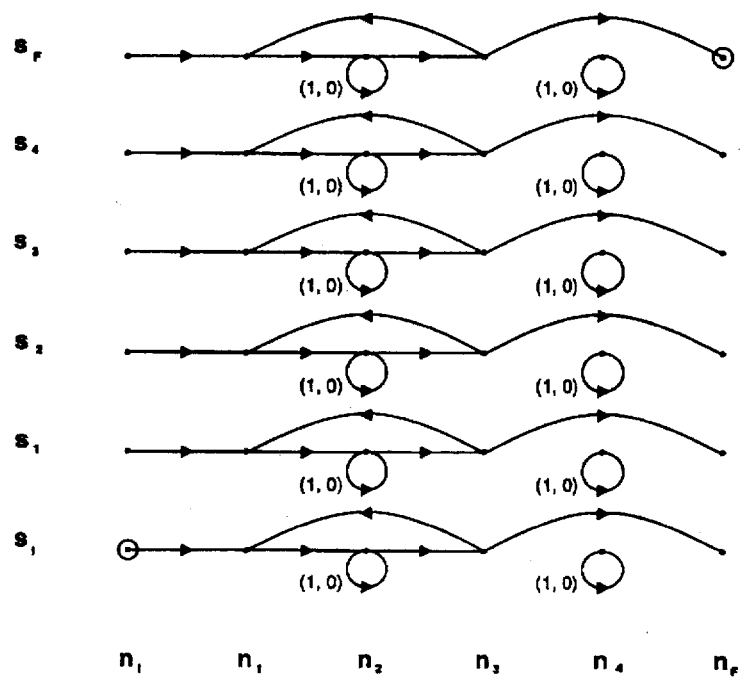
Figure 48:
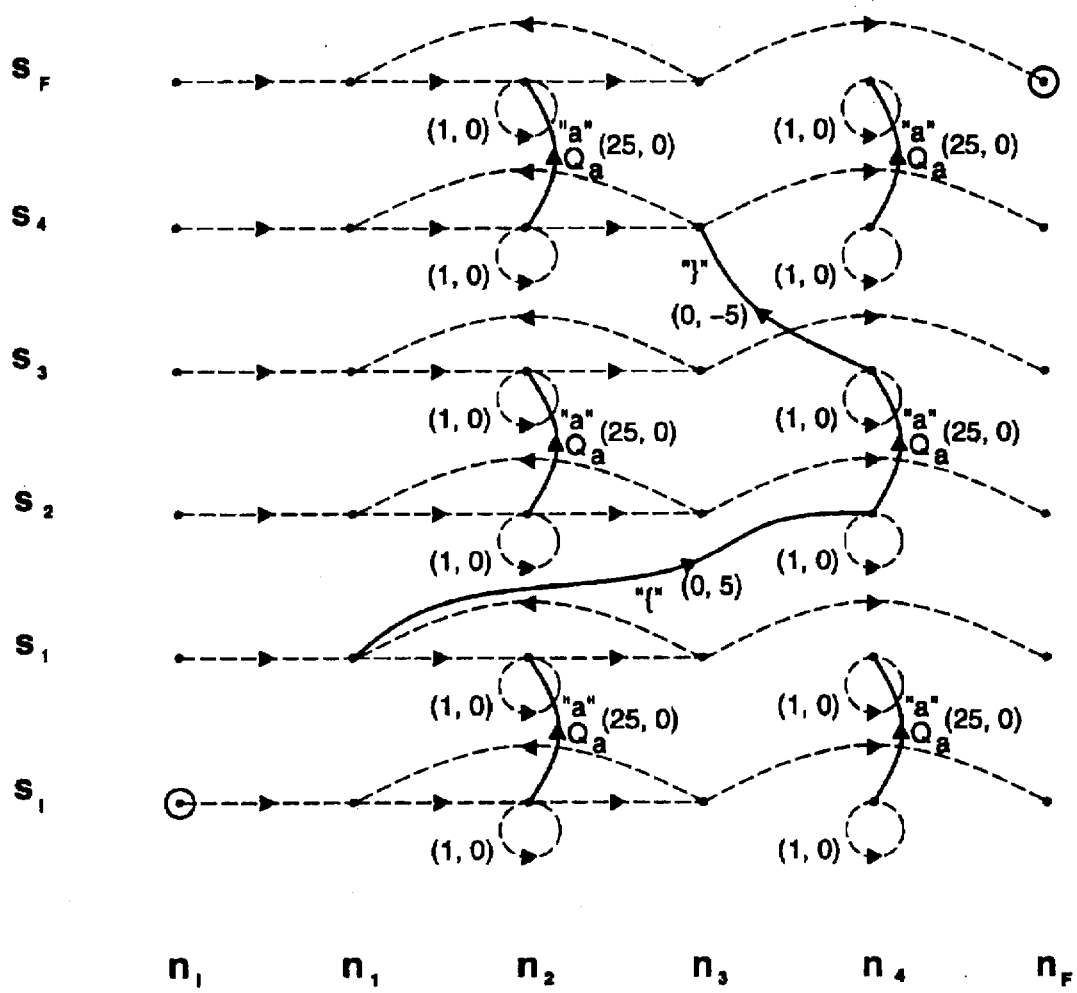
Figure 49:
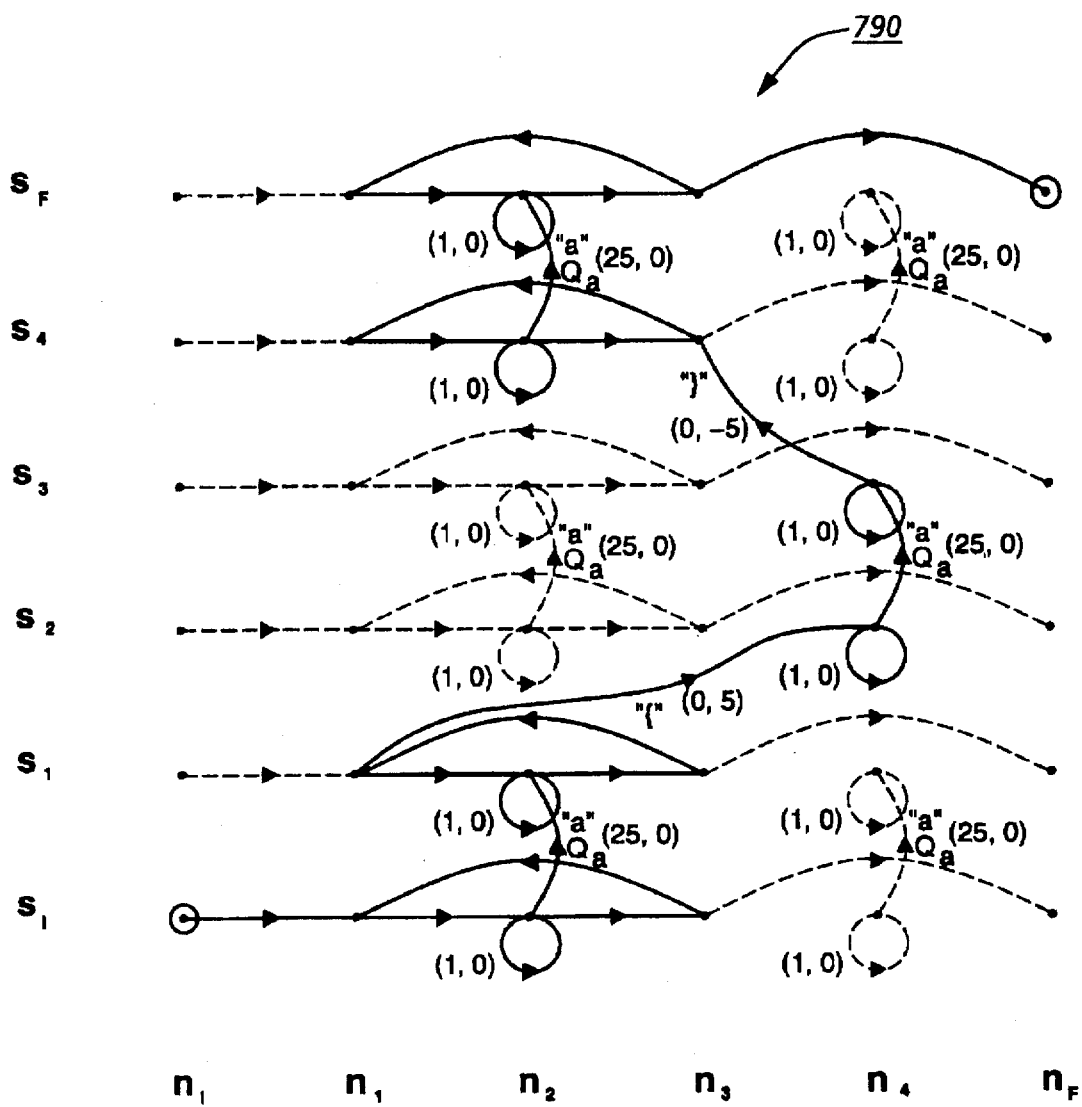

The merging of an image source model that accommodates tag message strings with a tagged transcription network proceeds in the same manner as previously described for merging 2D networks and line networks. The functional properties of the merged tag transcription image network are the same as those presented previously in the context of the 2D implementation in Section C.4 (referred to there as network properties (a) and (b)). Network merging produces a modified image source model that is constrained to generate only transcriptions from the set of transcriptions defined by the tag transcription network. FIGS. 46, 47, 48, and 49 illustrate the process of merging line image source model 770 with tag transcription network 728 to form a tag transcription image network. The states of the merged model are all pairs of line image source states 782 and transcription network states 729, as shown in FIG. 46. The merging process follows the three steps for adding transitions to the states in FIG. 46 that are described above in Section C.4. FIG. 47 shows the transitions added to the tag transcription image network during the first step of the transition construction procedure. Similarly, FIG. 48 shows, in solid lines, the transitions added to the tag transcription image network during second step of adding transitions, with the transitions added during the first step shown as dashed lines. No transitions are added in the third step, since there are no transcription network transitions with null message strings. Finally, FIG. 49 shows tag transcription image network 790 that results from the simplifying step of removing nodes and transitions that cannot lie on any complete path. The transitions of this simplified network 790 are shown as solid lines, with deleted transitions shown as dashed lines.

Using a tagged transcription as the input source of glyph labels for the training data produced for the template training procedure is entirely handled by how the image and transcription models are defined and merged, and requires no modifications to the decoding process or to glyph image origin position extraction from the best path; the remainder of the template training procedure proceeds as previously described, using tag transcription image network 790 to provide the glyph image origin positions of the glyphs included in line image 716 (FIG. 44) to the template construction procedure.

F. The Machine Configuration

Figure 50:
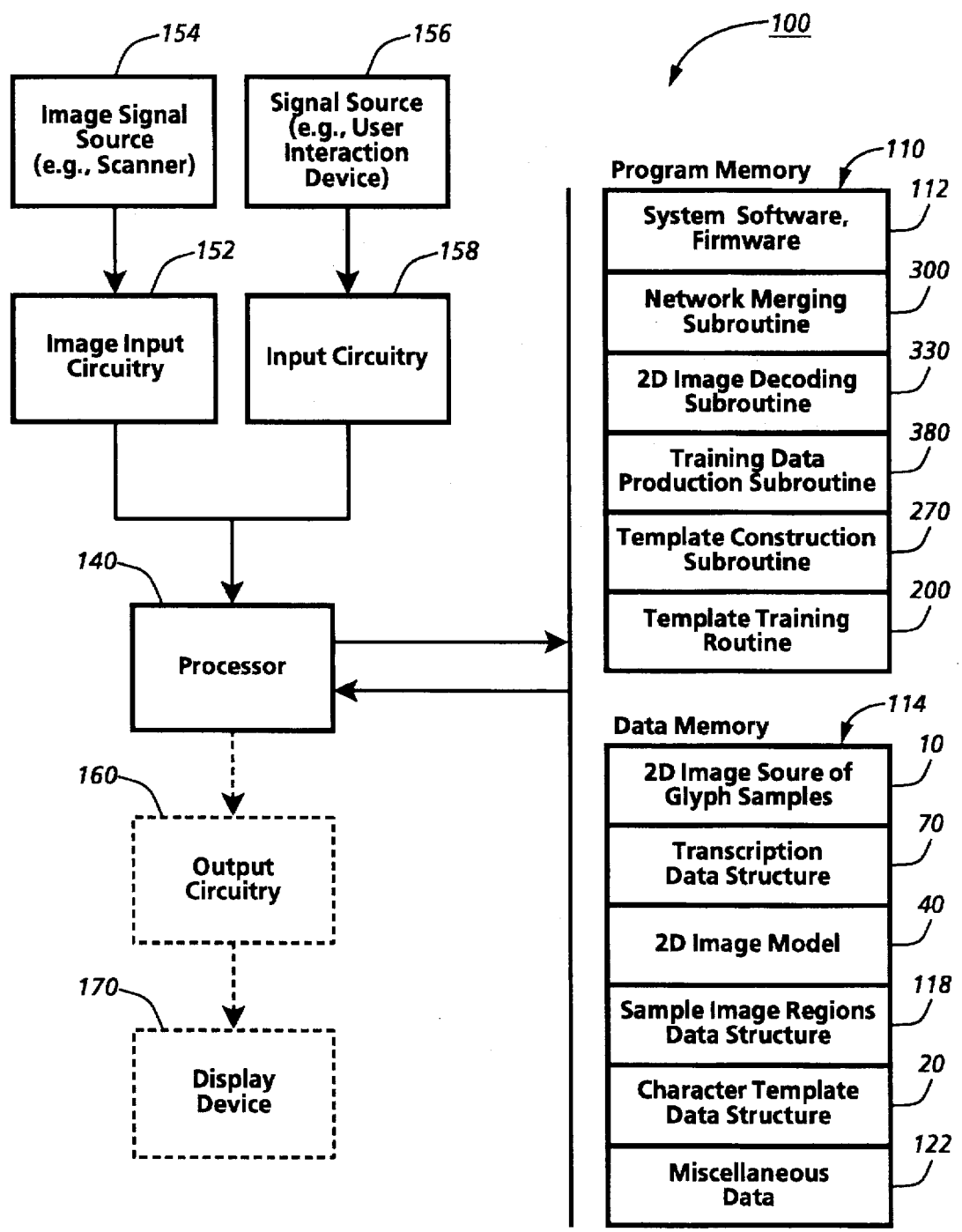
FIG. 50 is a simplified block diagram illustrating the hardware components of the machine that the present invention may operate.

FIG. 50 shows the components of processor-controlled machine 100 implementing the features described above for automatically training character templates using a transcription, a grammar-based model, and a 2D image as inputs. Machine 100 includes processor 140, which could be any processor, including one or more CPUs, and may include specialized hardware such as one or more coprocessors to provide specific functions. Processor 140 is connected for receiving image definition data defining images from image input circuitry 152. Input circuitry 152 is connected for receiving signals indicating image data from an image signal source 154. Image signal source 154 may include an optical scanner, a copier machine scanner, a Braille reading machine scanner, a bitmap workstation, an electronic beam scanner or any similar signal source capable of providing image signals of the type required by the present invention. In the case of one of the scanners, the output of a sensor associated with the scanner is digitized to produce an image definition data structure defining a two-dimensional image source of glyph samples 10, and the image definition data structure is then provided to processor 140 via image input circuitry 152 for storage in data memory 114.

Processor 140 is also connected for receiving signals from input circuitry 158 connected to signal source 156 that provides signals indicating transcription data structure 70 (FIG. 4) to machine 100. Signal source 156 may include any signal-producing source that produces signals of the type needed by the present invention. Such sources include input devices controllable by a human user that produce signals in response to actions by the user, such as a keyboard device; in response to actions by the user entering a sequence of character codes indicating the glyphs the user visually perceives as occurring in 2D image 10, signal source 156 produces signals indicating the character codes which are then received by processor 140 via input circuitry 158. Alternatively, signal source 156 may be an operation (not shown) that processor 140 is executing, or that is being executed by another processor in communication with processor 140, that provides transcription data structure 70 to processor 140 for processing according to the present invention. An example of such an operation is a character recognition operation performed on 2D image 10 that produces transcription data structure 70 as its output. Processor 140 then provides transcription data structure 70 to data memory 114 for storage.

Processor 140 is also connected for accessing program memory 110 and data memory 114 to obtain data stored therein. Processor 140 of machine 100 operates by accessing program memory 110 to retrieve instructions, which it then executes. Program memory 110 includes the underlying system software and firmware 112 that provide the operating system and operating facilities of machine 100, and template training routine 200 that implements the invention described in the flowchart of FIG. 11 and in the flowcharts that reference those routines, including template construction subroutine 270. Depending on the particular implementation of template training routine 200, program memory 110 may also include network merging subroutine 300, 2D image decoding subroutine 330, and training data production routine 380. During execution of the instructions in program memory 110, processor 140 accesses data memory 114 to obtain data items in 2D image source model 40, transcription data structure 70 and 2D image 100 and to write character template data 20 to memory 114. Data memory 114 also stores other data, such as the data structure 118 including the labeled collections of sample image regions for use in template construction. Miscellaneous data 122 includes other data used in executing instructions in program memory 110, and may include initial values, indexes for use in accessing the template canvases and sample image regions, template contribution measurements, and the factors $\gamma$ and $\beta$ for use in computing pixel scores. Depending on the particular implementation of template training technique 200, miscellaneous data 122 may also include the transcription network, the merged transcription-image network, an initial character template data structure when needed, and the Viterbi decoding lattice and scores.

Machine 100 may, but need not, include output circuitry 160 connected to processor 140 for receiving image definition data defining an image for presentation on display device 170. Display device 170 may be any suitable display device for presenting images, and may include a cathode ray tube device or a liquid crystal display device for presenting images on display screens, or a printer device for presenting images on a marking medium. Thus output circuitry 160 may include a screen display device driver or printing circuitry. In a document recognition system integrating the present invention as a component thereof, for example, display device 170 may be either a printer or a display screen for presenting the final set of trained character templates for visual inspection by a user. In another example, when display device 170 is a screen display, it may be used in conjunction with a user interaction device by the user for providing transcription data structure 70 to machine 100.

The actual manner in which the physical components of machine 100 are connected may vary, and may include hardwired physical connections between some or all of the components as well as connections over wired or wireless communications facilities, such as through remote or local communications networks and infrared and radio connections. Image signal source 154 and image input circuitry 152, for example, may be physically included in a single physical unit such as a scanning device that is part of a device such as a facsimile machine, that produces 2D image 10 and transmits it for receipt by processor 140. Or, either or both memory 110 or 114 may include memory that is physically connected to processor 140 as local memory, or that is remotely accessible to processor 140 by means of a wired or wireless communications facility. It is further of importance to note that the range of the physical size of machine 100, or of any of its components, may vary considerably from a large device, for example, a multi-featured high volume copier/duplicator device, to much smaller desktop, laptop, and pocket-sized or smaller display devices. The character training technique of the present invention is operable on all machines in this physical size range.

G. Additional Considerations

1. Efficiency considerations

In cases when the template training procedure is carried out in the 1D image environment using line network models for the image source and transcription, and using literal transcriptions, the merging of the networks becomes a straightforward task, and there is no need to formally carry out the three model merging steps. The merged network can be directly produced from the two input network sources.

Viterbi decoding efficiency can be improved when the template training procedure is iterated (i.e. the updated templates from a previous iteration are used as initial templates for the current iteration) by using the labeled glyph image origin positions of the previous iteration to restrict the search during the decoding step of the current iteration. As the templates converge to their final values, the decoded glyph image origin positions will tend to change only slightly from one iteration to the next. Thus, the template matching operations that occur during the Viterbi decoding need only be performed at image positions that lie close to the previous glyph image origin positions, rather than being carried out everywhere in the image. Template match scores at positions far from the previous glyph positions can be set to some large negative constant value.

Several alternative methods of efficiently improving template construction have already been discussed in Section C.6 above.

2. Modeling horizontal white space as a template in the image source model

Decoding efficiency of the illustrated embodiment may also be improved by modeling as a template in the image source model the horizontal white space that occurs between semantic units (e.g., words) in an image of black text on a white background. Treating the white space between words as a glyph to be matched by a "space" character template improves decoding performance because the image positions in the input 2D image aligned with "space" character templates tend to be identified relatively quickly as accurate image positions in successive iterations of Viterbi decoding, and this information can be used in subsequent iterations to restrict the computation of likelihood scores to certain transition locations.

Conceptually, modeling image white space is characterized in the illustrated embodiment by modeling a "space" character template as having a very low foreground probability, $\alpha_1$, indicating that a foreground pixel in an ideal image will more likely not be observed as black in the image locations that "match" the "space" template; that is, these image regions are expected to be free of black pixels. This is accomplished by reversing the relationship between $\alpha_0$ and $\alpha_1$ for the "space" template such that $\alpha_1$ and $\alpha_0$ satisfy the condition, $\alpha_1 < 1 - \alpha_0$. A template that models white space in this way may be referred to as a "hyper-white" template.

In the illustration of the template construction method just described, $\alpha_0$ (background probability) and $\alpha_1$ (foreground probability) are assumed to have the relationship, $\alpha_1 > 1 - \alpha_0$ for all templates; that is, these parameters are uniform for all templates. Modeling at least one template in a manner in which the relationship between $\alpha_0$ and $\alpha_1$ is reversed requires that templates have the property of having different, or nonuniform, foreground probabilities associated with them. Implementing these two concepts—the reversal of the relationship between the probabilities $\alpha_0$ and $\alpha_1$ and permitting foreground probability $\alpha_1$ to vary by template—requires changing the pixel assignment procedure that is illustrated in Table 3 above in the following manner.

Recall that computation of the pixel Scores using (27) requires use of the factors $\gamma$ and $\beta$; when $\alpha_1$ and $\alpha_0$ satisfy the condition, $\alpha_1>1-\alpha_0$, then $\gamma>0$ and $\beta<0$. When $\alpha_1<1-\alpha_0$, the probability that a foreground pixel from a template will produce a black observed pixel is less than the probability of a background pixel being observed as black. Thus, when $\alpha_1<1-\alpha_0$, $\gamma<0$ and $\beta>0$. The ML template pixel color assignment criterion (26) remains valid, where $S_t(x;Z)$ is defined as before, but now the condition $S_t(x;Z)>0$ becomes $$\frac{1}{N_t} \sum_{i=1}^{N_t} z(x+x_i^{(\theta)}) < \frac{-\beta}{\gamma} \quad (29)$$

in which the direction of inequality is reversed compared to equation (28). The interpretation of (29) is that the fraction of black pixels at location x in the collection of aligned glyph sample image regions for a template $Q_t$ should be less than a threshold, rather than greater.

In the existing procedure of Table 3 above, when a template pixel is assigned a color of 1, e.g. $q_x(w):=1$, the pixels of Z at locations $w+x_i^{(s)}$, $i=1 \ldots N_s$ are set to 0 before the next template pixel assignment is made. The effect of this is to reduce the score $S_t(x;Z)$ for overlapping template pixels that have not yet been set to 1, thereby decreasing the likelihood that the overlapping pixels will be set to 1 subsequently. In the case of hyper-white templates, the principle of reducing $S_t(x;Z)$ is still valid, but since $\gamma<0$ when $\alpha_1<1-\alpha 0$, reducing $S_t(x;Z)$ is accomplished by adding black pixels to Z, rather than removing them. Implementing this requires modifying the pixel assignment procedure of Table 3 to replace the line that assigns a value of zero to pixels in the samples that are aligned with an assigned template pixel with a line that assigns a value of one to those pixels. However, this would only be necessary for the templates modeled as hyper-white templates, i.e. those templates where $\alpha_1<1-\alpha_0$.

Producing a set of character templates in which the foreground probability of each template is nonuniform (i.e., varies by template) requires a slight modification to the definition of the aligned pixel score, $S_t(x;Z)$ in (27) to make $\alpha_1$ an explicit parameter, so that $$S_t(x;Z,\alpha_1) \equiv \gamma_{\alpha_1} \sum_{i=1}^{N_t} z(x+x_i^{(\theta)}) + \beta_{\alpha_1} N_t \quad (30)$$

The subscripts on $\gamma$ and $\beta$ indicate that these parameters are related to $\alpha_1$ via (17) and (18).

When the "space" character template alone is modeled as a hyper-white template, while the remaining templates in the glyph sample character set are modeled as black-on-white templates, it can be seen that constructing hyper-white templates involves coloring Z pixels black every time a template pixel is assigned a 1 value, while constructing normal templates involves coloring Z pixels white. To accomplish this, two copies of the observed image Z are maintained during pixel color assignment. One copy, denoted $Z_1$, is used to compute $S_t(x;Z)$ for those templates for which $\alpha_1>1-\alpha_0$. The second copy, denoted $Z_0$, is used to compute $S_t(x;Z)$ for the hyper-white templates, i.e. templates for which $\alpha_1<1-\alpha_0$. Before the pixel assignment process begins, $Z_1$ and $Z_0$ are each initialized to be copies of Z. Every time any template pixel is assigned a 1 value, pixels of $Z_1$ are cleared (from 1 to 0) and pixels of $Z_0$ are set (from 0 to 1.) The selection function $\sigma$ determines which of $Z_0$ or $Z_1$ is used to compute $S_t(x;Z)$ for a given template, and is defined by $$\sigma(\alpha_1) = \begin{cases} 1 & \text{if } \alpha_1 > 1-\alpha_0 \\ 0 & \text{otherwise.} \end{cases} \quad (31)$$

The pseudo code of Table 4 shows the pixel assignment procedure for constructing a set of templates that implements the modeling of white space as one of the templates. The value of $\alpha_1$ that is used for template $Q_t$ is denoted $\alpha_1^{(t)}$.

TABLE 4 procedure (B,C,$Z_1$,$Z_0$) do begin
  while max $S_t(x; Z_{\sigma(\alpha_1^{(t)}),\alpha_1^{(t)}}) > 0$ do begin $$\begin{Bmatrix} t \in B \\ x \in C \end{Bmatrix}$$

(s,w): = arg max $S_t(x; Z_{\sigma(\alpha_1^{(t)}),\alpha_1^{(t)}})$ $$\begin{Bmatrix} t \in B \\ x \in C \end{Bmatrix}$$

$q_s(w) := 1$
  for $i = 1 \ldots N_s$ do $z_1(w + x_i^{(s)}) := 0$
  for $i = 1 \ldots N_s$ do $z_0(w + x_i^{(s)}) := 1$
  end
end The set 510 of character templates illustrated in FIG. 28 and the set illustrated in FIG. 31 have actually been constructed according to the modified procedure of Table 4 using nonuniform foreground probabilities. Examples of "space" character templates are shown in template 520 of FIG. 28 and in template 542 of FIG. 31. In these figures, the "space" hyper-white foreground is shown in black. These "space" character templates were constructed using $\alpha_1=0.001$, while the remainder of the templates in the character sets of FIGS. 28 and 31 were constructed using a foreground probability of $\alpha_1=0.51$. The background probability value of $\alpha_0=0.9$ was used.

3. Initial character templates

In the illustrated implementation of character template training technique 200 shown in FIGS. 12 and 13, an initial character template data structure including an initial set of character templates and respective character label data items is required by decoding process 330 to produce the labeled glyph image origin positions 390 that comprise the training data for template construction technique 400. And, as already noted, an initial set of character templates having arbitrary pixel content is generated prior to decoding if no initial set of character templates is available.

Each initial character template must have a set of font metrics established for it in order to completely describe it for the decoding process. In particular, the value of the character set width must be initialized so that values for displacements associated with transitions that include templates can be established. While the content of the initial set of character templates may be arbitrary, the default size of each black rectangle, which is necessarily related to the template's set width, is not arbitrary and must be carefully considered, since during decoding, these initial templates are imaged in the image plane according to the displacements on the transitions. The size of each template is typically determined using information available about the sizes of the characters in the font for which templates are being trained. Experience with template training according to the illustrated implementation shows that each initial template should have a default set width established that is smaller than the true set width for the corresponding character, and that the set width include a minimum space allowed between characters in an image. The default set width should be (1) small enough to permit templates to be placed close enough together to match an actual input 2D image, and (2) large enough to satisfy the template disjointness constraint.

The number of templates in the initial set of character templates generated by the technique may be arbitrary, but, in practice, the number of initial templates generated should be related to the total number of characters in the glyph sample character set being trained. For example, in the illustrated implementation of the present invention, an initial set of templates was generated that included 52 templates for all upper and lower case English letters, plus templates for the numerals 0–9 and for common punctuation marks and a space, each with arbitrary initial pixel content. Processes may also be included in an implementation for examining the transcription data structure to obtain information about the number of initial character templates needed. For example, if the transcription data structure is the output of a recognizer, it may contain data that provides information about what fonts and type size are in the input 2D image to be used as the source of glyph samples that may be used to estimate the total number of initial character templates to generate.

An existing set of character templates 500 may be provided as an explicit input to the illustrated implementation of character template training technique 200, as shown in FIG. 12, when such an initial set of templates is available from another source. Initial set of character templates 500 may be available, for example, from a recognition system that provides labeled binary character template data of the type required by image source model 830 of the illustrated implementation, for recognition of a particular font, and these existing templates are to be further improved (trained) for recognition of a particular document, or in the case where the technique has been previously used and the output labeled character template data of the technique is to be input to the technique for further training with a different 2D image and associated transcription.

4. Interaction with a machine user

The template training technique of the present invention may be included as part of the functionality and user interface of an OCR system so that a user of the system would be able to train, in a manner that is largely automatic, font-specific character template sets for use by the OCR system for recognition purposes. It is expected that users of such a system could include OCR system development users as well as end-users. As discussed earlier, the training technique permits a wide range of flexibility in the selection of a 2D image for use as a source of glyph samples, and in the type of transcription that may be used as input. A pre-training user interface may be provided that identifies the sources of the input data and manages the collection of user-provided data to the training system. For example, a first data collection screen may be provided where the user indicates, with a keyboard or pointing device, whether the transcription will be provided by the user, or from an external source, and indicates the structure of the input 2D image source of glyph samples for use by the formal 2D image source model. The 2D image source model may also require several user-provided parameters that may be managed by a second data collection interface screen display for specifying the spatial structure of an input document for which an existing model does not exist. A third data collection screen may manage the actual input of a transcription by the user, and the creation of the data structure representing the transcription model, such as, for example, the creation of the transcription finite state network. In addition, the user may need to specify the size of the template canvas when a character set is being trained in a font for which a default canvas size would not be suitable.

It can be seen from the foregoing description that the training technique of the present invention is a flexible, robust training method that successfully trains font-specific, binary character templates without the need for pre-training segmentation of glyph samples, using a wide variety of possibly noisy two-dimensional text document images as a source of glyph samples, and using an associated transcription that can take a variety of forms, that may be errorful, and that is provided as an explicit input to the technique. A significant advantage of this training technique is its use of a formal 2D image source model as an explicit input to the process; the formal 2D image source model provides for very flexible specification of the 2D input image and the transcription toward the goal of making the training of font-specific, binary character templates simple, accurate and automatic for the user.

While this invention has been described in conjunction with specific embodiments, it is evident that many alternatives, modifications and variations will be apparent to those skilled in the art. Accordingly, the invention as herein described is intended to embrace all such alternatives, modifications and variations as fall within the scope of the appended claims.

What is claimed:

1. A method of operating a machine to train a set of character templates for use in a recognition system; the machine including a processor and a memory device for storing data; the data stored in the memory device including instruction data which the processor executes to operate the machine; the processor being connected to the memory device for accessing and executing the instruction data stored therein; the method comprising:

operating the processor to receive a two-dimensional (2D) image source of glyph samples having a vertical dimension size larger than a single line; each glyph sample being an image instance of a respective one of a plurality of characters in a character set; the set of character templates being trained representing respective ones of the plurality of characters in the character set;

operating the processor to receive a transcription network in the form of a finite state network data structure indicating a transcription associated with the 2D image source of glyph samples; the transcription including an ordered arrangement of transcription labels; the transcription network indicating the ordered arrangement of the transcription labels in the transcription as at least one transcription path through the transcription network;

operating the processor to access a two-dimensional (2D) image source network in the form of a stochastic finite state network data structure, stored in the memory device of the machine; the 2D image source network modeling as a grammar a spatial image structure of a set of 2D images, each including a plurality of glyphs; a first one of the set of 2D images being modeled as at least one path through the 2D image source network that indicates an ideal image consistent with the spatial image structure of the first image; the at least one path indicating path data items associated therewith and accessible by the processor; the path data items indicating image positions and glyph labels paired therewith of respective ones of the plurality of glyphs included in the first image; the 2D image source of glyph samples being one of the images included in the set of 2D images modeled by the 2D image source network;

operating the processor to merge the 2D image source network with the transcription network to produce a transcription-image network; the transcription-image network being a modified form of the 2D image source network wherein, when the transcription is associated with the first image, the transcription-image network models the first image as at least one complete transcription-image path through the transcription-image network that indicates an ideal image consistent with the spatial image structure of the first image and that further indicates the path data items, the transcription-image path further indicating a sequence of message strings consistent with the ordered arrangement of the transcription labels indicated by the at least one transcription path through the transcription network;

operating the processor to perform a decoding operation on the 2D image source of glyph samples using the transcription-image network to produce at least one complete transcription-image path indicating an ideal image consistent with the spatial image structure of the 2D image source of glyph samples;

operating the processor to produce training samples using the path data items associated with the at least one complete transcription-image path; each training sample including a 2D image position in the 2D image source of glyph samples indicating an image position therein and a glyph label paired therewith; and operating the processor to produce the set of character templates using the training samples.

2. The method of claim 1 of operating a machine to train a set of character templates wherein each of the character templates is based on a character template model defining character image positioning of first and second adjacent character images in an image, referred to as a sidebearing model of character image positioning, wherein a template image origin position of the second character image is displaced in the image by a character set width from a template image origin position of the first character image adjacent to and preceding the second character image; the sidebearing model of character image positioning requiring that, when a first rectangular bounding box drawn to contain the first character image overlaps with a second rectangular bounding box drawn to contain the second character image, the first and 4 second character images have substantially nonoverlapping foreground pixels; and wherein the step of operating the processor to produce the set of character templates further includes determining, for each character template, a character set width thereof using the training samples.

3. The method of claim 1 of operating a machine to train a set of character templates wherein each of the character templates is based on a character template model defining character image positioning of first and second adjacent character images in an image, referred to as a segmentation-based model of character image positioning, wherein each of the first and second adjacent character images is capable of being entirely contained in a rectangular bounding box and a first rectangular bounding box drawn to contain the first character image does not substantially overlap with a second rectangular bounding box drawn to contain the second character image.

4. The method of claim 1 of operating a machine to train a set of character templates wherein the transcription data structure associated with the 2D image source of glyph samples includes at least one pair of transcription labels indicating at least first and second alternate message strings for a single image portion of the 2D image source of glyph samples;

the transcription network models the transcription data structure as a series of transcription nodes and a sequence of transitions between pairs of the transcription nodes; each transition having a transcription label associated therewith; and the transcription network models the at least one pair of transcription labels indicating the at least first and second alternate message strings as at least first and second alternate sequences of transitions between one of the pairs of the transcription nodes; each one of the at least first and second alternate sequences of transitions having one of the at least first and second alternate message strings associated therewith.

5. The method of claim 1 of operating a machine to train a set of character templates wherein the transcription network indicates a tag transcription including at least one nonliteral transcription label, hereafter referred to as a tag, indicating at least one character code representing a character with which a respective glyph in the 2D image source of glyph samples cannot be paired by visual inspection thereof; the at least one character code indicated by the tag indicating markup information about the 2D image source of glyph samples; the markup information, when interpreted by a document processing operation, capable of producing at least one display feature included in the 2D image source of glyph samples perceptible as a visual formatting characteristic of the 2D image source of glyph samples; and the processor, in merging the 2D image source network with the transcription network, designates the transcription labels included in the transcription network as message strings included in the transcription-image network; the tag being designated as a message string in the transcription-image network such that the transcription-image network models a relationship between the tag and at least one glyph occurring in the 2D image of glyph samples.

6. The method of claim 1 of operating a machine to train a set of character templates wherein the at least one complete transcription-image path through the transcription-image network is defined by a sequence of transitions between nodes included in the transcription-image network;

the path data items associated with the at least one complete transcription-image path are associated with each transition; the path data items including a message string, a character template and an image displacement; and the processor determines, for respective transitions indicated by the complete transcription-image path having non-null character templates associated therewith, the image positions of respective ones of the plurality of glyphs included in the 2D image source of glyph samples by using the image displacements associated with the respective transitions; the processor further determining the glyph label paired with each respective image origin position using a character label indicated by the non-null character template associated with the respective transition; the character label indicating a character in the character set.

7. The method of claim 1 wherein the decoding operation performed on the 2D image source of glyph samples uses a plurality of initial character templates to produce the at least one complete transcription-image path indicating the ideal image.

8. The method of claim 7 further including, after producing the set of character templates using the 2D image source of glyph samples and the training samples occurring therein, performing at least one additional iteration of the steps of performing the decoding operation, producing the training samples, and producing the set of character templates; the at least one additional iteration of the decoding operation using the set of character templates produced in a prior iteration as the plurality of initial character templates.

9. The method of claim 7 wherein the plurality of initial character templates used by the decoding operation to produce the at least one complete transcription-image path initially has arbitrary pixel content.

10. The method of claim 1 wherein operating the processor to perform a decoding operation on the 2D image source of glyph samples to produce the at least one complete transcription-image path indicating the ideal image includes performing a dynamic programming operation to compute an optimum score at each of a plurality of lattice nodes in a decoding lattice data structure representing the transcription-image network; the dynamic programming operation producing and storing an optimizing transition identification data item for each lattice node in the decoding lattice; the optimizing transition identification data item being produced as a result of computing the optimum score and indicating one of a plurality of possible transitions into a respective one of the lattice nodes that optimizes the score for the respective lattice node; and performing a backtracing operation to retrieve a sequence of transitions indicating a decoding lattice path; the backtracing operation starting with a final lattice node and ending with a first lattice node in the decoding lattice path; the sequence of transitions being retrieved using the optimizing transition identification data item produced for each lattice node as a result of computing the optimum scores; the decoding lattice path indicating the at least one complete transcription-image path through the transcription-image network.

11. The method of claim 1 wherein operating the processor to perform the decoding operation on the 2D image source of glyph samples to produce the at least one complete transcription-image path indicating the ideal image includes producing a plurality of complete transcription-image paths through the transcription-image network; each complete transcription-image path indicating a target 2D ideal image; and selecting one of the plurality of complete transcription-image paths as a best complete transcription-image path by determining a best-matched target 2D ideal image, from the plurality of target 2D ideal images, that matches the 2D image source of glyph samples according to a matching criterion.

12. The method of claim 11 wherein the matching criterion is an optimized value for a target image pixel match measurement data item computed for each target 2D ideal image by comparing pixel color values indicated by image pixels defining the 2D image source of glyph samples with pixel color values of respectively paired image pixels defining the target 2D ideal image.

13. A method of operating a machine to train a set of character templates for use in a recognition system; the machine including a processor and a memory device for storing data; the data stored in the memory device including instruction data which the processor executes to operate the machine; the processor being connected to the memory device for accessing and executing the instruction data stored therein; the method comprising:

operating the processor to determine glyph sample pixel positions identifying respective ones of glyph samples occurring in a two-dimensional (2D) image source of glyph samples having a vertical dimension size larger than a single line of glyphs; each glyph sample included in the 2D image source of glyph samples being an image instance of a respective one of a plurality of characters in a character set; each one of the set of character templates being trained representing a respective one of the plurality of characters in the character set;

the processor, in determining the glyph sample pixel position of each glyph sample, using a two-dimensional (2D) image source model that models as a grammar a spatial image structure of a set of images that includes the 2D image source of glyph samples; the 2D image source model including spatial positioning data modeling spatial positioning of the plurality of glyphs occurring in the 2D image source of glyph samples; the processor using the spatial positioning data to determine the glyph sample pixel position identifying a respective glyph sample;

operating the processor to produce a glyph label to be respectively paired with the glyph sample pixel position of a respective glyph sample; the respectively paired glyph label indicating a respective one of the characters in the character set;

the processor, in producing the respectively paired glyph label, using mapping data included in the 2D image source model mapping a respective one of the glyphs to a glyph label indicating the character in the character set;

the processor, further in producing the respectively paired glyph label, using a transcription associated with the 2D image source of glyph samples and including an ordered arrangement of transcription labels; and operating the processor to produce the set of character templates indicating respective ones of the characters in the character set using the glyph sample pixel positions identifying the glyph samples occurring in the 2D image source of glyph samples with their respectively paired glyph labels.

14. The method of claim 13 of operating the machine to train character templates wherein each character template in the set of character templates is based on a character template model having a characteristic image positioning property such that when a first rectangular bounding box entirely contains a first character image, and a second rectangular bounding box entirely contains a second character image adjacent to the first character image, the first rectangular bounding box does not substantially overlap with the second rectangular bounding box; and the step of operating the processor to determine the glyph sample pixel position of each glyph sample occurring in the 2D image source of glyph samples includes determining image coordinates of a respective glyph sample bounding box in the 2D image source of glyph samples that entirely defines image dimensions of a respective one of the glyph samples occurring therein.

15. The method of claim 14 wherein the step of operating the processor to produce the set of character templates includes using the image coordinates in the 2D image source of glyph samples of the respective glyph sample bounding box to define the image dimensions of each glyph sample.

16. The method of claim 14 wherein the step of operating the processor to determine the glyph sample pixel position of each glyph sample further includes producing an image definition data structure for each glyph sample defining an isolated glyph sample using the image coordinates of the glyph sample bounding box of the glyph sample; and the step of operating the processor to produce the set of character templates includes assigning a foreground pixel color value to selected ones of a plurality of template pixel positions included in respective ones of the character templates using pixel color values included in the image definition data structures defining the isolated glyph samples.

17. The method of claim 13 of operating the machine to train character templates wherein each character template in the set of character templates is based on a character template model having a characteristic image positioning property such that, when a second character template is positioned in an image with a template image origin position thereof displaced from a template image origin position of a preceding first character template by a character set width thereof, and when a first bounding box entirely containing the first character template overlaps in the image with a second bounding box entirely containing the second character template, the first and second character templates have substantially nonoverlapping foreground pixels;

the glyph sample pixel position of each glyph sample occurring in the 2D image source of glyph samples is a single 2D image position in the 2D image source of glyph samples indicating an image origin position of the glyph sample; and the step of operating the processor to produce the set of character templates includes determining sample image regions in the 2D image source of glyph samples; each sample image region including a plurality of image pixel positions in the 2D image source of glyph samples, referred to as sample pixel positions; a first one of the sample pixel positions being the image origin position of a first glyph sample; each sample image region further being large enough such that a second one of the sample pixel positions is the image origin position of a second glyph sample; and assigning pixel color values to template pixel positions included in respective ones of the character templates using pixel color values indicated by the sample pixel positions included in the sample image regions on the basis of template pixel assignment criteria that determine which sample pixel positions in which sample image regions are used to determine a pixel color value for a template pixel position such that all character templates observe the characteristic imaging property of the template model.

18. The method of claim 13 wherein the step of operating the processor to produce the set of character templates includes producing, for each respective character template, a template image region for storing the respective character template; the template image region having a pixel position designated as a template origin pixel position;

determining, for each glyph sample pixel position having a respectively paired glyph label identifying the character indicated by the respective character template, a sample image region in the 2D image source of glyph samples including a two-dimensional (2D) array of image pixel positions, referred to as sample pixel positions and including the glyph sample pixel position; each glyph sample pixel position identifying a glyph sample being positioned at the same relative location in a respective sample image region such that the sample pixel positions in one of the sample image regions are effectively aligned with the sample pixel positions in other sample image regions identified for the respective character template; the sample image regions being referred to as aligned sample image regions, and the sample pixel positions being referred to as respectively paired sample pixel positions; and assigning pixel color values to sequentially selected template pixel positions in respective ones of the template image regions in a template assignment order using the aligned sample image regions; the pixel color values being determined on the basis of template contribution measurements computed using respectively paired sample pixel positions included in the aligned sample image regions; the template assignment order being determined on the basis of information about a previously-assigned template pixel position.

19. The method of claim 18 wherein the step of assigning pixel color values to sequentially selected template pixel positions further includes (a) computing the template contribution measurement for each template pixel position using each respectively paired sample pixel position included in the aligned sample image regions;

(b) selecting the template pixel position having the highest positive template contribution measurement as a selected template pixel position;

(c) assigning a foreground pixel color value to the selected template pixel;

(d) modifying each respectively paired sample pixel position paired with the selected template pixel position to indicate a background pixel color value; and (e) repeating steps (a) through (d) while at least one of the template contribution measurements being computed is positive.

20. The method of claim 13 of operating the machine to train character templates wherein the transcription associated with the 2D image source of glyph samples is produced as an output data structure of a computer-implemented character recognition system.

21. The method of claim 13 of operating the machine to train character templates wherein the machine further includes a user input device connected to input circuitry for providing signals indicating input data from a user of the processor-controlled machine; the processor being further connected to the input circuitry for receiving the input data from the user; and wherein the ordered arrangement of transcription labels included in the transcription associated with the 2D image source of glyph samples is produced by the user using the user input device.

22. The method of claim 13 of operating the machine to train character templates wherein the 2D image source of glyph samples is produced as an output of a scanning operation performed on a physical document.

23. The method of claim 13 of operating the machine to train character templates wherein the transcription associated with the 2D image source of glyph samples is a literal transcription; each transcription label in the ordered arrangement of transcription labels in the transcription indicating a character code representing a character in the character set and being capable of being paired by visual inspection with a single glyph in the 2D image source of glyph samples representative the character in the glyph sample character set indicated by the character code; and wherein the processor, in producing the glyph label paired with the glyph sample, uses the spatial positioning information about the glyph sample to identify as the glyph label the transcription label in the transcription that is visually paired with the glyph sample.

24. The method of claim 14 of operating the machine to train character templates wherein the transcription associated with the 2D image source of glyph samples is a nonliteral transcription including at least one nonliteral transcription label indicating a character code representing a character selected from the group consisting of (a) a character in a second character set different from the character set of the templates being trained; and (b) a character with which a glyph in the 2D image source of glyph samples cannot be paired by visual inspection thereof; and wherein the processor, in producing the glyph label, uses the spatial positioning information about the glyph sample to identify the at least one glyph sample related to the at least one nonliteral transcription label in the transcription and maps the character code indicated by the at least one nonliteral transcription label to a character code indicating a character in the character set to produce the glyph label paired with a glyph sample.

25. The method of claim 13 of operating the machine to train a set of character templates wherein the transcription associated with the 2D image source of glyph samples is a tag transcription including at least one nonliteral transcription label, hereafter referred to as a tag, indicating at least one character code representing a character with which a respective glyph in the 2D image source of glyph samples cannot be paired by visual inspection thereof; the at least one character code indicated by the tag indicating markup information about the 2D image source of glyph samples; the markup information, when interpreted by a document processing operation, producing at least one display feature included in the 2D image source of glyph samples perceptible as a visual formatting characteristic of the 2D image source of glyph samples; and wherein the processor, in producing the glyph label using the transcription and the mapping data, uses the spatial positioning information about the plurality of glyph samples occurring in the 2D image source of glyph samples to identify at least one glyph sample related to the tag, and uses the tag to pair a glyph label with the glyph sample.

26. A method of operating a machine to train a set of character templates for use in a recognition system; each of the character templates being based on a character template model defining character image positioning referred to as the sidebearing model of character image positioning; the machine including a processor and a memory device for storing data; the data stored in the memory device including instruction data which the processor executes to operate the machine; the processor being connected to the memory device for accessing and executing the instruction data stored therein; the method comprising:

operating the processor to receive a two-dimensional (2D) image source of glyph samples; the 2D image source of glyph samples having a vertical dimension size larger than a single line; each glyph occurring in the 2D image source of glyph samples being an image instance of a respective one of a plurality of characters in a character set; each one of the set of character templates being trained representing a respective one of the plurality of characters in the character set;

operating the processor to access a two-dimensional (2D) image source model stored in the memory device of the machine; the 2D image source model modeling as a grammar a set of two-dimensional (2D) images having a common spatial image structure; the 2D image source of glyph samples being one of the set of 2D images modeled by the 2D image source model; the 2D image source model including spatial positioning data modeling spatial positioning of the plurality of glyphs occurring in the 2D image source of glyph samples;

operating the processor to determine, for each respective glyph occurring in the 2D image source of glyph samples, a glyph sample image origin position of the respective glyph therein using the spatial positioning data included in the 2D image source model;

operating the processor to produce a glyph label respectively paired with each glyph sample image origin position; each respectively paired glyph label indicating the character in the character set represented by the respective glyph;

the processor, in producing each respectively paired glyph label, using mapping data included in the 2D image source model mapping respective ones of the glyphs occurring in the 2D image source of glyph samples to respectively paired glyph labels, each indicating the character in the character set represented by the respective glyph;

the processor, further in producing each respectively paired glyph label, using a transcription associated with the 2D image source of glyph samples the transcription including an ordered arrangement of transcription labels; the processor using the transcription labels and the mapping data to pair a glyph label with a respective glyph sample image origin position of a respective glyph occurring in the 2D image source of glyph samples; and p1 operating the processor to produce the set of character templates indicating the characters in the character set using the 2D image source of glyph samples, the glyph sample image origin positions and the respectively paired glyph labels; the processor determining, for each character template, a collection of sample image regions included in the 2D image source of glyph samples using the glyph sample image origin positions and the respectively paired glyph labels; the process producing the set of character templates using the collections of sample image regions by assigning foreground pixel color values to selected template pixel positions in respective ones of the character templates; one of the selected template pixel positions in a first one of the set of character templates being selected on the basis of template contribution measurements computed using sample pixel positions included in the collection of sample image regions for the character represented by the first character template;

each character template having a characteristic image positioning property such that, when a second character template is positioned in an image with an image origin position thereof displaced from the image origin position of a preceding first character template by a character set width thereof, and when a fast bounding box entirely containing the first character template overlaps in the image with a second bounding box entirely containing the second character template, the first and second character templates have substantially nonoverlapping foreground pixels.

27. The method of claim 26 of operating the machine to train character templates wherein the transcription associated with the 2D image source of glyph samples is a tag transcription including at least one nonliteral transcription label, hereafter referred to as a tag, indicating at least one character code representing a character with which a respective glyph in the 2D image source of glyph samples cannot be paired by visual inspection thereof; the at least one character code indicated by the tag indicating markup information about the 2D image source of glyph samples; the markup information, when interpreted by a document processing operation, producing at least one display feature included in the 2D image source of glyph samples perceptible as a visual formatting characteristic of the 2D image source of glyph samples; and the processor, in producing the respectively paired glyph labels using the transcription and the mapping data, uses the spatial positioning information about the glyphs occurring in the 2D image source of glyph samples to identify at least one glyph sample image origin position related to the tag, and uses the tag in producing a respectively paired glyph label.

28. A machine for use in training a set of character templates for use in a recognition operation; the machine comprising:

a first signal source for providing image data defining a fast image;

image input circuitry connected to the first signal source for receiving the image data defining the first image therefrom;

a second signal source for providing non-image data;

input circuitry connected to the second signal source for receiving the non-image data therefrom;

a processor connected to the image input circuitry for receiving the image data defining the first image therefrom and further connected to the input circuitry for receiving the non-image data therefrom; and memory for storing data; the data stored in the memory including instruction data indicating instructions the processor can execute;

the processor being further connected to the memory for accessing the data stored therein;

wherein the processor, in executing the instructions stored in the memory, receives from the image input circuitry a two-dimensional (2D) image source of glyph samples; the 2D image source of glyph samples having a vertical dimension size larger than a single line of glyphs; each glyph included in the 2D image source of glyph samples being an image instance of a respective one of a plurality of characters in a character set; the set of character templates being trained representing respective ones of the plurality of characters in the character set;

receives from the input circuitry a transcription associated with the 2D image source of glyph samples including an ordered arrangement of transcription labels; and receives from the input circuitry a two-dimensional (2D) image source model modeling as a grammar a spatial image structure of a set of 2D images including the 2D image source of glyph samples; the 2D image source model including spatial positioning data indicating spatial positioning information about the plurality of glyphs occurring in the 2D image source of glyph samples; the 2D image source model indicating mapping data mapping a respective one of the glyphs occurring in the 2D image source of glyph samples to a glyph label indicating a character in the character set;

wherein the processor, further in executing the instructions stored in the memory, determines a glyph sample pixel position of each of a plurality of glyph samples occurring in the 2D image source of glyph samples using the spatial positioning information included in the 2D image source model;

produces a glyph label respectively paired with each respective one of the glyph sample pixel positions and indicating a respective one of the characters in the character set; the processor producing the respectively paired glyph label using the mapping data indicated by the 2D image source model and using the ordered arrangement of transcription labels included in the transcription; and produces the set of character templates using the 2D image source of glyph samples and using the glyph sample pixel positions and the respectively paired glyph labels.

29. The machine for use in training a set of character templates of claim 28 wherein the first signal source for providing the first image is a scanning device; the image input circuitry connected for receiving the fast image from the first signal source is scanning circuitry capable of receiving an image by a scanning operation performed on a physical document showing marks indicating the image; the processor receiving the 2D image source of glyph samples from the scanning circuitry.

30. The machine for use in training a set of character templates of claim 28 wherein the second signal source includes a user input device for receiving signals indicating data from a user of the machine; the input circuitry being connected for receiving the signals from the user input device; and the processor receives the transcription associated with the 2D image source of glyph samples from the input circuitry connected for receiving the signals from the user input device.

31. The machine of claim 28 wherein the 2D image source model is represented as a stochastic finite state network data structure, referred to as a 2D image source network, indicating a regular grammar and representing the mapping data mapping a respective one of the glyph sample pixel positions in the 2D source of glyph samples to a glyph label as a path through the 2D image source network; the path indicating path data items associated therewith and accessible by the processor; the path data items indicating image origin positions and respectively paired glyph label of respective ones of the plurality of glyphs included in the 2D image source of glyph samples;

the transcription data structure associated with the 2D image source of glyph samples is represented as a finite state network data structure, referred to as a transcription network, modeling a transcription as a transcription path through the transcription network indicating the ordered arrangement of transcription labels in the transcription; and the processor, in executing the instructions for determining the plurality of glyph sample pixel positions of glyph samples occurring in the 2D image source of glyph samples and for producing respectively paired glyph labels, merging the 2D image source network with the transcription network to produce a transcription-image network indicating modified mapping data mapping a respective one of the transcription labels included in the transcription to a glyph sample pixel position of a respective one of the glyphs occurring in the 2D image source of glyph samples; the modified mapping data being represented as at least one complete transcription-image path through the transcription-image network; the at least one complete transcription-image path indicating the path data items;

performing a decoding operation on the 2D image source of glyph samples using the transcription-image network to produce the at least one complete transcription-image path through the transcription-image network; and obtaining the glyph sample pixel position of each glyph sample and the glyph label paired therewith using the path data items indicated by the at least one complete transcription-image path.

32. The machine for use in training a set of character templates of claim 28 wherein the transcription associated with the 2D image source of glyph samples is a tag transcription including at least one nonliteral transcription label, hereafter referred to as a tag, indicating at least one character code representing a character with which a respective glyph in the 2D image source of glyph samples cannot be paired by visual inspection thereof; the at least one character code indicated by the tag indicating markup information about the 2D image source of glyph samples; the markup information, when interpreted by a document processing operation, producing at least one display feature included in the 2D image source of glyph samples perceptible as a visual formatting characteristic of the 2D image source of glyph samples; and the processor, in executing the instructions for producing the respectively paired glyph label, uses the spatial positioning information about the glyph samples to identify at least one glyph sample related to the tag; and uses the tag in producing a respectively paired glyph label.

* * * * *